United States Patent
Ke et al.

(10) Patent No.: US 12,473,291 B2
(45) Date of Patent: Nov. 18, 2025

(54) BENZODIAZEPINE COMPOUND, PREPARATION METHOD THEREFOR, AND USE THEREOF IN MEDICINE

(71) Applicant: WEST CHINA HOSPITAL, SICHUAN UNIVERSITY, Sichuan (CN)

(72) Inventors: Bowen Ke, Sichuan (CN); Jin Liu, Sichuan (CN); Jun Yang, Sichuan (CN)

(73) Assignee: WEST CHINA HOSPITAL, SICHUAN UNIVERSITY, Sichuan (CN)

( * ) Notice: Subject to any disclaimer, the term of this patent is extended or adjusted under 35 U.S.C. 154(b) by 940 days.

(21) Appl. No.: 17/597,171

(22) PCT Filed: Jun. 24, 2020

(86) PCT No.: PCT/CN2020/098160
§ 371 (c)(1),
(2) Date: Dec. 28, 2021

(87) PCT Pub. No.: WO2020/259602
PCT Pub. Date: Dec. 30, 2020

(65) Prior Publication Data
US 2022/0324867 A1    Oct. 13, 2022

(30) Foreign Application Priority Data

Jun. 28, 2019 (CN) .......................... 201910579599.1
Sep. 30, 2019 (CN) .......................... 201910945196.4

(51) Int. Cl.
*C07D 487/04*    (2006.01)
*A61P 23/00*    (2006.01)

(52) U.S. Cl.
CPC ............ *C07D 487/04* (2013.01); *A61P 23/00* (2018.01)

(58) Field of Classification Search
CPC .................................................. C07D 487/04
See application file for complete search history.

(56) References Cited

FOREIGN PATENT DOCUMENTS

| | | |
|---|---|---|
| CN | 108033964 A | 5/2018 |
| WO | 9623790 A1 | 8/1996 |
| WO | 00/69836 A1 | 11/2000 |
| WO | 2017101808 A1 | 6/2017 |
| WO | 2018148361 A1 | 8/2018 |

OTHER PUBLICATIONS

Liu, Yan et al. "Design, Synthesis, and Biological Evaluation of Novel CNS 7056 Derivatives as Sedatives in Rats and Rabbits"; Chemical Biology & Drug Design, vol. 88, No. 1, Jan. 28, 2016; pp. 38-42.

*Primary Examiner* — James D. Anderson
(74) *Attorney, Agent, or Firm* — NKL Law; Allen Xue

(57) ABSTRACT

A benzodiazepine compound represented by formula I, or a salt thereof has an intravenous sedative anesthesia effect. The recovery quality of the compound is significantly improved compared with remimazolam in rat and mouse caudal venous anesthesia models. During anesthetization, the compound has a rapid onset, a short duration, a quick recovery and a good tolerance, can be used for anesthesia induction, anesthesia maintenance and day surgery anesthesia.

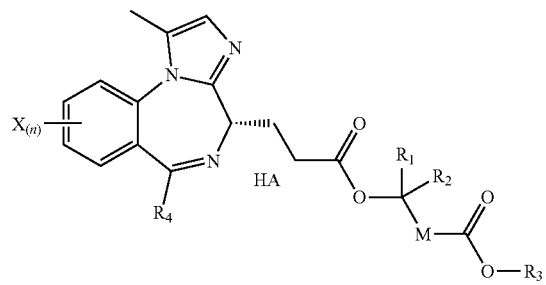

Formula I

23 Claims, No Drawings

BENZODIAZEPINE COMPOUND, PREPARATION METHOD THEREFOR, AND USE THEREOF IN MEDICINE

TECHNICAL FIELD

The present invention belongs to the chemical and pharmaceutical field, and in particular to benzodiazepine compounds, a preparation method thereof and their use in medicine.

BACKGROUND TECHNOLOGY

Midazolam is the most common benzodiazepine drug with good safety, which works mainly by binding to the central nervous system γ-aminobutyric acid (GABA) receptor. It takes effect quickly and can reduce intracranial pressure and brain metabolism. It is often used by administration prior to anesthesia; used in induction and maintenance of general anesthesia; used as an adjuvant drug for intraspinal anesthesia and local anesthesia; used for sedation in diagnostic or therapeutic operations such as cardiovascular angiography, cardioversion, bronchoscopy, gastrointestinal endoscopy, as well as for sedation of ICU patients. However, because its metabolism depends on the liver and kidney, long-term continuous infusion of midazolam will cause drug accumulation in the body, usually resulting in adverse reactions such as excessive sedation, respiratory and circulatory inhibition and drug tolerance, and the drug can not be used for a long time for patients with liver and kidney dysfunction.

The parent structure of remimazolam is midazolam, and as a rapid-effect benzodiazepine sedative/anesthetic administrated by intravenous injection, the drug acts on GABA receptors, especially GABA-α. The drug combines the safety of midazolam with the effectiveness of propofol. In human body, remimazolam is rapidly metabolized into inactive metabolites by tissue esterase, and is not metabolized by cytochrome-dependent liver pathway. It is a rapid-effect benzodiazepine-type drug. As a general anesthetic injected intravenously, it has the characteristics of fast onset, short duration, rapid recovery and good tolerance. Remimazolam is used for anesthesia induction, anesthesia maintenance and daytime surgical anesthesia. Compared with other drugs, it has certain advantages in patients with cardiovascular diseases, respiratory diseases, liver diseases and elderly patients.

However, it is reported that the potency of remimazolam is lower than that of other sedative drugs. When used in clinical, it is necessary to increase the dosage and thus the potential toxicity is also correspondingly increased; at the same time, the free base structure of remimazolam is unstable, and the by-products have considerable toxicity, which will further affect the activity of drug metabolic enzymes in vivo, resulting in high blood concentration and drug accumulation during continuous medication. Therefore, it is expected to develop new ultrashort sedative anesthetics with better safety and higher potency.

CONTENT OF THE INVENTION

The object of the present invention is to provide a benzodiazepine compound, a preparation method thereof and their use in medicine.

The present invention provides a compound of formula I, or a salt thereof, or a stereoisomer thereof, or a solvate thereof, or a cocrystallization thereof, or a composition thereof:

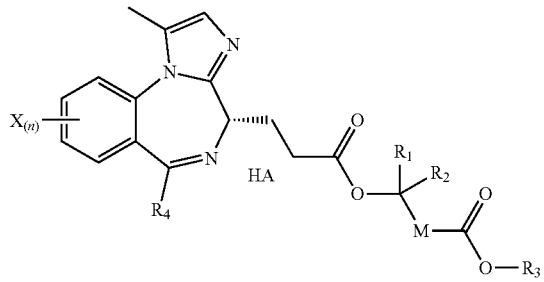

Formula I wherein, $R_1$ is selected from the group consisting of H, short-chain hydrocarbon group, $C_{3-10}$ cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_1$ is a short-chain hydrocarbon group or hydrogen; $R_2$ is selected from the group consisting of H, short-chain hydrocarbon group, $C_{3-10}$ cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_2$ is H or a short-chain hydrocarbon group;

or $R_1$ and $R_2$ may be mutually joined to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S;

M is absent or selected from the group consisting of O, S, NH or $C_{1-5}$ alkylene, wherein said alkylene is substituted with 0-4 substituents selected from the group consisting of halogen, trifluoromethyl and $C_{1-6}$ alkoxy, and preferably M is O;

$R_3$ is selected from the group consisting of H, short-chain hydrocarbon group and $—(CH_2)_a—(O)_b—R_5$, wherein $R_5$ can be $C_{3-10}$ cycloalkyl and 3-10 membered heterocyclic group. Said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, or $—NHC_{1-4}$ alkyl, and said heterocyclic ring includes 1-3 heteroatoms selected from N, O, or S.

Preferably, $R_3$ is a short-chain hydrocarbon group;
a is selected from 0, 1 and 2;
b is 0 or 1;
$R_4$ represents a pyridine ring with nitrogen at position 2, 3 or 4, and preferably $R_4$ is a pyridine ring with nitrogen at position 2;
each of X is independently selected from the group consisting of halogen, substituted or unsubstituted $C_{1-8}$ alkyl, substituted or unsubstituted $C_{1-8}$ alkoxy; the substituent of said alkyl or alkoxy is halogen;
n is selected from 1, 2, 3 and 4;
HA is various pharmaceutically acceptable inorganic and organic acids.

Further,
each of $R_1$ or $R_2$ is independently selected from the group consisting of H, substituted or unsubstituted $C_{1-8}$ alkyl, substituted or unsubstituted $C_{3-10}$ cycloalkyl or substituted or unsubstituted 3-10 membered heterocyclic group; or $R_1$ and $R_2$ are mutually linked to form substituted or unsubstituted $C_{3-10}$ cycloalkyl or substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl and $C_{1-8}$ alkoxy; the heteroatom of the heterocyclic group is selected from N, O and S, and the number of heteroatoms is 1, 2 or 3;

$R_3$ is selected from the group consisting of H, $C_{1-8}$ alkyl, —$(CH_2)_a$—$(O)_b$—$R_5$; wherein $R_5$ is selected from the group consisting of substituted or unsubstituted $C_{3-10}$ cycloalkyl or substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl and —$NHR_6$; the heteroatom of the heterocyclic group is selected from N, O and S, and the number of heteroatoms is 1, 2 or 3; $R_6$ is selected from $C_{1-4}$ alkyl;

a is selected from 0, 1 and 2;
b is 0 or 1;
$R_4$ represents a pyridine ring with nitrogen at position 2, 3 or 4;
M is selected from the group consisting of none, O, S, NH or substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl and $C_{1-4}$ alkoxy;
each X is independently selected from halogen, substituted or unsubstituted $C_{1-8}$ alkyl, substituted or unsubstituted $C_{1-8}$ alkoxy; the substituent of said alkyl or alkoxy is halogen;
n is selected from 1, 2, 3 and 4;
HA is various pharmaceutically acceptable inorganic and organic acids;
preferably,
each X is independently selected from —F, —Cl, —Br, —$CH_3$, —$OCH_3$, —$CF_3$, —$OCF_3$.
Further, said compound has the structure of formula II:

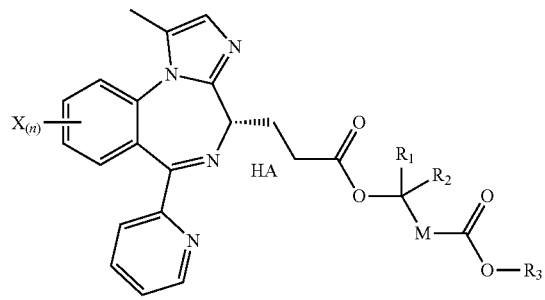

Formula II wherein,
$R_1$ is selected from the group consisting of H, short-chain hydrocarbon group, C3-10 cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_1$ is a short-chain hydrocarbon group or hydrogen;
$R_2$ is selected from the group consisting of H, short-chain hydrocarbon group, $C_{3-10}$ cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_2$ is H or a short-chain hydrocarbon group;
or $R_1$ and $R_2$ may be mutually joined to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S;
M is absent or selected from the group consisting of O, S, NH or $C_{1-5}$ alkylene, wherein said alkylene is substituted with 0-4 substituents selected from the group consisting of halogen, trifluoromethyl and $C_{1-6}$ alkoxy, and preferably M is O;
$R_3$ is selected from the group consisting of H, short-chain hydrocarbon group and —$(CH_2)_a$—$(O)_b$—$R_5$, wherein $R_5$ can be $C_{3-10}$ cycloalkyl and 3-10 membered heterocyclic group. Said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, or —$NHC_{1-4}$ alkyl, and said heterocyclic ring includes 1-3 heteroatoms selected from N, O, or S.

Preferably, $R_3$ is a short-chain hydrocarbon group;
a is selected from 0, 1 and 2;
b is 0 or 1;
each X is independently selected from the group consisting of halogen, substituted or unsubstituted $C_{1-8}$ alkyl, substituted or unsubstituted $C_{1-8}$ alkoxy; the substituent of said alkyl or alkoxy is halogen;
n is selected from 1, 2, 3 and 4;
HA is various pharmaceutically acceptable inorganic and organic acids;
preferably,
each of $R_1$ or $R_2$ is independently selected from the group consisting of H, substituted or unsubstituted $C_{1-8}$ alkyl, substituted or unsubstituted $C_{3-10}$ cycloalkyl or substituted or unsubstituted 3-10 membered heterocyclic group; or $R_1$ and $R_2$ are mutually linked to form substituted or unsubstituted $C_{3-10}$ cycloalkyl or substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl and $C_{1-8}$ alkoxy; the heteroatom of the heterocyclic group is selected from N, O and S, and the number of heteroatoms is 1, 2 or 3;
$R_3$ is selected from the group consisting of H, $C_{1-8}$ alkyl, —$(CH_2)_a$—$(O)_b$—$R_5$; wherein $R_5$ is selected from the group consisting of substituted or unsubstituted $C_{3-10}$ cycloalkyl or substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl and —$NHR_6$; the heteroatom of the heterocyclic group is selected from N, O and S, and the number of heteroatoms is 1, 2 or 3; $R_6$ is selected from $C_{1-4}$ alkyl;

a is selected from 0, 1 and 2;

b is 0 or 1;

$R_4$ represents a pyridine ring with nitrogen at position 2, 3 or 4;

M is selected from the group consisting of none, O, S, NH or substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl and $C_{1-4}$ alkoxy;

each X is independently selected from halogen, substituted or unsubstituted $C_{1-8}$ alkyl, substituted or unsubstituted $C_{1-8}$ alkoxy; the substituent of said alkyl or alkoxy is halogen;

n is selected from 1, 2, 3 and 4;

HA is various pharmaceutically acceptable inorganic and organic acids.

Further, $R_1$ or $R_2$ is each independently selected from the group consisting of H, substituted or unsubstituted $C_{1-3}$ alkyl, substituted or unsubstituted $C_{3-5}$ cycloalkyl or substituted or unsubstituted 3-5 membered heterocyclic group; or $R_1$ and $R_2$ are mutually linked to form substituted or unsubstituted $C_{3-6}$ cycloalkyl or substituted or unsubstituted 3-6 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-3}$ alkyl and $C_{1-3}$ alkoxy; the heteroatom of the heterocyclic group is selected from N, O and S, and the number of heteroatoms is 1, 2 or 3;

$R_3$ is selected from the group consisting of H, $C_{1-8}$ alkyl, —$(CH_2)_a$—$(O)_b$—$R_5$; wherein $R_5$ is selected from the group consisting of substituted or unsubstituted $C_{4-6}$ cycloalkyl or substituted or unsubstituted 4-6 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl and —$NHR_6$; the heteroatom of said heterocyclic group is selected from N, O and S, and the number of heteroatoms is 1, 2 or 3;

$R_6$ is selected from $C_{1-4}$ alkyl;

a is selected from 0, 1 and 2;

b is 0 or 1;

$R_4$ represents a pyridine ring with nitrogen at position 2, 3 or 4;

M is selected from the group consisting of none, O, S, NH or substituted or unsubstituted $C_{1-3}$ alkylene; the number of substituents of said substituted alkylene is 1, 2, 3 or 4, and the substituents of said substituted alkylene are selected from the group consisting of halogen, trifluoromethyl and $C_{1-2}$ alkoxy;

each X is independently selected from halogen, substituted or unsubstituted $C_{1-6}$ alkyl, substituted or unsubstituted $C_{1-6}$ alkoxy; the substituent of said alkyl or alkoxy is halogen;

n is selected from 1, 2, 3 and 4;

HA is selected from pharmaceutically acceptable inorganic and organic acids;

each X is independently selected from —F, —Cl, —Br, —$CH_3$, —$OCH_3$, —$CF_3$, —$OCF_3$.

Further, said compound has a structure of formula III:

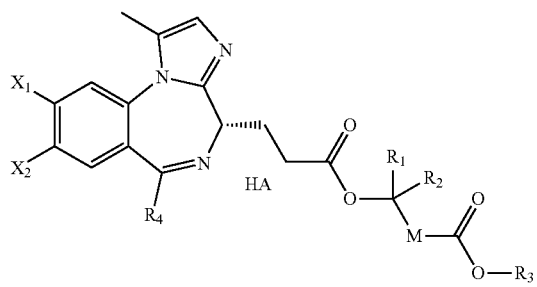

Formula III wherein, $R_1$ is selected from the group consisting of H, short-chain hydrocarbon group, $C_{3-10}$ cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_1$ is a short-chain hydrocarbon group or hydrogen;

$R_2$ is selected from the group consisting of H, short-chain hydrocarbon group, $C_{3-10}$ cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_2$ is H or a short-chain hydrocarbon group;

or $R_1$ and $R_2$ may be mutually joined to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S;

M is absent or selected from the group consisting of O, S, NH or $C_{1-5}$ alkylene, wherein said alkylene is substituted with 0-4 substituents selected from the group consisting of halogen, trifluoromethyl and $C_{1-6}$ alkoxy, and preferably M is O;

$R_3$ is selected from the group consisting of H, short-chain hydrocarbon group and —$(CH_2)_a$—$(O)_b$—$R_5$, wherein $R_5$ can be $C_{3-10}$ cycloalkyl and 3-10 membered heterocyclic group. Said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, or —$NHC_{1-4}$ alkyl, and said heterocyclic ring includes 1-3 heteroatoms selected from N, O, or S.

Preferably, $R_3$ is a short-chain hydrocarbon group;

a is selected from 0, 1 and 2;

b is 0 or 1;

$R_4$ represents a pyridine ring with nitrogen at position 2, 3 or 4, and preferably, $R_4$ is a pyridine ring with nitrogen at position 2;

each of $X_1$ and $X_2$ is independently selected from the group consisting of halogen, substituted or unsubstituted $C_{1-8}$ alkyl, substituted or unsubstituted $C_{1-8}$ alkoxy; the substituent of said alkyl or alkoxy is halogen;

HA is various pharmaceutically acceptable inorganic and organic acids;

preferably, each of $R_1$ or $R_2$ is independently selected from the group consisting of H, substituted or unsubstituted $C_{1-8}$ alkyl, substituted or unsubstituted $C_{3-10}$ cycloalkyl or substituted or unsubstituted 3-10 membered heterocyclic group; or $R_1$ and $R_2$ are mutually linked to form substituted or unsubstituted $C_{3-10}$ cycloalkyl or substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl and $C_{1-8}$ alkoxy; the heteroatom of the heterocyclic group is selected from N, O and S, and the number of heteroatoms is 1, 2 or 3;

$R_3$ is selected from the group consisting of H, $C_{1-8}$ alkyl, $-(CH_2)_a-(O)_b-R_5$; wherein $R_5$ is selected from the group consisting of substituted or unsubstituted $C_{3-10}$ cycloalkyl or substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl and $-NHR_6$; the heteroatom of the heterocyclic group is selected from N, O and S, and the number of heteroatoms is 1, 2 or 3; $R_6$ is selected from $C_{1-4}$ alkyl;

a is selected from 0, 1 and 2;

b is 0 or 1;

$R_4$ is selected from a pyridine ring with nitrogen at position 2, 3 or 4;

M is selected from the group consisting of none, O, S, NH or substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl and $C_{1-4}$ alkoxy;

each of $X_1$ and $X_2$ is selected from the group consisting of halogen, substituted or unsubstituted $C_{1-8}$ alkyl, substituted or unsubstituted $C_{1-8}$ alkoxy; the substituent of said alkyl or alkoxy is halogen;

HA is selected from pharmaceutically acceptable inorganic and organic acids.

Further, said compound has a structure of formula III-A:

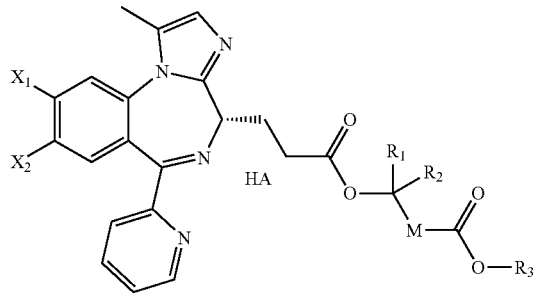

III-A wherein, each of $R_1$ or $R_2$ is independently selected from the group consisting of H, substituted or unsubstituted $C_{1-3}$ alkyl, substituted or unsubstituted $C_{3-5}$ cycloalkyl or substituted or unsubstituted 3-5 membered heterocyclic group; or $R_1$ and $R_2$ are mutually linked to form substituted or unsubstituted $C_{3-6}$ cycloalkyl or substituted or unsubstituted 3-6 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-3}$ alkyl and $C_{1-3}$ alkoxy; the heteroatom of the heterocyclic group is selected from N, O and S, and the number of heteroatoms is 1, 2 or 3;

$R_3$ is selected from the group consisting of H, $C_{1-8}$ alkyl, $-(CH_2)_a-(O)_b-R_5$; wherein $R_5$ is selected from the group consisting of substituted or unsubstituted $C_{4-6}$ cycloalkyl or substituted or unsubstituted 4-6 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl and $-NHR_6$; the heteroatom of the heterocyclic group is selected from N, O and S, and the number of heteroatoms is 1, 2 or 3; $R_6$ is selected from $C_{1-4}$ alkyl;

a is selected from 0, 1 and 2;

b is 0 or 1;

M is selected from the group consisting of none, O, S, NH or substituted or unsubstituted $C_{1-3}$ alkylene; the number of substituents of said substituted alkylene is 1, 2, 3 or 4, and the substituents of said substituted alkylene are selected from the group consisting of halogen, trifluoromethyl and $C_{1-2}$ alkoxy;

each of $X_1$ and $X_2$ is selected from the group consisting of halogen, substituted or unsubstituted $C_{1-6}$ alkyl, substituted or unsubstituted $C_{1-6}$ alkoxy; the substituent of said alkyl or alkoxy is halogen;

HA is selected from pharmaceutically acceptable inorganic and organic acids.

preferably, each of $X_1$ and $X_2$ is selected from the group consisting of $-F$, $-Cl$, $-Br$, $-CH_3$, $-OCH_3$, $-CF_3$, $-OCF_3$.

Further, said compound has a structure of formula IV:

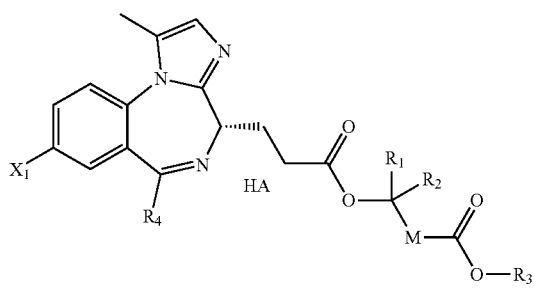

Formula IV wherein, $R_1$ is selected from the group consisting of H, short-chain hydrocarbon group, $C_{3-10}$ cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_1$ is a short-chain hydrocarbon group or hydrogen;

$R_2$ is selected from the group consisting of H, short-chain hydrocarbon group, $C_{3-10}$ cycloalkyl or 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S, preferably $R_2$ is H or a short-chain hydrocarbon group;

or $R_1$ and $R_2$ may be mutually joined to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl or alkoxy, and said heterocycle includes 1-3 heteroatoms selected from N, O or S;

M is absent or selected from the group consisting of O, S, NH or $C_{1-5}$ alkylene, wherein said alkylene is substituted with 0-4 substituents selected from the group consisting of halogen, trifluoromethyl and $C_{1-6}$ alkoxy, and preferably M is O;

$R_3$ is selected from the group consisting of H, short-chain hydrocarbon group and —$(CH_2)_a$—$(O)_b$—$R_5$, wherein $R_5$ can be $C_{3-10}$ cycloalkyl and 3-10 membered heterocyclic group. Said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, or —$NHC_{1-4}$ alkyl, and said heterocycle includes 1-3 heteroatoms selected from N, O, or S. Preferably, $R_3$ is a short-chain hydrocarbon group;

a is selected from 0, 1 and 2;

b is 0 or 1;

$R_4$ represents a pyridine ring with nitrogen at position 2, 3 or 4, and preferably, $R_4$ is a pyridine ring with nitrogen at position 2;

$X_1$ is selected from the group consisting of halogen, substituted or unsubstituted $C_{1-8}$ alkyl, substituted or unsubstituted $C_{1-8}$ alkoxy; the substituent of said alkyl or alkoxy is halogen;

HA is various pharmaceutically acceptable inorganic and organic acids;

preferably, each of $R_1$ or $R_2$ is independently selected from the group consisting of H, substituted or unsubstituted $C_{1-8}$ alkyl, substituted or unsubstituted $C_{3-10}$ cycloalkyl or substituted or unsubstituted 3-10 membered heterocyclic group; or $R_1$ and $R_2$ are mutually linked to form substituted or unsubstituted $C_{3-10}$ cycloalkyl or substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl and $C_{1-8}$ alkoxy; the heteroatom of the heterocyclic group is selected from N, O and S, and the number of heteroatoms is 1, 2 or 3;

$R_3$ is selected from the group consisting of H, $C_{1-8}$ alkyl, —$(CH_2)_a$—$(O)_b$—$R_5$; wherein $R_5$ is selected from the group consisting of substituted or unsubstituted $C_{3-10}$ cycloalkyl or substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl and —$NHR_6$; the heteroatom of the heterocyclic group is selected from N, O and S, and the number of heteroatoms is 1, 2 or 3; $R_6$ is selected from $C_{1-4}$ alkyl;

a is selected from 0, 1 and 2;

b is 0 or 1;

$R_4$ is selected from a pyridine ring with nitrogen at position 2, 3 or 4;

M is selected from the group consisting of none, O, S, NH or substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl and $C_{1-4}$ alkoxy;

$X_1$ is selected from the group consisting of halogen, substituted or unsubstituted $C_{1-8}$ alkyl, substituted or unsubstituted $C_{1-8}$ alkoxy; the substituent of said alkyl or alkoxy is halogen;

HA is selected from pharmaceutically acceptable inorganic and organic acids.

Further, said compound has a structure of formula IV-A:

IV-A

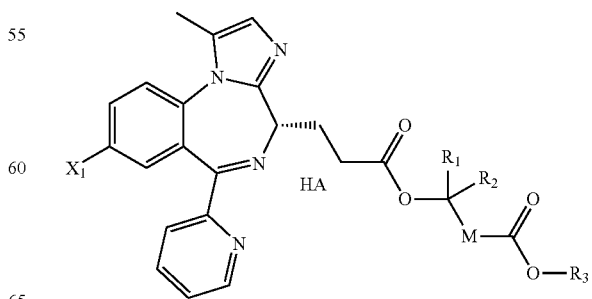

wherein, each of $R_1$ or $R_2$ is independently selected from the group consisting of H, substituted or unsubstituted $C_{1-3}$ alkyl, substituted or unsubstituted $C_{3-5}$ cycloalkyl or substituted or unsubstituted 3-5 membered heterocyclic group; or $R_1$ and $R_2$ are mutually linked to form substituted or unsubstituted $C_{3-6}$ cycloalkyl or substituted or unsubstituted 3-6 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-3}$ alkyl and $C_{1-3}$ alkoxy; the heteroatom of the heterocyclic group is selected from N, O and S, and the number of heteroatoms is 1, 2 or 3;

$R_3$ is selected from the group consisting of H, $C_{1-8}$ alkyl, $-(CH_2)_a-(O)_b-R_5$; wherein $R_5$ is selected from the group consisting of substituted or unsubstituted $C_{4-6}$ cycloalkyl or substituted or unsubstituted 4-6 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl and $-NHR_6$; the heteroatom of the heterocyclic group is selected from N, O and S, and the number of heteroatoms is 1, 2 or 3; $R_6$ is selected from $C_{1-4}$ alkyl;

a is selected from 0, 1 and 2;
b is 0 or 1;
M is selected from the group consisting of none, O, S, NH or substituted or unsubstituted $C_{1-3}$ alkylene; the number of substituents of said substituted alkylene is 1, 2, 3 or 4, and the substituents of said substituted alkylene are selected from the group consisting of halogen, trifluoromethyl and $C_{1-2}$ alkoxy;
$X_1$ is selected from the group consisting of halogen, substituted or unsubstituted $C_{1-6}$ alkyl, substituted or unsubstituted $C_{1-6}$ alkoxy; the substituent of said alkyl or alkoxy is halogen;
HA is selected from pharmaceutically acceptable inorganic and organic acids.
preferably,
$X_1$ is selected from the group consisting of —F, —Cl, —Br, —CH$_3$, —OCH$_3$, —CF$_3$, —OCF$_3$.

Further, said inorganic acid is selected from the group consisting of hydrochloric acid, sulfuric acid, phosphoric acid, carbonic acid, hydrobromic acid or boric acid; said organic acid is selected from the group consisting of formic acid, acetic acid, oxalic acid, adipic acid, L-aspartic acid, fumaric acid, benzoic acid (2S,3S,4S,5R)-2,3,4,5-tetrahydroxy-6-oxohexanoic acid, 2-hydroxyethane-1-sulfonic acid, 2-hydroxypropane-1,2,3-tricarboxylic acid, 2-hydroxypropionic acid, sulfonic acid, p-toluenesulfonic acid, methanesulfonic acid, 2-hydroxysuccinic acid, stearic acid, (S)-5-oxopyrrolidine-2-carboxylic acid, 2-hydroxy-1-naphthoic acid, nicotinic acid, 1-naphthoic acid, malonic acid, tartaric acid or maleic acid.

Further, said compound is selected from any one of the following compounds:

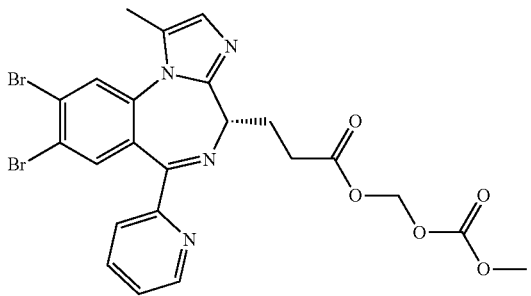

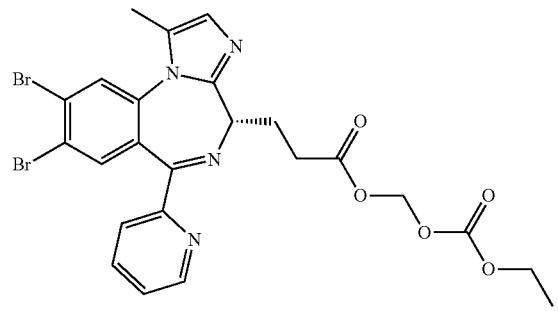

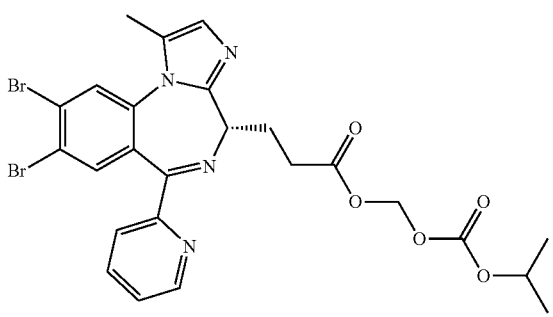

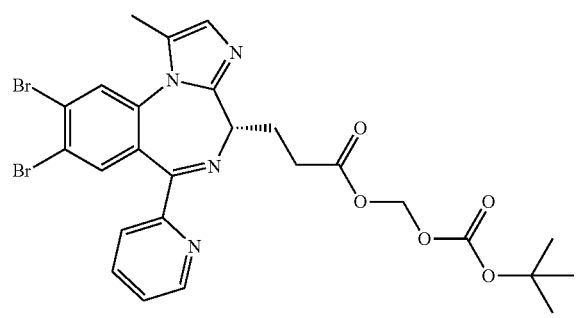

13
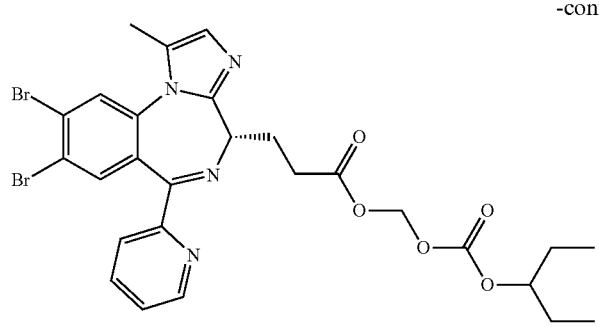
14
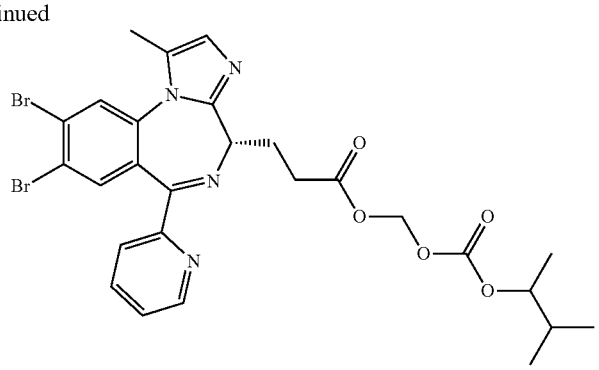
-continued
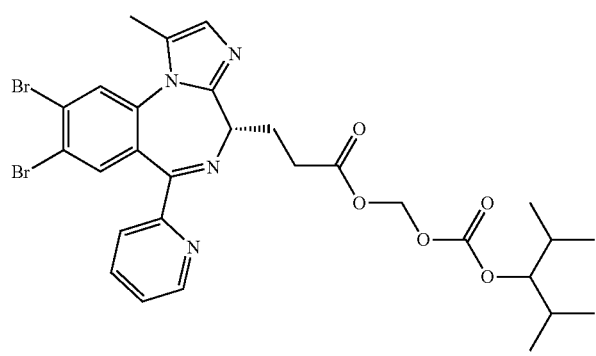
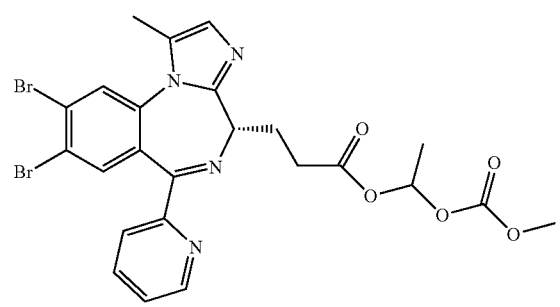
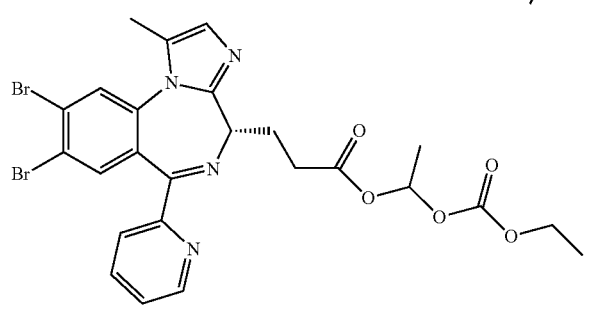
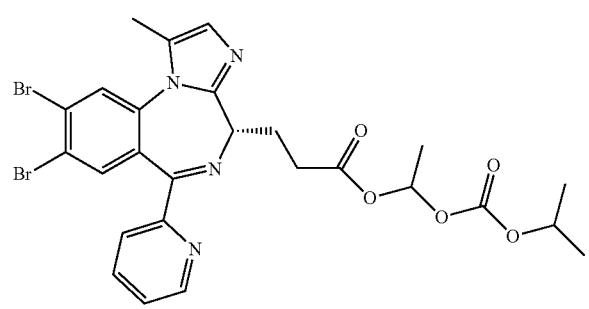
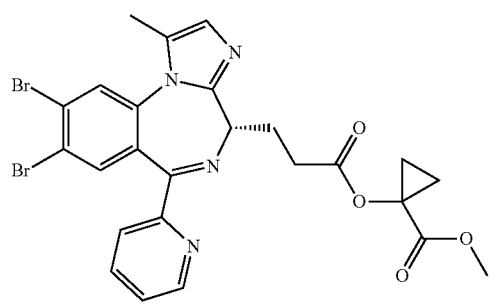
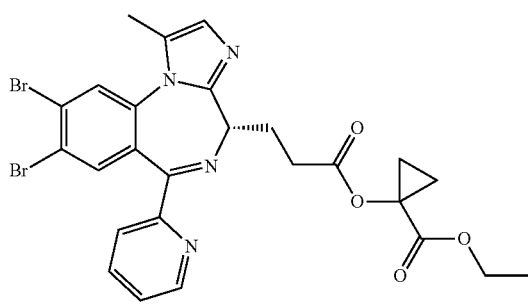
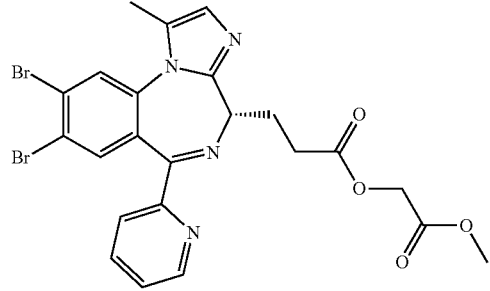
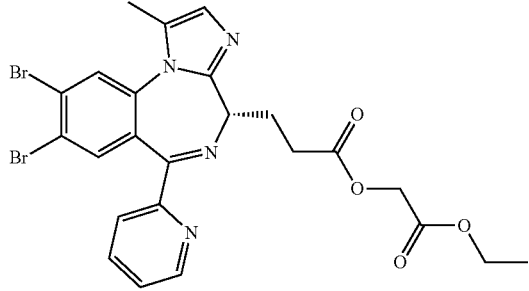

15
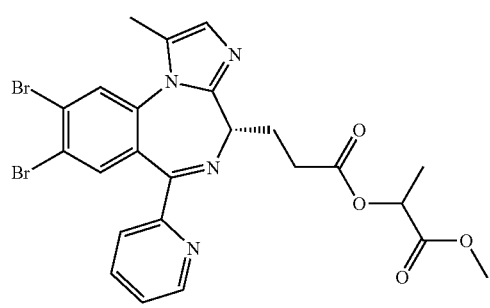
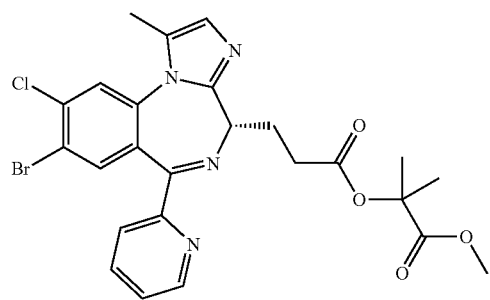
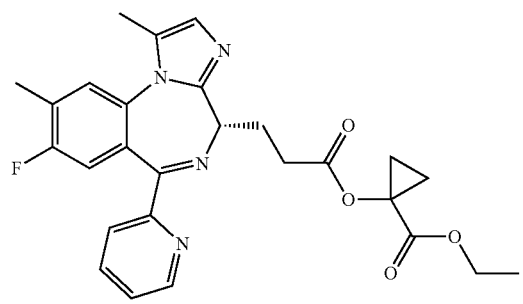
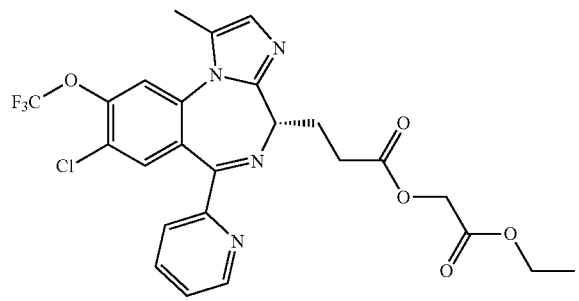
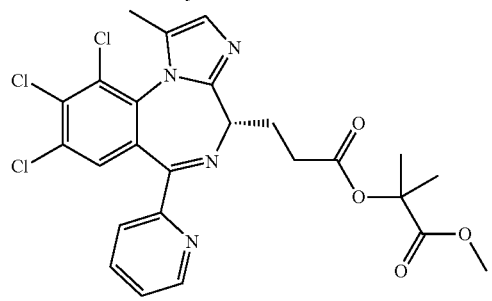
16
-continued
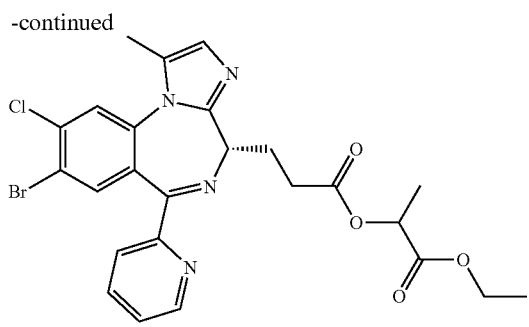
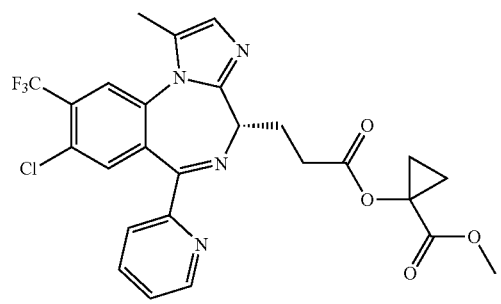
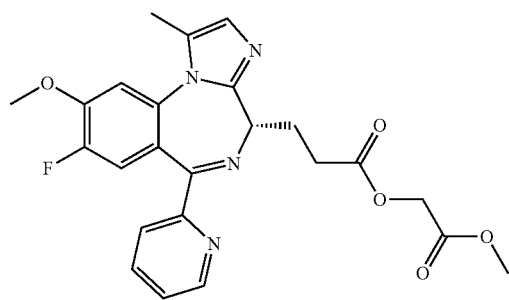
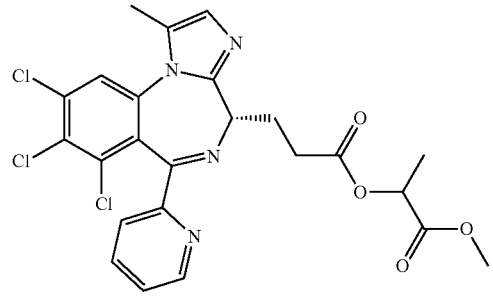
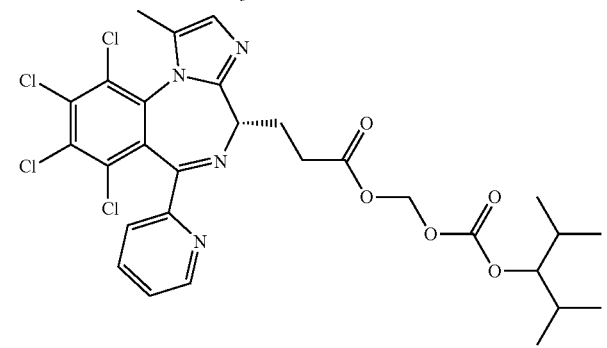

-continued
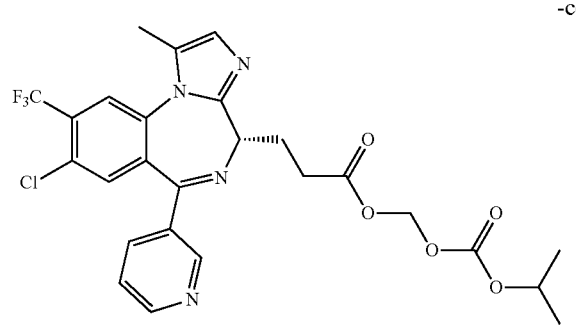
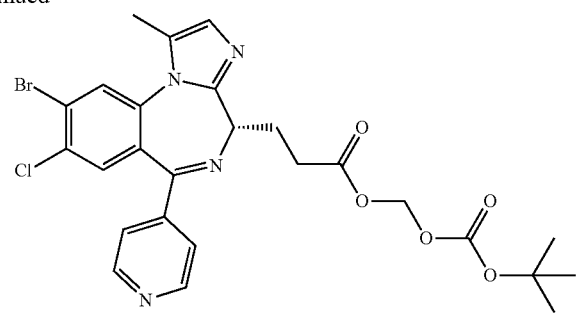
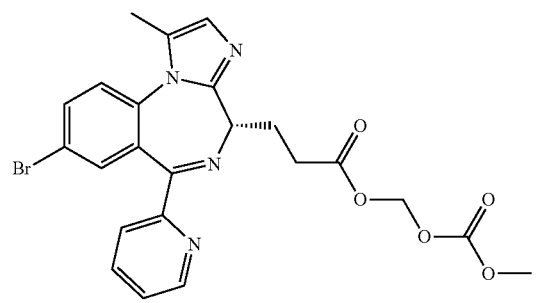
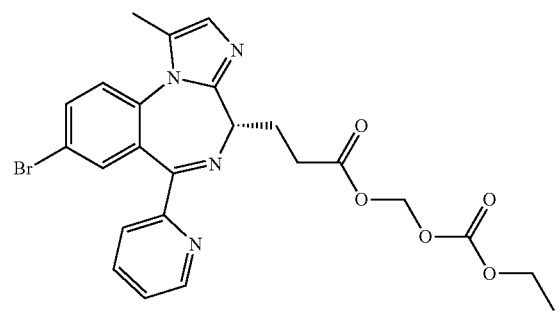
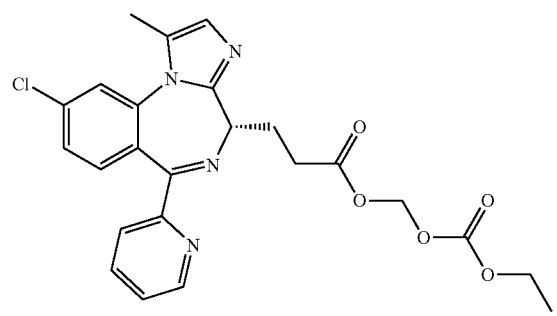
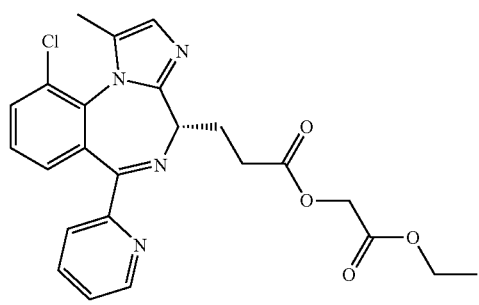
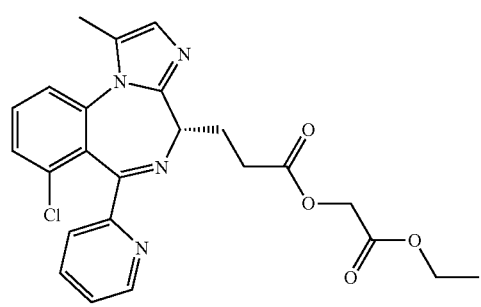
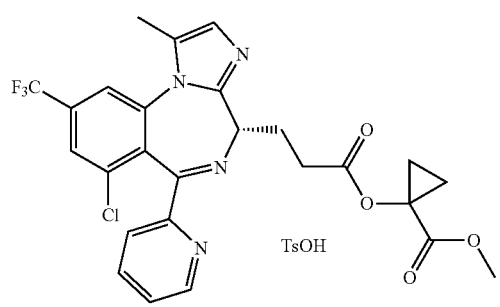
TsOH
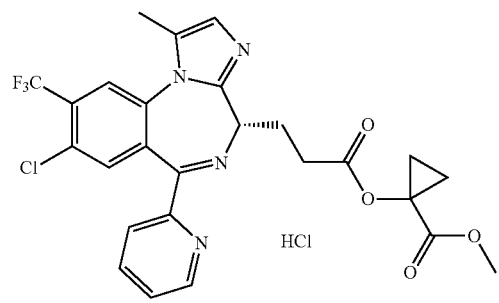
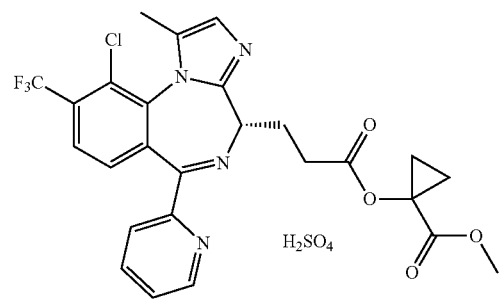
HCl
$H_2SO_4$ 19
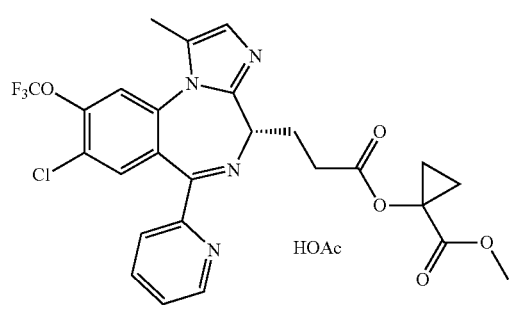
-continued
20
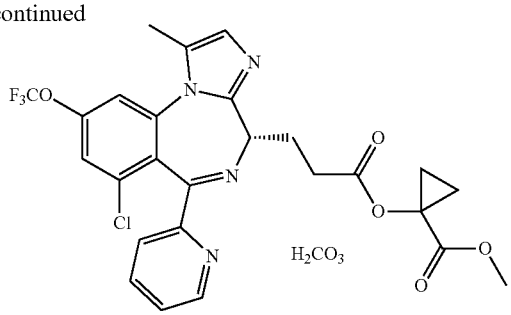
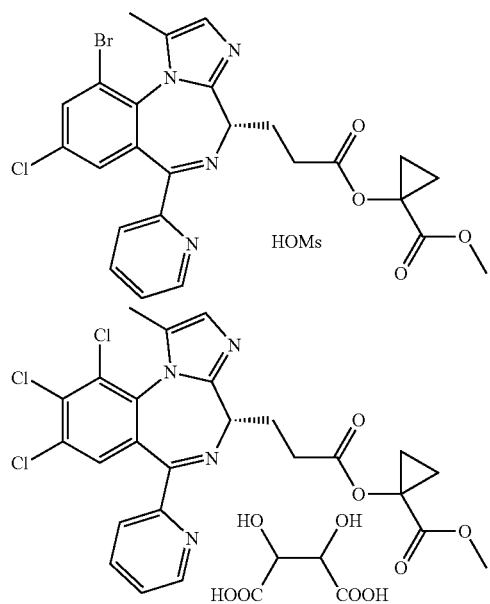
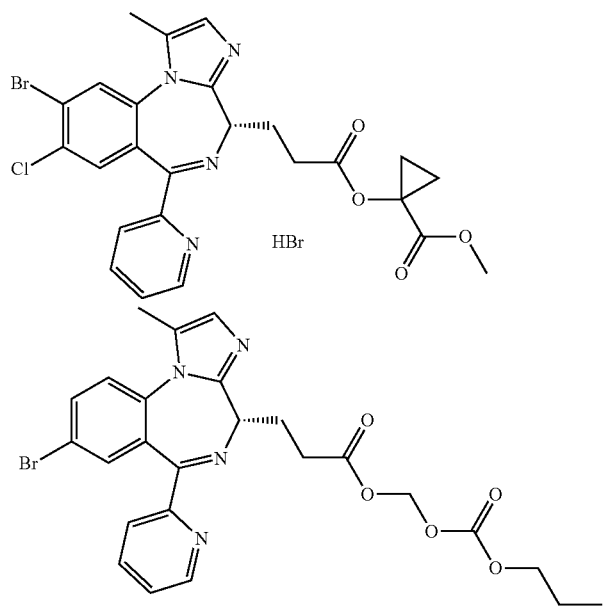
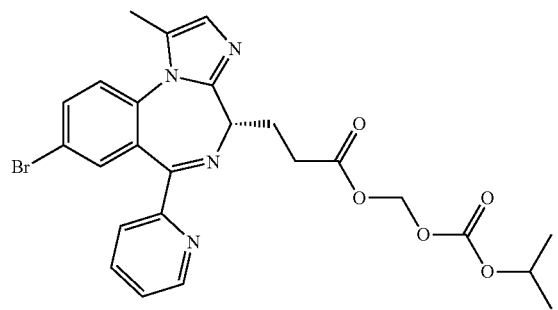 [SMILES: Cc1cnc2n1-c1ccc(Br)cc1C(c1ccccn1)=N[C@H]2CCC(=O)OCOC(=O)OC(C)C]
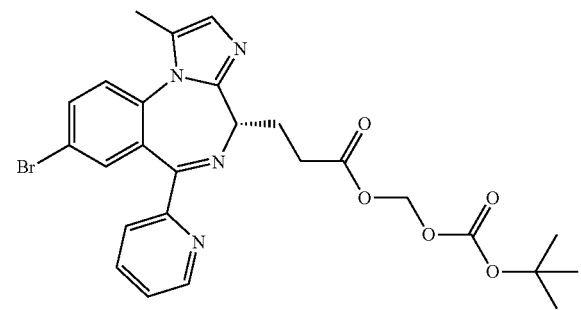 [SMILES: Cc1cnc2n1-c1ccc(Br)cc1C(c1ccccn1)=N[C@H]2CCC(=O)OCOC(=O)OC(C)(C)C]
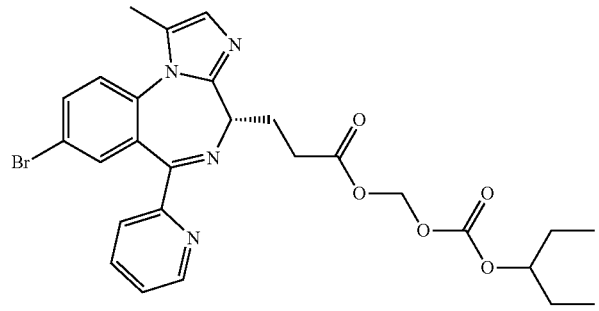 [SMILES: CCC(CC)OC(=O)OCOC(=O)CC[C@@H]1N=C(c2ccccn2)c2cc(Br)ccc2-n2c(C)cnc21]
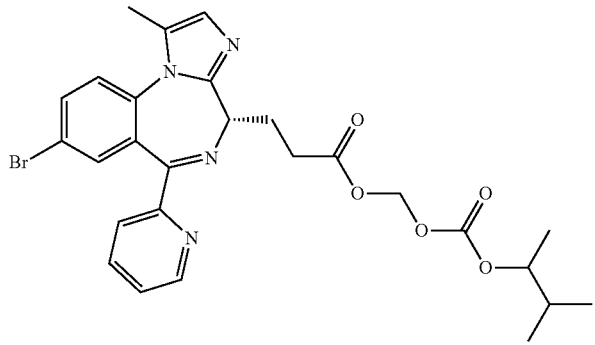

-continued
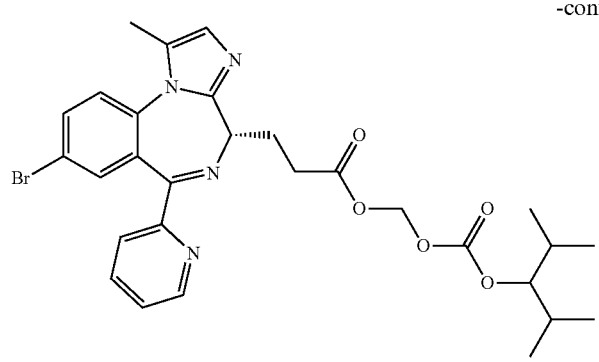
21
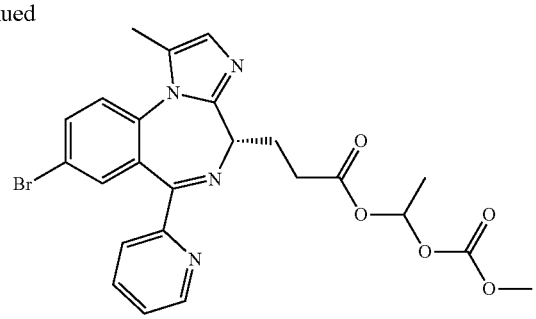
22
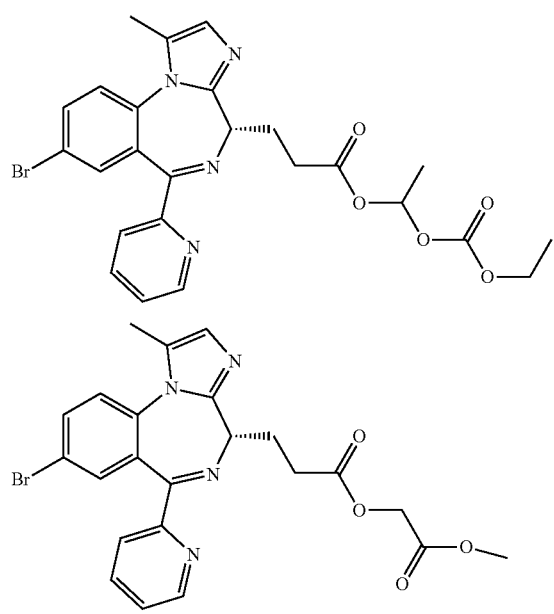
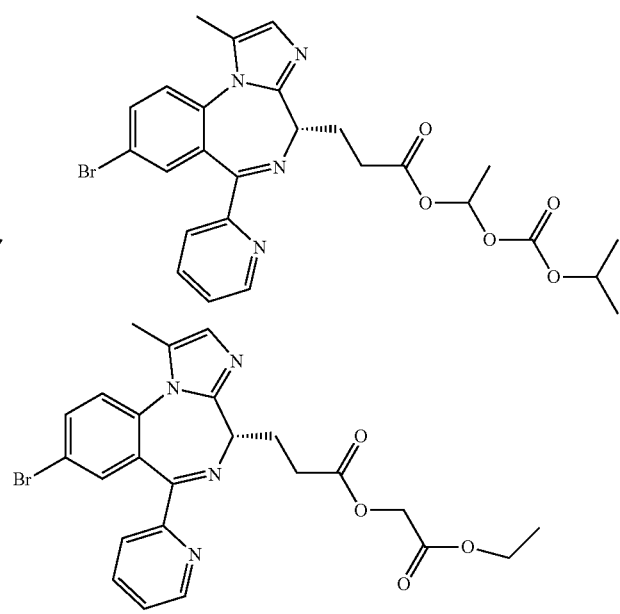
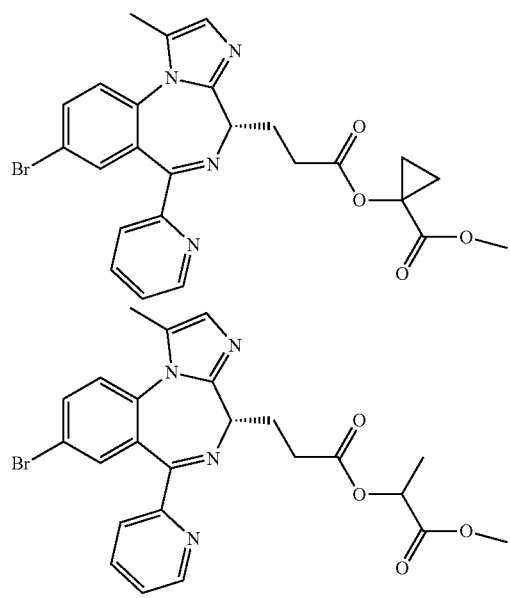
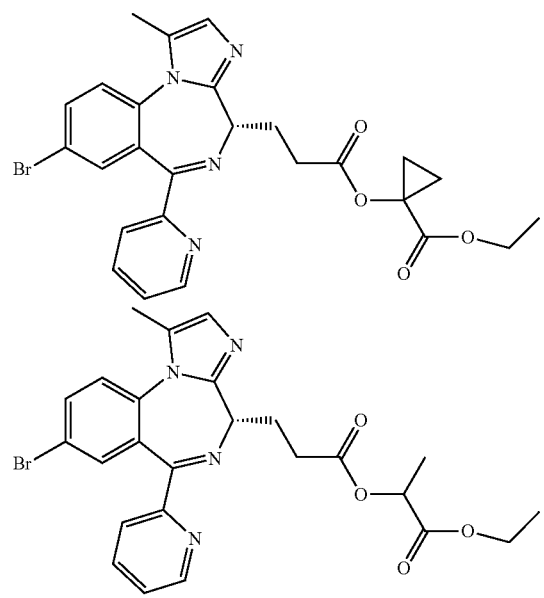

23
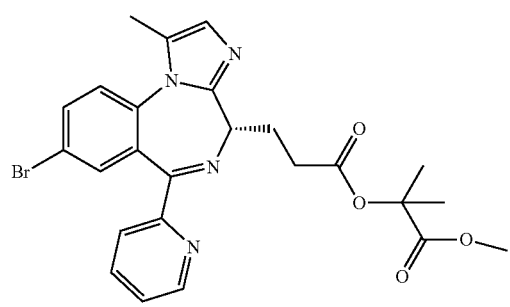 [SMILES: COC(=O)C(C)(C)OC(=O)CC[C@@H]1N=C(c2ccccn2)c2cc(Br)ccc2-n2c(C)cnc21]
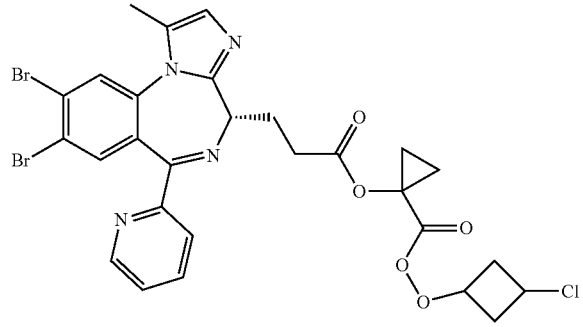
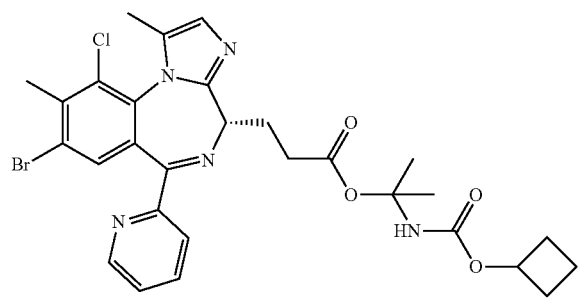
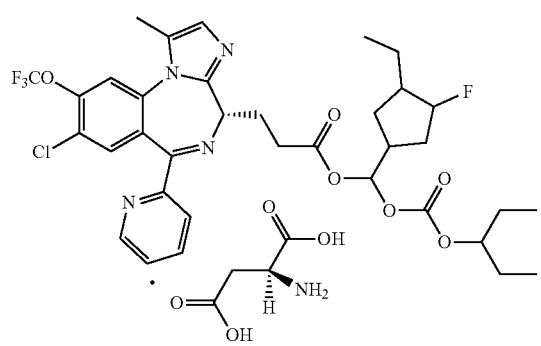
24
-continued
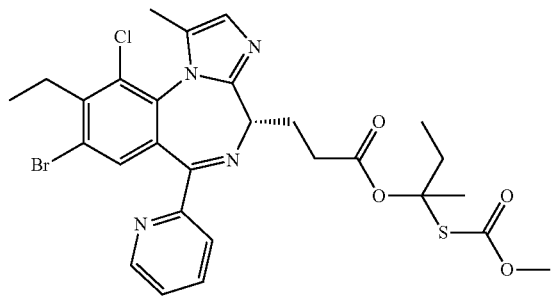 [SMILES: CCc1c(Br)cc2c(c1Cl)-n1c(C)cnc1[C@H](CCC(=O)OC(C)(CC)SC(=O)OC)N=C2c1ccccn1]
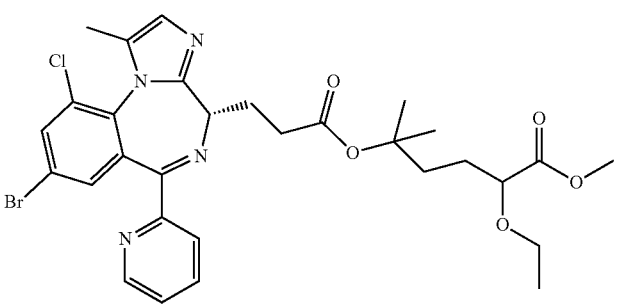
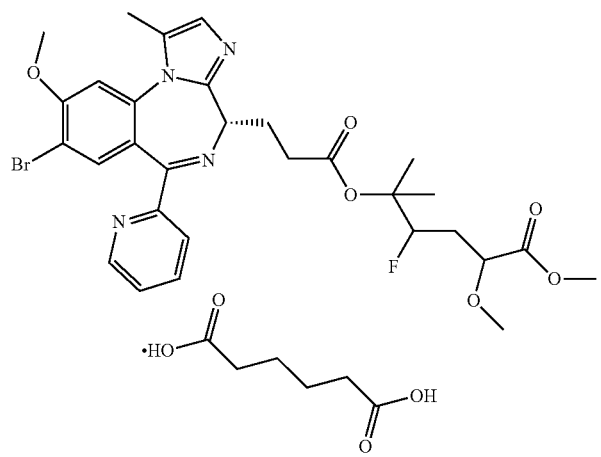
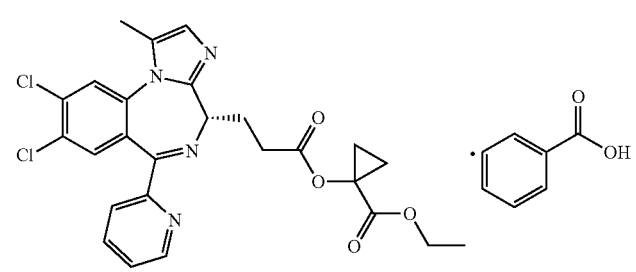
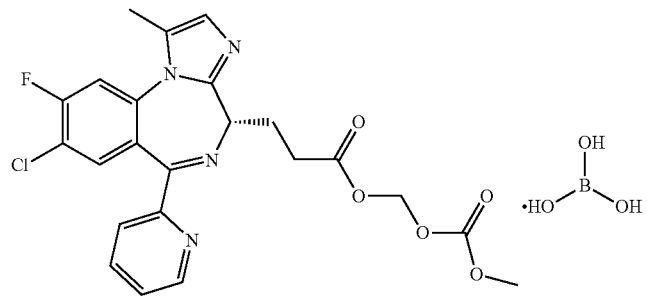

-continued
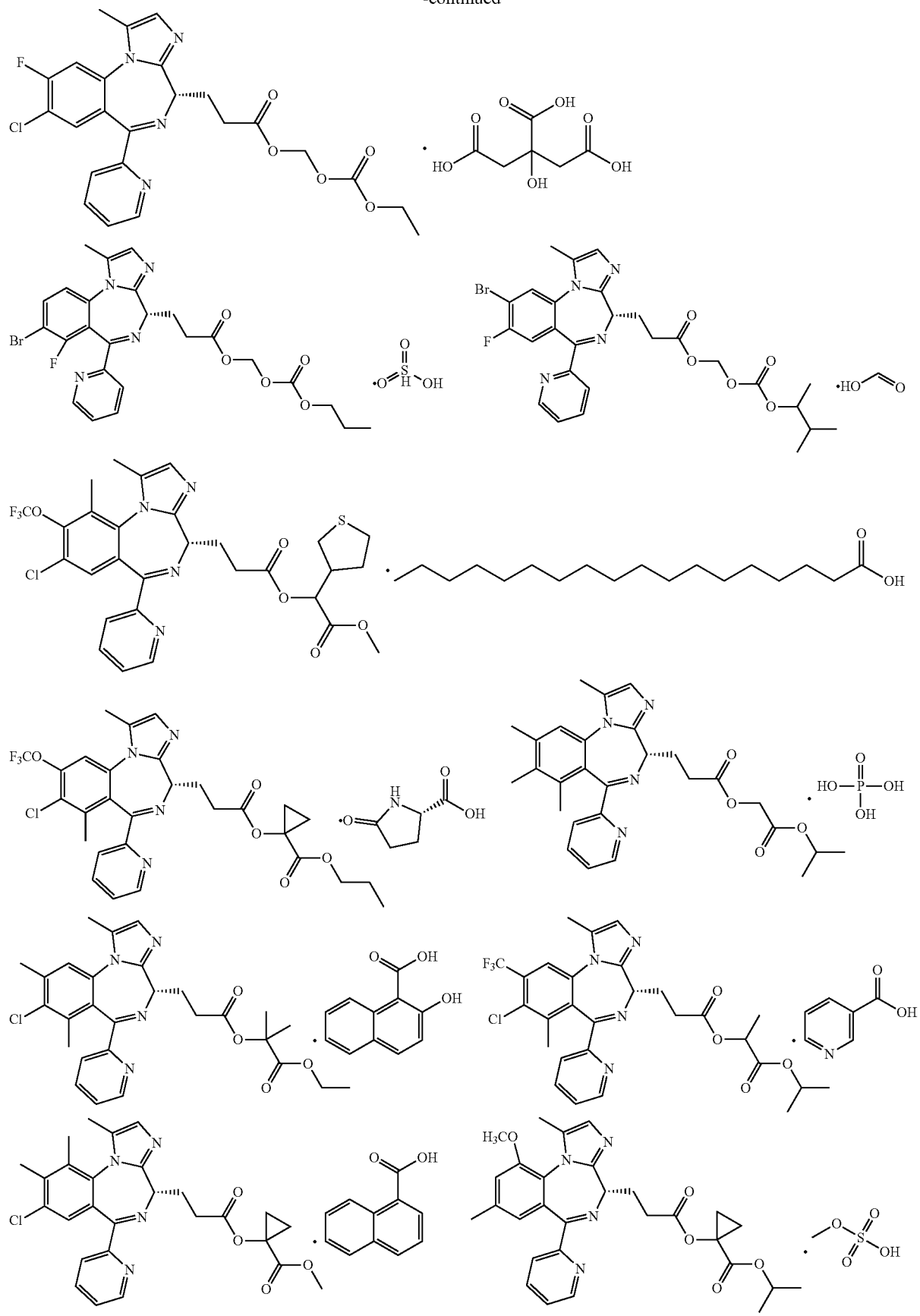

27
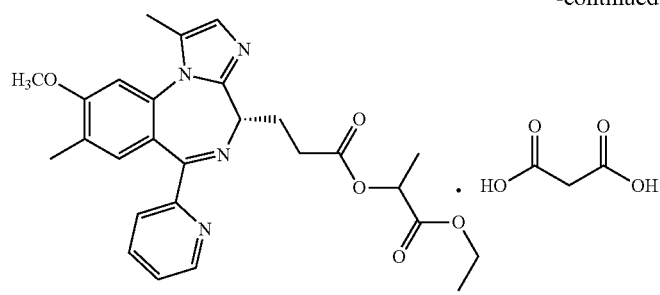
28
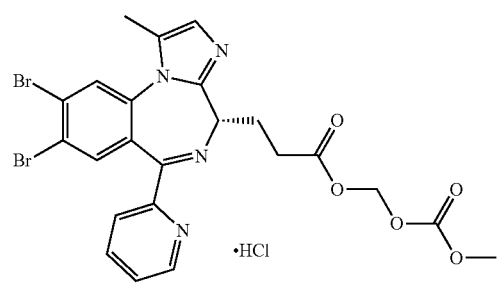
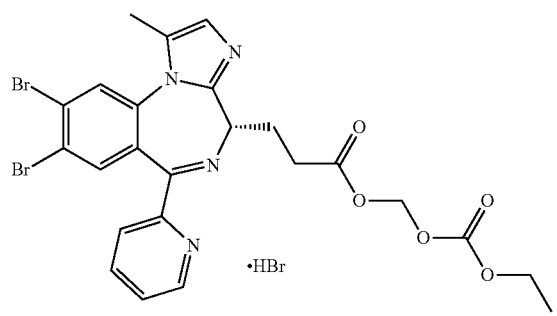
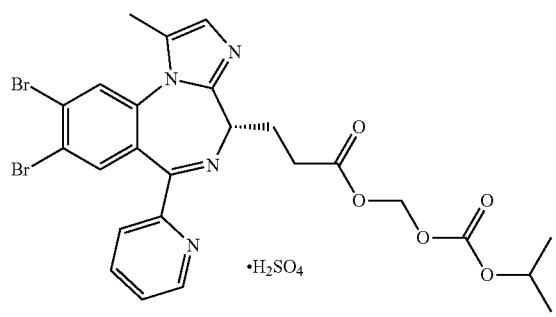
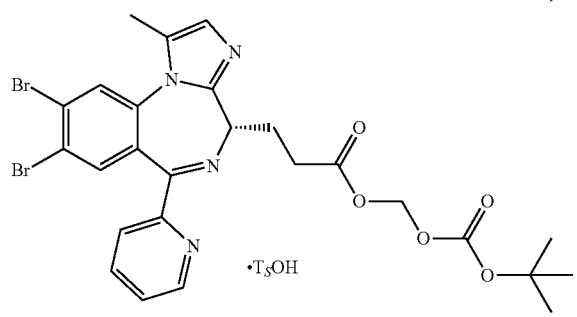
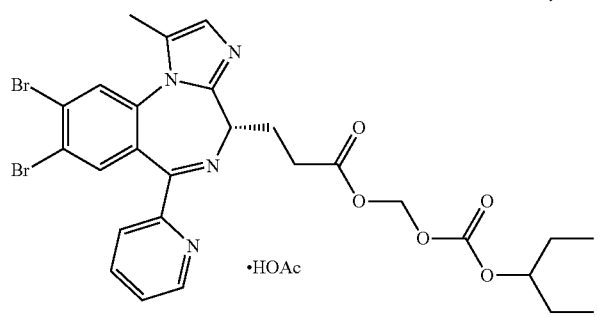
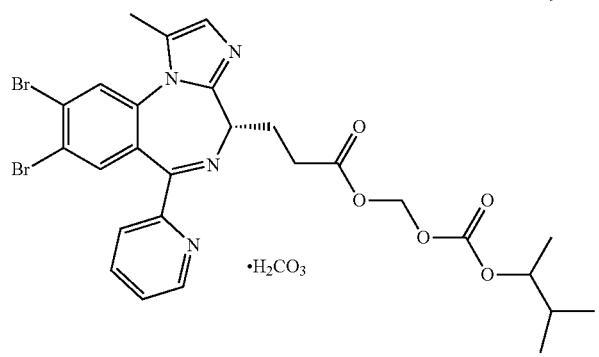
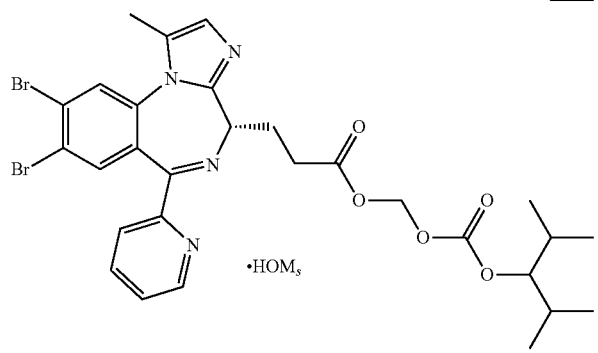
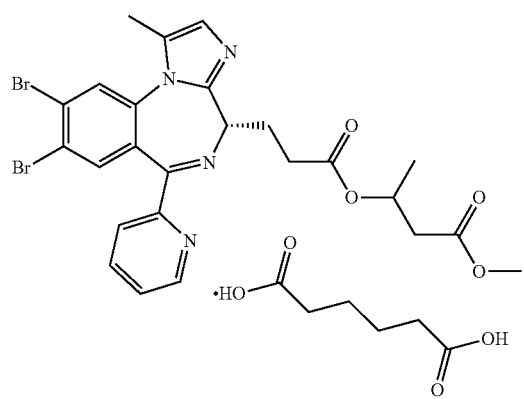
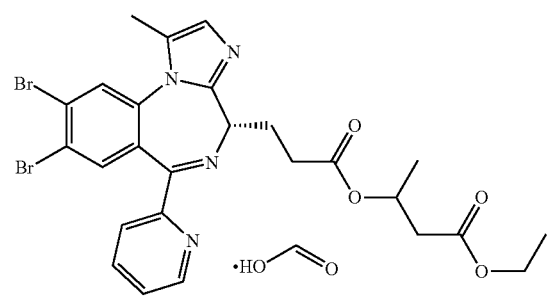

-continued
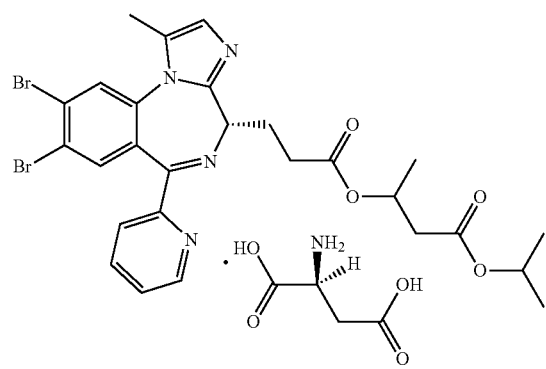
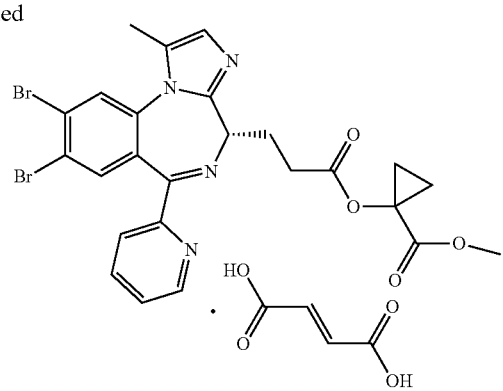
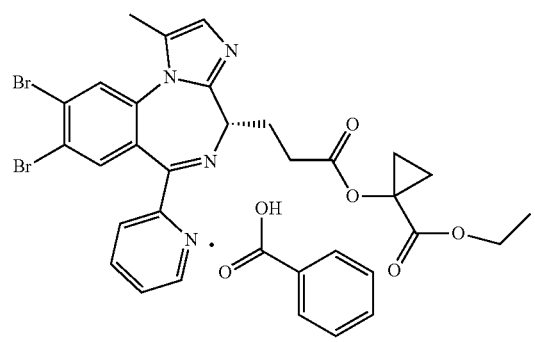
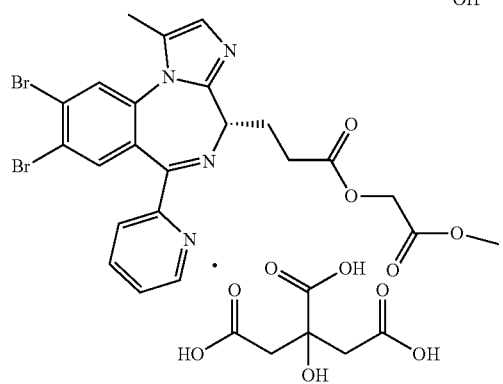
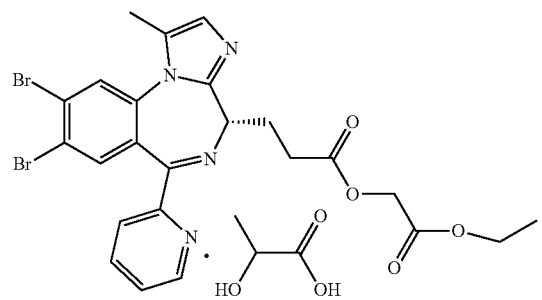
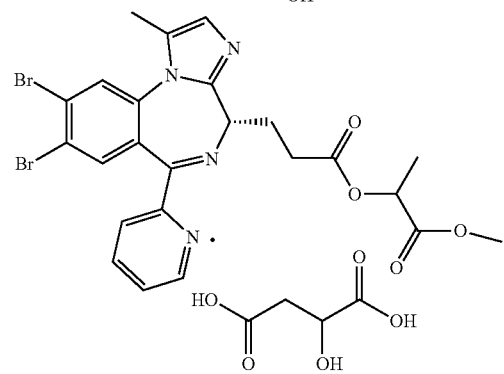
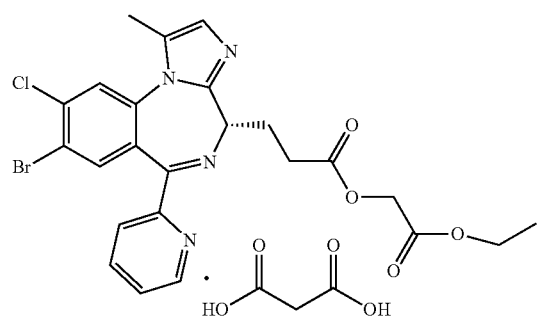
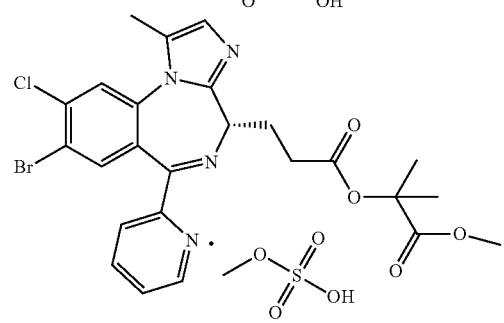
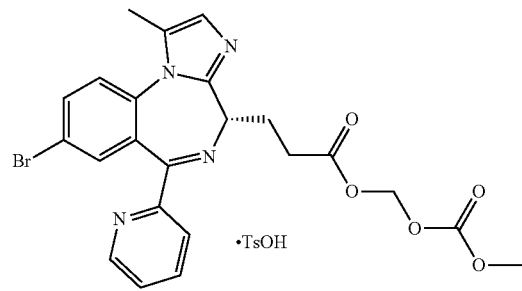
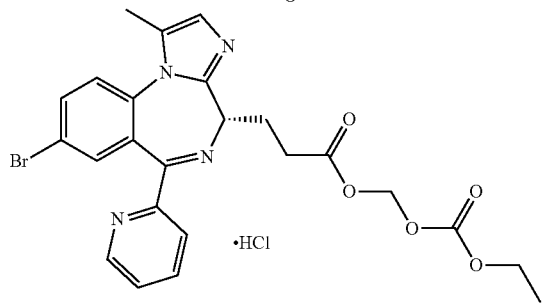

31
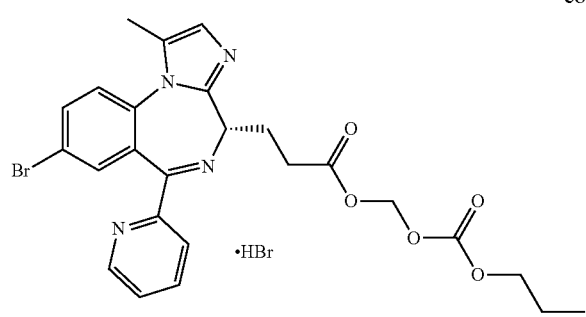
32
-continued
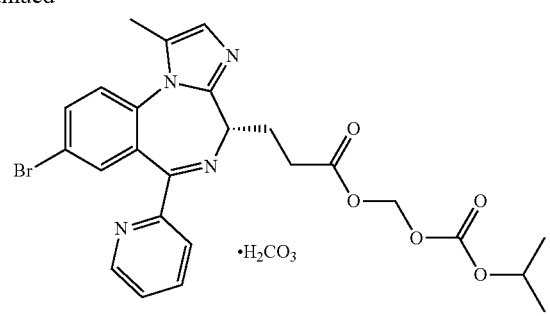
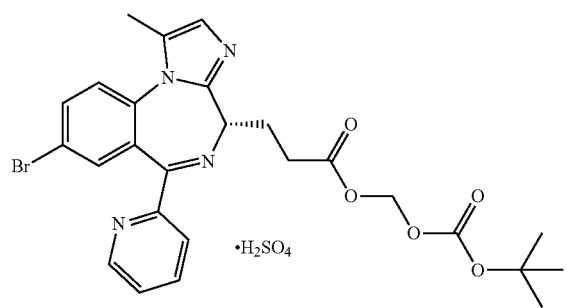
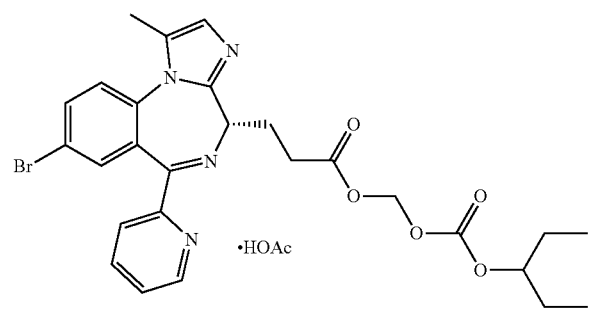
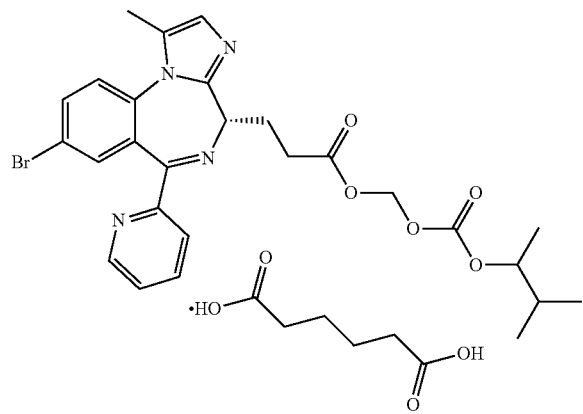
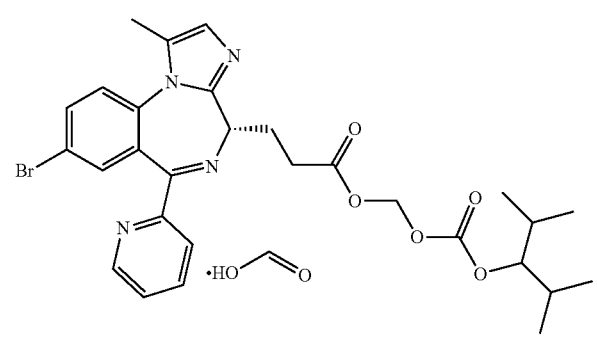
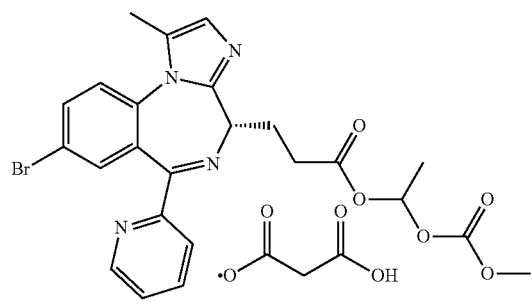
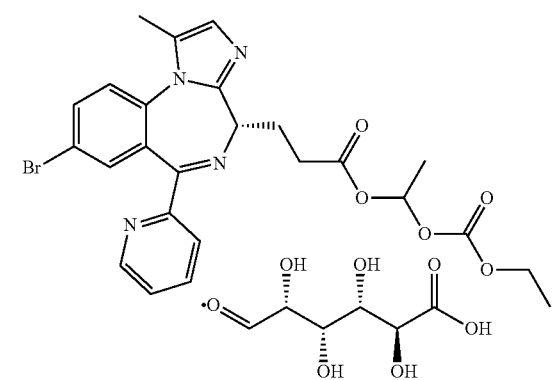

33 34
-continued
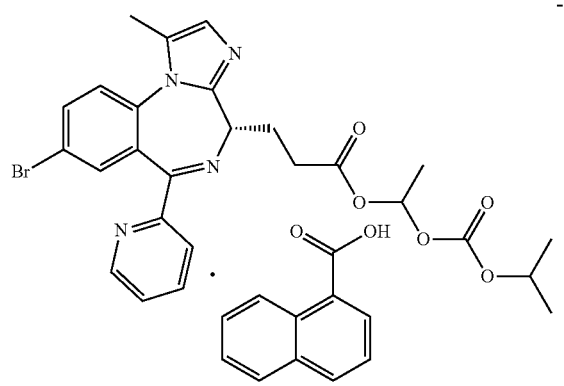
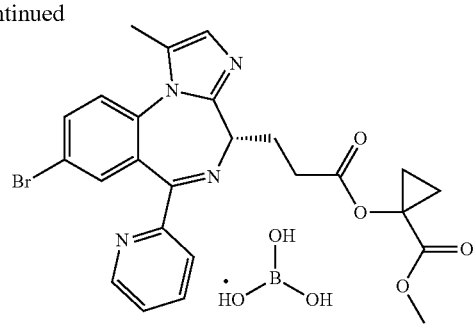
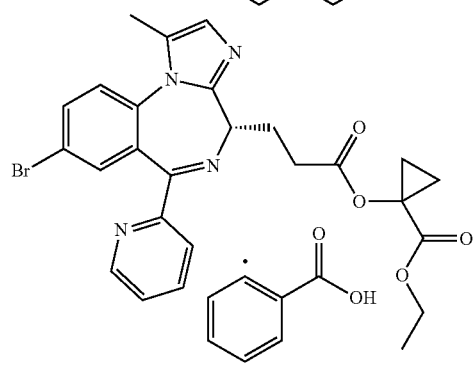
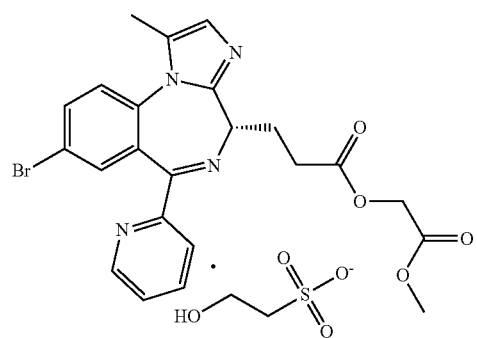
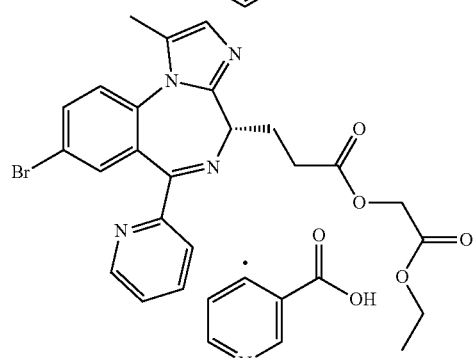
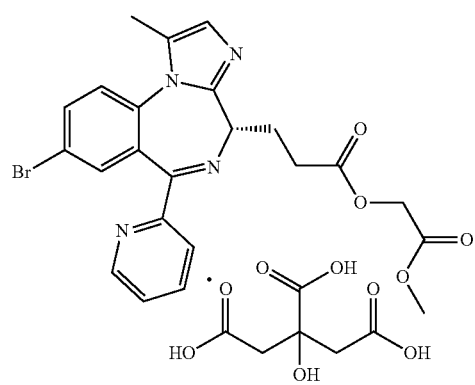
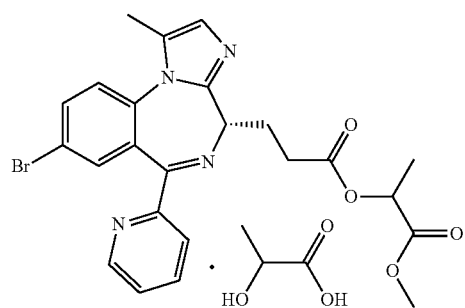
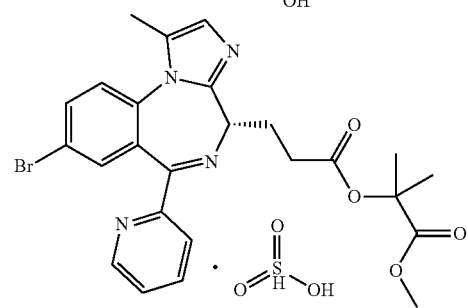
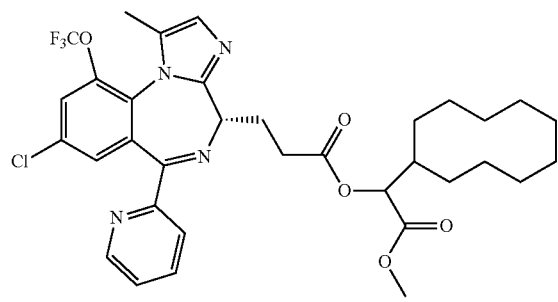
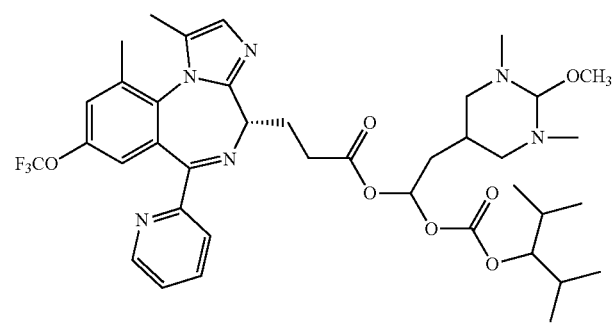

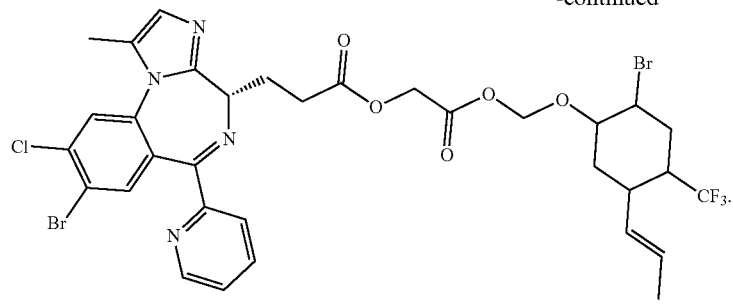

The present invention provides the preparation method for compounds mentioned above, or a salt thereof, or a stereoisomer thereof, or a solvate thereof, or a cocrystallization thereof, or a composition thereof, which includes the following steps:

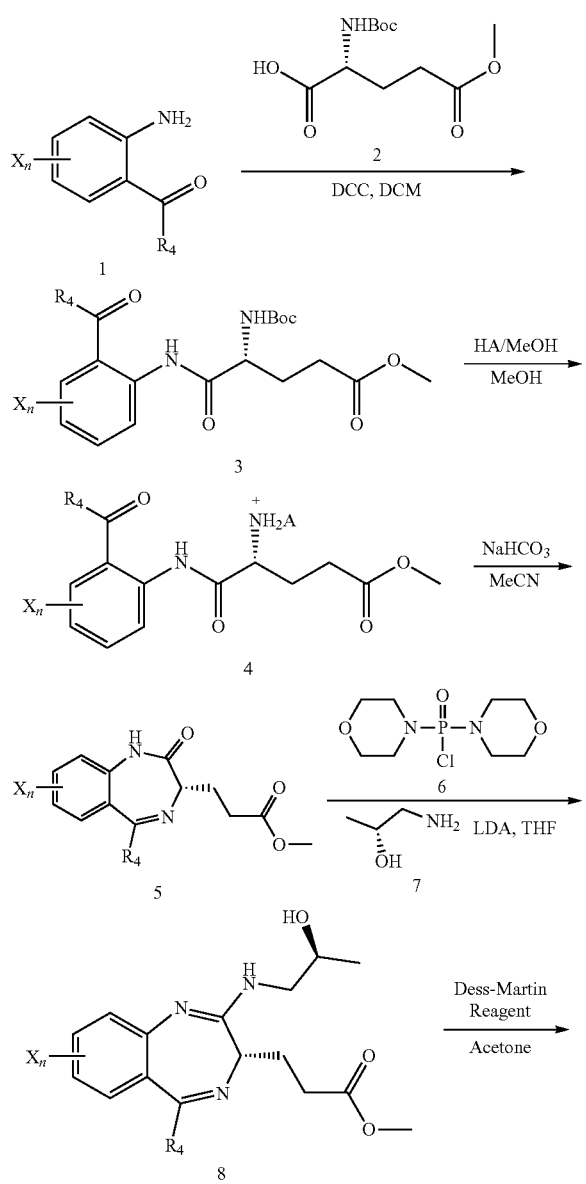

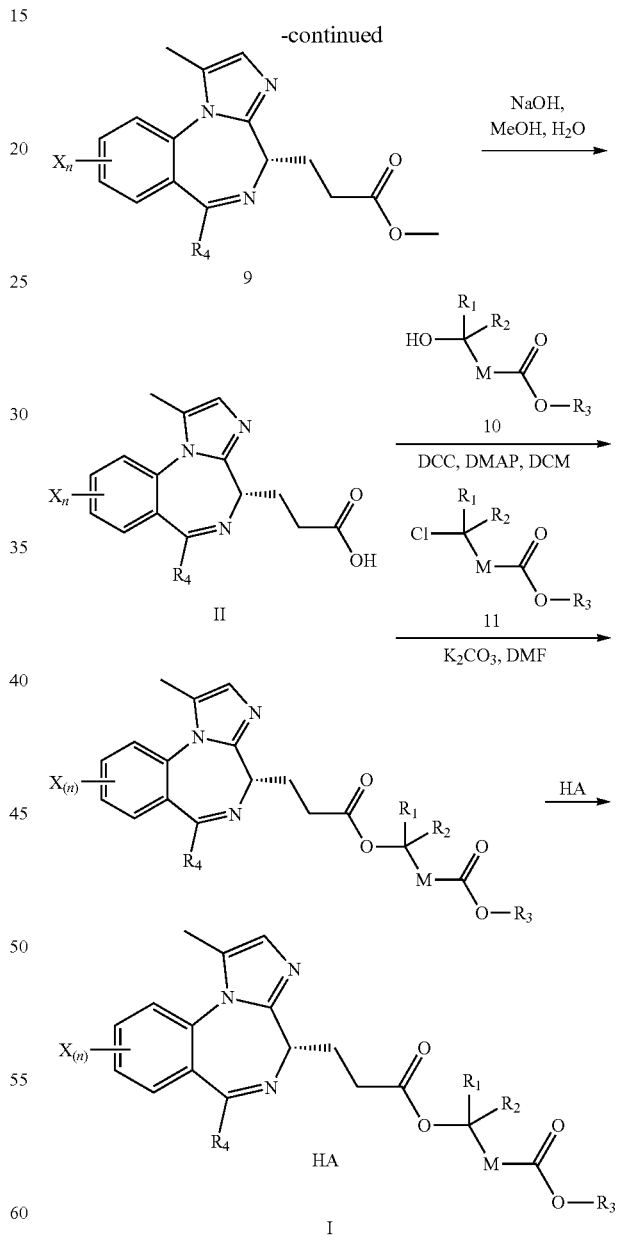

The starting materials polysubstituted o-aminobenzoylpyridine 1 and Boc-L-glutamic acid 5-methyl ester 2 react in DCM in the presence of DCC, to provide 2-(5-methoxycarbonyl-Boc-L-glutamic acid)amino(polysubstituted) benzoylpyridine 3; 2-(5-methoxycarbonyl-L-glutamic acid)

amino(polysubstituted) benzoylpyridine salt 4 is obtained by removing Boc protective group of 3 in methanol in the presence of acid; polysubstituted benzdiazepinepropionate 5 is synthesized by an intramolecular condensation reaction of 4 in acetonitrile in the presence of sodium bicarbonate; the reaction of compound 5 with dimorpholinophosphinyl chloride 6 and (R)-1-amino-2-propoanol 7 in THF in the presence of LDA produced (R)—N-(propionate-3-yl(polysubstituted)benzdiazepine) amino-2-propanol 8; compound 8 is subjected to the oxidation and ring-closing reaction in acetone in the presence of Dess-Martin Reagent, to provide pyridyl imidazobenzodiazepinepropionate 9; compound 9 is hydrolyzed in the presence of sodium hydroxide, to obtain the target intermediate pyridyl imidazobenzodiazepinepropionic acid II, which is reacted with compound 10 or 11 and then treated with acid, to provide the target compound pyridylimidazobenzodiazepinepropionate (compound I);
wherein $R_1$, $R_2$, $R_3$, $R_4$, M, X, n and HA are as described in claim 1;
preferably,
for the reaction of compound 1, compound 2 with DCC, the equivalent ratios are 1:0.8-2.5 and 1:0.8-2.5; for the reaction of compound 3 with acid, the equivalent ratio is 1:0.9-2; for the reaction of compound 4 with sodium bicarbonate, the equivalent ratio is 1:15-20; for the reaction of compound 5 with compound 7, the equivalent ratio is 1:1.0-2.5; for the reaction of compound 8 with Dess-Martin Reagent, the equivalent ratio is 1:2-3, and the reaction temperature is 35-60° C.; for the reaction of the target intermediate (II) with compound 10 or 11, the equivalent ratio is 1:1.0-2.2, and the reaction temperature is 30-50° C.;
and/or, in the final step of forming salt, the equivalent ratio for the reaction with acid is 1:1-2.

The present invention also provides the use of the compound mentioned above, or a salt thereof, or a stereoisomer thereof, or a solvate thereof, or a cocrystallization thereof, or a composition thereof in the preparation of sedatives and/or anesthetics;
preferably, said sedative and/or anesthetic is a sedative and/or anesthetic administered intravenously.

The present invention further provides a drug, which is a preparation obtained by using a compound mention above, or a salt thereof, or a stereoisomer thereof, or a solvate thereof, or a cocrystallization thereof, or a composition thereof as active ingredients, with the addition of pharmaceutically acceptable excipients or auxiliary ingredients;
preferably, said drug is a sedative and/or anesthetic;
more preferably, said sedative and/or anesthetic is a sedative and/or anesthetic administered intravenously.

In the present invention, the room temperature is "25±5° C.", and "overnight" is "12±2 h".

The compounds and derivatives provided in the present invention can be named according to IUPAC (International Union of Pure and Applied Chemistry) or CAS (Chemical Abstracting Service, Columbus, Ohio) naming system.

In the present invention, "substitution" means that the hydrogen in a molecule is substituted with other different atoms or molecules.

In the present invention, the minimum and maximum values of carbon content in a hydrocarbon group are represented by prefixes. For example, Ca-b alkyl indicates any alkyl containing "a" to "b" carbon atoms. Therefore, for example, $C_{1-10}$ alkyl denotes a linear or branched alkyl having 1-10 carbon atoms; $C_{1-10}$ alkoxy denotes an alkoxy having 1-10 carbon atoms.

In the present invention, a short-chain hydrocarbon group is a linear or branched alkyl having 1 to 10 carbon atoms.

In the present invention, $C_{3-10}$ cycloalkyl denotes a saturated alkyl, which is composed of 3 to 10 carbon atoms.

In the present invention, 3-10 membered heterocyclic group means a saturated heterocyclic group, which is composed of 3 to 10 atoms, in which at least one atom is selected from O, S or substituted nitrogen and silicon.

In the present invention, Halogen is fluorine, chlorine, bromine or iodine.

The compound of the present invention has a good intravenous sedative anesthesia effect, and the anesthesia effect is comparable to that of remimazolam and even better than that of remimazolam, particularly seen in that the effective dose is significantly decreased, and the duration time and recovery time are significantly reduced. At the same time, the recovery quality of the compound according to the present invention is significantly improved compared with remimazolam in rat and mouse caudal venous anesthesia models. During anesthetization, the compound has a rapid onset, a short duration, a quick recovery and a good tolerance, can be used for anesthesia induction, anesthesia maintenance and day surgery anesthesia, and has good application prospects.

Obviously, based on the above content of the present invention, according to the common technical knowledge and the conventional means in the field, without department from the above basic technical spirits, other various modifications, alternations, or changes can further be made.

By following specific examples of said embodiments, the above content of the present invention is further illustrated. But it should not be construed that the scope of the above subject matter of the present invention is limited to the following examples. The techniques realized based on the above content of the present invention are all within the scope of the present invention.

EXAMPLES

The starting materials and equipment used in the specific examples of the present invention are all known products and can be obtained by purchasing commercially available products.

Example 1 Preparation of Intermediate 1 of the Present Invention

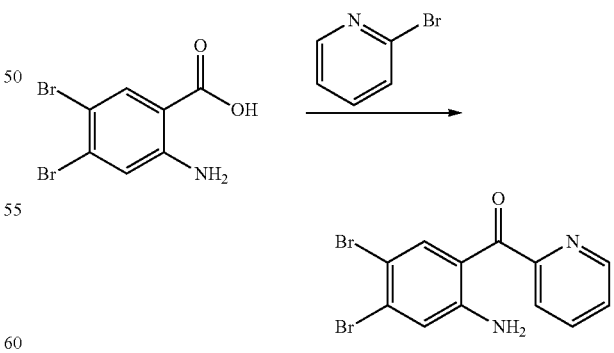

At the temperature of −40° C., to a three-neck bottle containing 20 ml (27.12 mmol, 4.0 eq) of n-butyl lithium (2.5 M) and 40 ml of anhydrous ethyl ether, was added 5.25 ml (29.83 mmol, 4.4 eq) of 2-bromopyridine, and the reaction was stirred for 1 h, to which was then added the solution of 2.0 g (6.78 mmol, 1.0 eq) 2-amino-4,5-dibromobenzoic acid in 30 ml of tetrahydrofuran dropwise. The mixture was allowed to react at 0° C. for 3 h. The sample was collected and subjected to TLC. After the reaction of raw materials was basically completed, ice water was added. The reaction solution was extracted with ethyl acetate. The organic phase was combined, dried over anhydrous sodium sulfate, filtered, and concentrated under reduced pressure to obtain an oil, which was subjected to column chromatography to provide 2.17 g of yellow solid (intermediate 1).

$^1$H NMR (in CDCl$_3$): δ 8.78 (d, 1H), 8.43 (d, 1H), 8.07 (d, 1H), 7.96-7.82 (m, 2H), 6.87 (d, 1H). MS: m/z 355.90 (M+1).

Example 2 Preparation of Intermediate 2 of the Present Invention

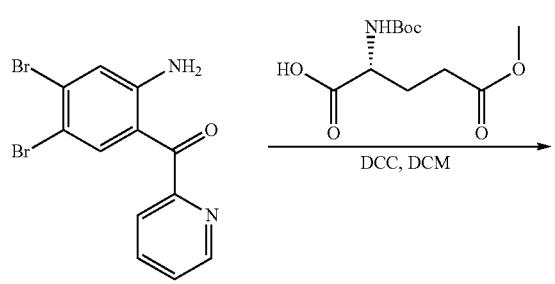

2.0 g (5.62 mol, 1.0 eq) of 2-amino-4,5-dibromophenyl-pyridin-2-yl-ketone and 2.8 g (10.72 mmol, 1.9 eq) of (R)-2-tert-butoxycarbonyl-amino-5-methoxy-5-oxovanoic acid were dissolved in 30 mL of dichloromethane (DCM), to which was added 2.2 g (10.68 mmol, 1.9 eq) of DCC (dicyclohexylcarbodiimide) in an ice bath. The mixture was reacted overnight at room temperature. The sample was collected and subjected to TLC, indicating the reaction of raw materials was basically completed. Then, the reaction solution was filtered and concentrated under reduced pressure. The residue was purified by column chromatography, to provide 3.3 g of light yellow oil (intermediate 2).

$^1$H NMR (in CDCl$_3$): δ 11.36 (s, 1H), 8.74 (d, J=4.8 Hz, 1H), 8.57 (d, J=9.0 Hz, 1H), 7.99-7.92 (m, 3H), 7.67 (dd, J=9.0, 2.2 Hz, 1H), 7.56-7.51 (m, 1H), 5.42 (d, J=6.6 Hz, 1H), 4.35 (s, 1H), 3.68 (s, 3H), 2.54-2.24 (m, 4H), 1.44 (s, 9H). MS: m/z 600.28 (M+1).

Example 3 Preparation of Intermediate 3 of the Present Invention

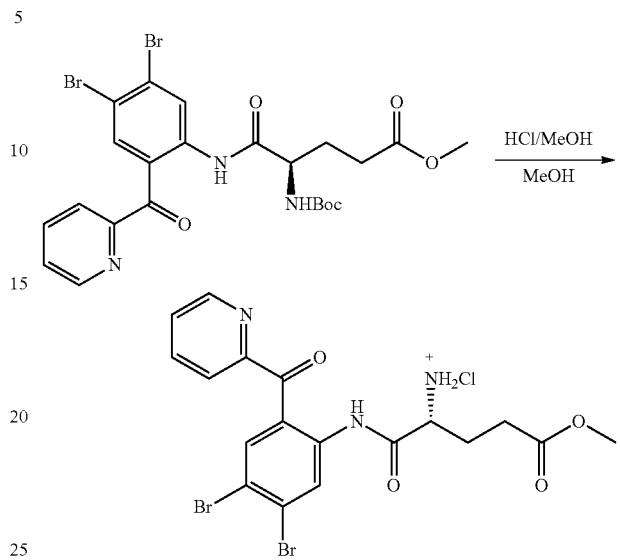

3.3 g of methyl (R)-4-((tert-butoxycarbonyl)amino)-5-((4,5-dibromo-2-pyridinecarbonylphenyl)amino)-5-oxovanate was dissolved in 20 mL of methanol, to which was added 20 mL HCl/MeOH solution (the volume ratio of HCl and MeOH is 1:1), and then reacted overnight at room temperature. The sample was collected and subjected to TLC, indicating raw materials were almost disappeared. The product was directly used in the next step without further treatment.

Example 4 Preparation of Intermediate 4 of the Present Invention

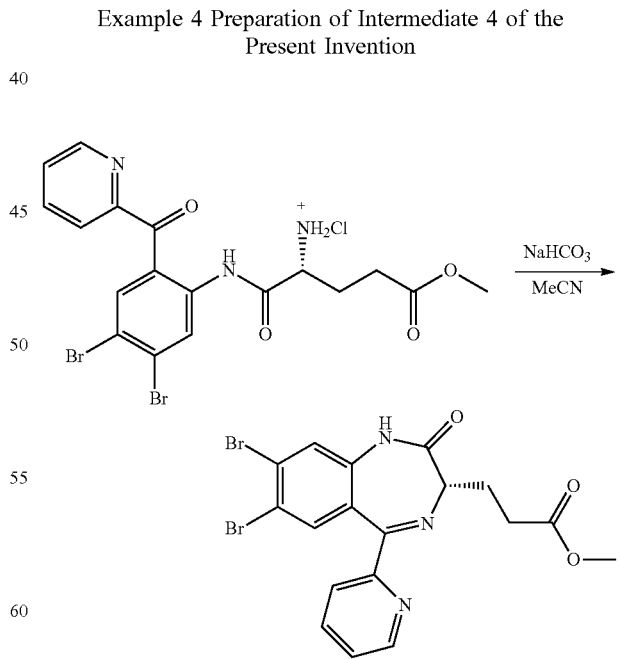

1.0 g of sodium bicarbonate was added into 30 mL of acetonitrile, and then under stirring vigorously, 3 g reaction solution of compound (R)—N-chloro-1-(4,5-dibromo-2-pyridinecarbonylphenyl)amino-5-methoxy-1,5-dioxopentan-2-ammonium was added dropwise. The mixture was allowed to react at room temperature for 3 h. The reaction solution was collected and subjected to TLC, indicating raw materials were almost disappeared. The reaction solution was filtered, and concentrated under reduced pressure. The residue was purified by column chromatography to provide 2 g of light yellow oil (intermediate 4).

$^1$H NMR (in CDCl$_3$): δ 8.67-8.56 (m, 2H), 8.07 (d, J=8.0 Hz, 1H), 7.82 (td, J=7.6, 1.6 Hz, 1H), 7.59 (dd, J=8.8, 2.0 Hz, 1H), 7.52 (d, J=2.0 Hz, 1H), 7.37 (dd, J=7.2, 5.2 Hz, 1H), 7.01 (d, J=8.8 Hz, 1H), 3.75 (dd, J=7.6, 5.6 Hz, 1H), 3.67 (s, 2H), 2.72-2.44 (m, 4H). MS: m/z 482.14 (M+1).

Example 5 Preparation of Intermediate 5 of the Present Invention

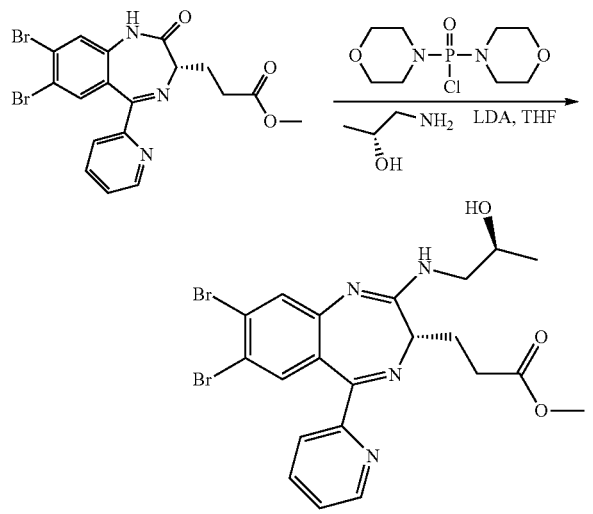

1.0 g (2.08 mmol, 1.0 eq) of (S)-3-7,8-dibromo-2-oxo-5-pyridine-2-yl-2,3-dihydro-1H-benzo[e][1,4]diaza-3-ylpropionic acid methyl ester was dissolved in 10 mL of tetrahydrofuran, to which was added the solution of LDA in tetrahydrofuran (1 M, 2.5 mL) dropwise at −18° C., and then reacted at 0° C. for 30 min. 1.3 g (5.1 mmol, 2.45 eq) of dimorpholinophosphinyl chloride was added, and then the mixture was reacted for additional 30 min. Then, the solution of (R)-1-aminopropane-2-ol (930 mg, 12.38 mmol, 5.95 eq) in tetrahydrofuran (40 ml) was added dropwise, and reacted overnight at room temperature. The reaction solution was collected and subjected to TLC, indicating raw materials were almost disappeared. To the reaction solution, was added the saturated ammonium chloride solution, and the resultant solution was extracted with ethyl acetate for three times. The organic phase was dried over anhydrous sodium sulfate, filtered and concentrated under reduced pressure. The residue was purified by column chromatography to provide 520 mg of yellow solid (intermediate 5).

$^1$H NMR (in CDCl$_3$): δ 8.65 (d, J=4.4 Hz, 1H), 7.91-7.74 (m, 2H), 7.50 (dd, J=8.8, 2.0 Hz, 1H), 7.43-7.32 (m, 2H), 7.13 (d, J=8.8 Hz, 1H), 5.81 (s, 1H), 4.03-3.91 (m, 1H), 3.70 (s, 3H), 3.48-3.18 (m, 3H), 2.83-2.35 (m, 4H), 1.16 (d, J=6.4 Hz, 3H). MS: m/z 538.24 (M+1).

Example 6 Preparation of Intermediate 6 of the Present Invention

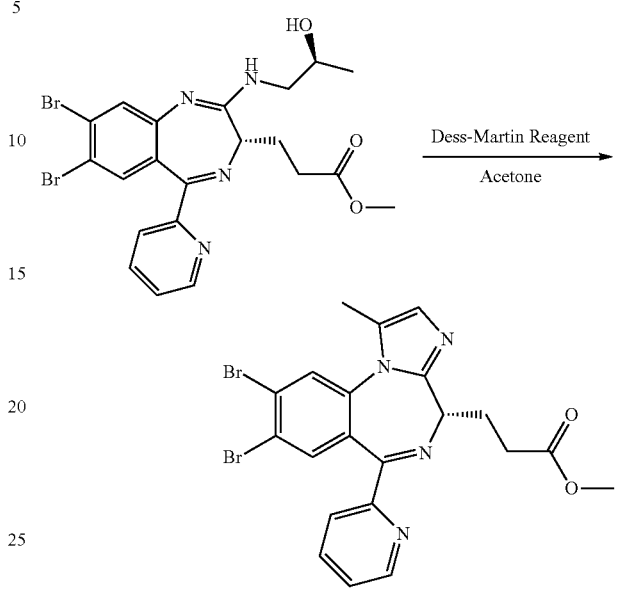

7.0 g (13 mmol, 1.0 eq) of methyl 3-(S)-7,8-dibromo-2-(S)-2-hydroxypropyl) amino-5-(pyridin-2-yl)-3H-benzo[e][1,4]diaza-3-ylpropionate was dissolved in 100 mL of acetone, to which was added 13.6 g (32.06 mmol, 2.47 eq) of Dess-Martin reagent, and then the mixture was allowed to react overnight at 40° C. The reaction solution was collected and subjected to TLC, indicating raw materials were almost disappeared. The reaction solution was filtered and concentrated under reduced pressure. The residual solution was dissolved in ethyl acetate and washed three times with the saturated sodium bicarbonate solution and the saturated ammonium chloride solution, respectively. The organic phase was dried over anhydrous sodium sulfate, filtered and concentrated under reduced pressure. The residue was purified by column chromatography to provide 5 g of yellow solid (intermediate 6).

$^1$H NMR (in CDCl$_3$): δ 8.59-8.54 (m, 1H), 8.17 (d, J=8.0 Hz, 1H), 7.79 (td, J=7.6, 1.6 Hz, 1H), 7.71 (dd, J=8.8, 2.4 Hz, 1H), 7.64 (d, J=2.4 Hz, 1H), 7.34 (ddd, J=7.6, 4.8, 0.8 Hz, 1H), 7.30 (d, J=8.8 Hz, 1H), 6.88 (d, J=0.8 Hz, 1H), 4.05 (dd, J=6.4, 4.0 Hz, 1H), 3.67 (s, 3H), 2.87-2.75 (m, 4H), 2.33 (s, 3H). MS: m/z 519.21 (M+1).

Example 7 Preparation of Intermediate 7 of the Present Invention

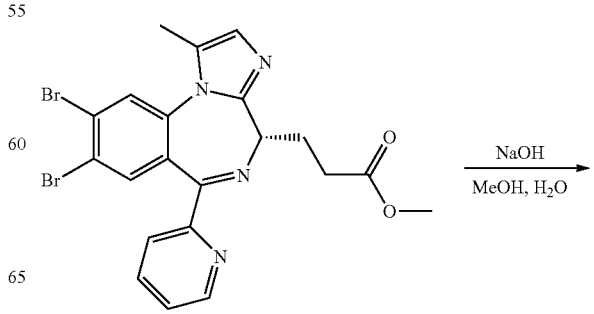

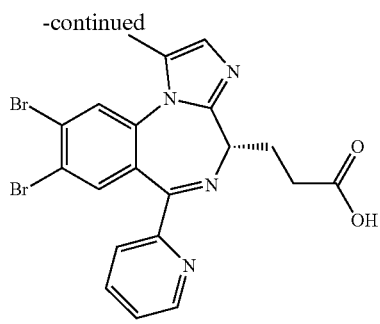

1.0 g (1.93 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 20 mL of methanol, to which was added 10 mL of 1 mol/L aqueous sodium hydroxide solution, and the reaction was stirred at room temperature overnight. The reaction solution was collected and subjected to TLC, indicating raw materials were almost disappeared. The organic phase of the reaction solution was rotatory evaporated, and then 1 mol/L HCl was added to adjust pH to be 5-6. The reaction solution was extracted with dichloromethane for three times. The organic phase was dried over anhydrous sodium sulfate, and filtered to obtain the filtrate, which was concentrated under reduced pressure to provide 800 mg of yellow solid (intermediate 7).

$^1$H NMR (in CDCl$_3$): δ 8.62-8.56 (m, 1H), 8.19 (d, J=8.0 Hz, 1H), 7.83 (td, J=7.6, 1.6 Hz, 1H), 7.74 (dd, J=8.8, 2.4 Hz, 1H), 7.66 (d, J=2.4 Hz, 1H), 7.37 (ddd, J=7.6, 4.8, 0.8 Hz, 1H), 7.32 (d, J=8.8 Hz, 1H), 6.72 (d, J=0.8 Hz, 1H), 4.09 (dd, J=6.4, 4.0 Hz, 1H), 3.69 (s, 3H), 2.83-2.72 (m, 4H). MS: m/z 503.96 (M+1).

Example 8 Preparation of Compound 8 of the Present Invention 1.5 g of chloromethyl chloroformate was added to 30 mL of anhydrous dichloromethane, to which was added 427 mg of methanol, and then 1.72 g of pyridine was added dropwise under cooling with cold water. The reaction was stirred for 2 h. 50 mL of dichloromethane was added, and then the organic layer was washed twice with 2N hydrochloric acid, followed by washing the organic layer once with water. The organic layer was separated, dried over anhydrous sodium sulfate, and filtered. The filtrate was evaporated to dry, to provide 1.2 g of crude chloromethyl methyl carbonate, which was directly used in the next reaction. 500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 400 mg (3.21 mmol, 3 eq) of crude chloromethyl methyl carbonate, followed by addition of 325 mg (2.36 mmol, 2.36 eq) of potassium carbonate. The mixture was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 300 mg of light yellow oil (compound 8).

$^1$H NMR (in MeOH-d4): δ 8.73 (d, J=4.8 Hz, 1H), 8.45-8.19 (m, 2H), 7.91 (d, J=8.8 Hz, 1H), 7.73 (s, 1H), 7.62 (dd, J=7.2, 5.2 Hz, 1H), 7.48 (s, 1H), 5.82 (s, 2H), 4.57 (dd, J=10.0, 4.0 Hz, 1H), 3.72 (s, 3H), 2.85-2.56 (m, 4H), 2.49 (d, J=11.2 Hz, 3H). MS: m/z 592.9853 [M+H]$^+$.

Example 9 Preparation of Compound 9 of the Present Invention

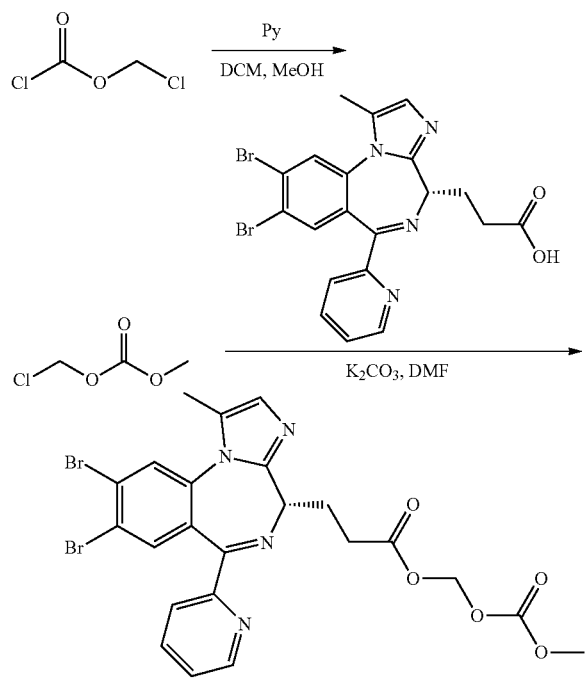

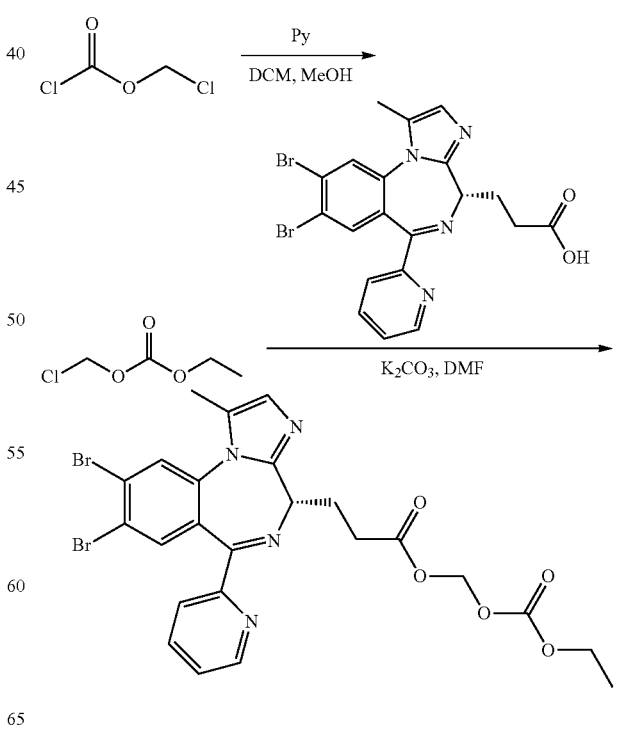

1.29 g of chloromethyl chloroformate was added to 30 mL of anhydrous dichloromethane, to which was added 860 mg of ethanol, and then 1.9 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered.

The filtrate was evaporated to dry, to provide 1.4 g of crude chloromethyl ethyl carbonate, which was directly used in the next reaction.

500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 327 mg (2.36 mmol, 2 eq) of crude chloromethyl ethyl carbonate, followed by addition of 324 mg (2.36 mmol, 2.36 eq) of potassium carbonate. The mixture was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 600 mg of light yellow oil (compound 9).

$^1$H NMR (in MeOH-d$_4$): δ 8.57 (t, J=7.2 Hz, 1H), 8.07-7.97 (m, 2H), 7.80 (d, J=8.8 Hz, 1H), 7.69 (d, J=2.0 Hz, 1H), 7.58 (dd, J=7.2, 5.2 Hz, 1H), 7.45 (s, 1H), 5.75 (s, 2H), 4.46 (dd, J=10.0, 4.0 Hz, 1H), 4.14 (q, J=7.2 Hz, 2H), 2.95-2.58 (m, 4H), 2.48 (s, 3H), 1.23 (t, J=7.2 Hz, 3H). MS: m/z 606.00 [M+H]$^+$.

Example 10 Preparation of Compound 10 of the Present Invention 2.0 g of chloromethyl chloroformate was added to 30 mL of anhydrous dichloromethane, to which was added 1.45 g of isopropanol, and then 2.5 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 2.1 g of crude chloromethyl isopropyl carbonate, which was directly used in the next reaction.

500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 359 mg (2.35 mmol, 2 eq) of crude chloromethyl isopropyl carbonate, followed by addition of 325 mg (2.36 mmol, 2.36 eq) of potassium carbonate. The mixture was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 600 mg of light yellow oil (compound 10).

$^1$H NMR (in MeOH-d$_4$): δ 8.25 (d, J=8.0 Hz, 1H), 8.08-7.98 (m, 2H), 7.81 (d, J=8.8 Hz, 1H), 7.69 (d, J=2.0 Hz, 1H), 7.59 (dd, J=7.2, 5.2 Hz, 1H), 7.46 (s, 1H), 5.74 (q, J=6.0 Hz, 2H), 4.80 (dt, J=12.4, 6.4 Hz, 1H), 4.47 (dd, J=10.0, 4.0 Hz, 1H), 2.93-2.56 (m, 4H), 2.49 (s, 3H), 1.22 (dd, J=10.4, 6.4 Hz, 6H). MS: m/z 621.02 [M+H]$^+$.

Example 11 Preparation of Compound 11 of the Present Invention

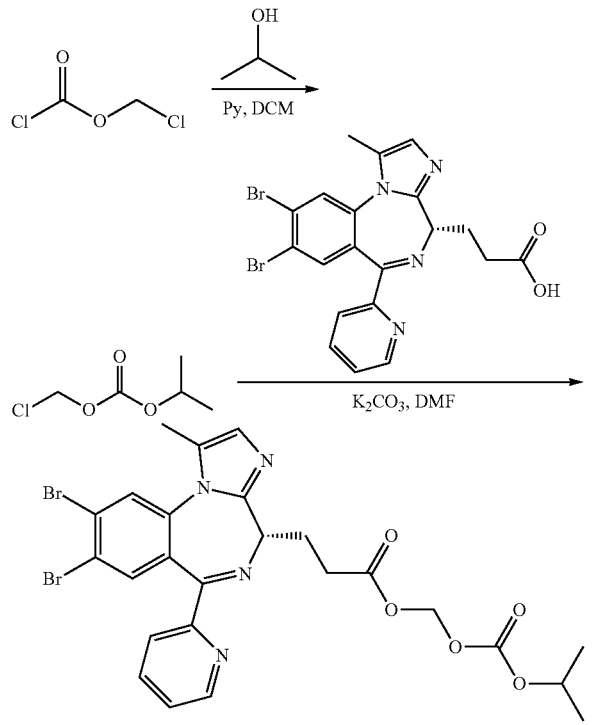

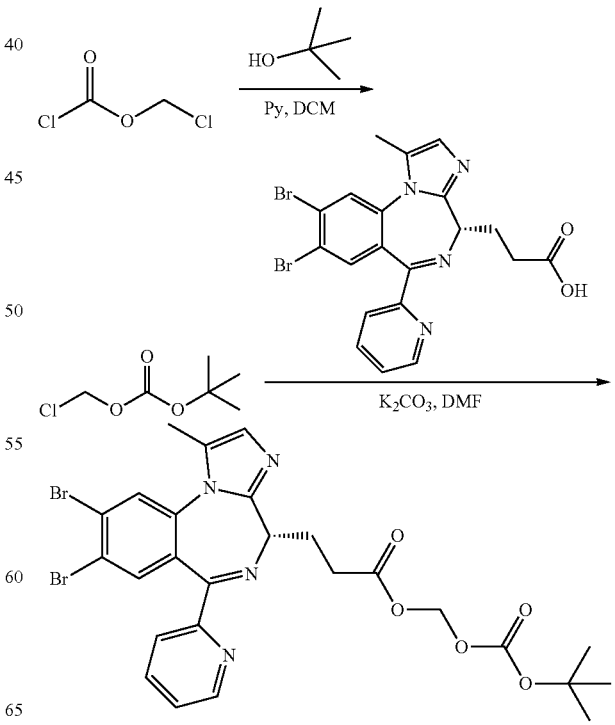

2.0 g of chloromethyl chloroformate was added to 30 mL of anhydrous dichloromethane, to which was added 1.49 g of t-butanol, and then 2.45 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 1.9 g of crude chloromethyl t-butyl carbonate, which was directly used in the next reaction.

500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 390 mg (2.34 mmol, 2 eq) of crude chloromethyl t-butyl carbonate, followed by addition of 325 mg (2.36 mmol, 2.36 eq) of potassium carbonate. The mixture was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 530 mg of light yellow oil (compound 11).

$^1$H NMR (in MeOH-$d_4$): δ 8.77 (ddd, J=4.8, 1.6, 0.8 Hz, 1H), 7.92 (td, J=8.0, 1.8 Hz, 1H), 7.85 (dd, J=8.8, 2.0 Hz, 1H), 7.64 (d, J=2.0 Hz, 1H), 7.34 (ddd, J=7.6, 4.8, 1.2 Hz, 1H), 7.30 (d, J=8.8 Hz, 1H), 6.86 (d, J=1.2 Hz, 1H), 5.71 (q, J=5.6 Hz, 2H), 4.07 (t, J=6.8 Hz, 1H), 2.91-2.74 (m, 4H), 2.34 (d, J=0.8 Hz, 3H), 1.48 (s, 9H). MS: m/z 634.03 [M+H]$^+$.

Example 12 Preparation of Compound 12 of the Present Invention 1.0 g of chloromethyl chloroformate was added to 30 mL of anhydrous dichloromethane, to which was added 1.06 g of 3-pentanol, and then 1.3 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 1.5 g of crude chloromethyl 3-pentyl carbonate, which was directly used in the next reaction.

500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 420 mg (2.37 mmol, 2.27 eq) of crude chloromethyl 3-pentyl carbonate, followed by addition of 326 mg (2.36 mmol, 2.36 eq) of potassium carbonate. The mixture was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 523 mg of light yellow oil (compound 12).

$^1$H NMR (in MeOH-$d_4$): δ 8.58 (d, J=4.8 Hz, 1H), 8.18 (d, J=8.0 Hz, 1H), 8.06-7.95 (m, 2H), 7.83 (d, J=8.8 Hz, 1H), 7.71 (s, 1H), 7.60 (dd, J=7.2, 5.2 Hz, 1H), 7.47 (s, 1H), 5.79 (dd, J=13.2 6.0, 2H), 4.60-4.52 (m, 1H), 4.49 (dd, J=10.0, 4.0 Hz, 1H), 2.95-2.58 (m, 4H), 2.51 (s, 3H), 1.71-1.39 (m, 4H), 0.87 (dt, J=16.4, 7.2 Hz, 6H). MS: m/z 648.04 [M+H]$^+$.

Example 13 Preparation of Compound 13 of the Present Invention

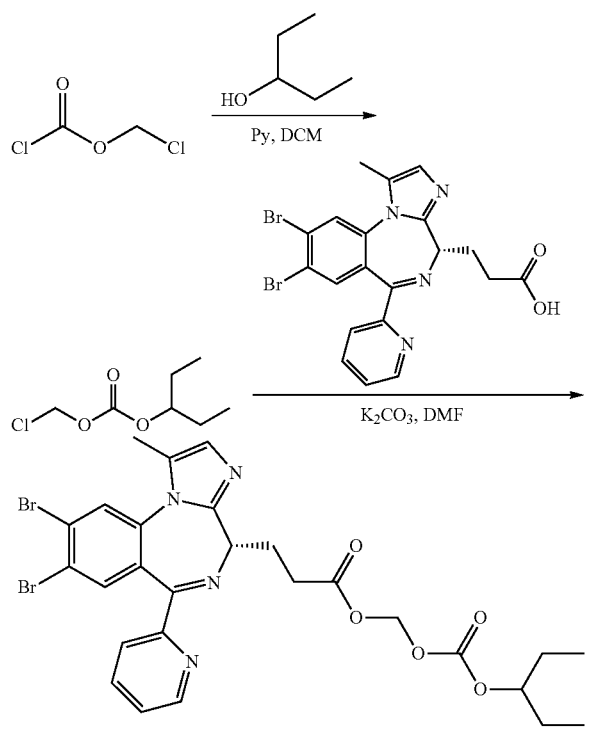

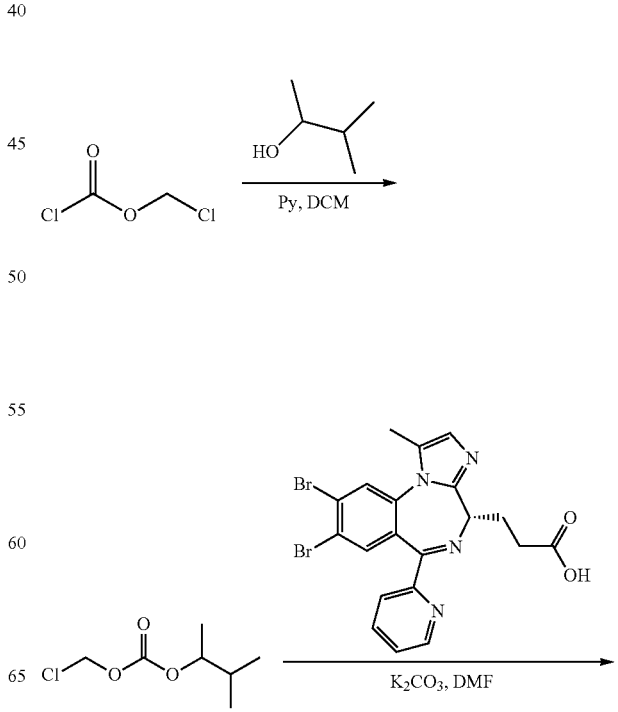

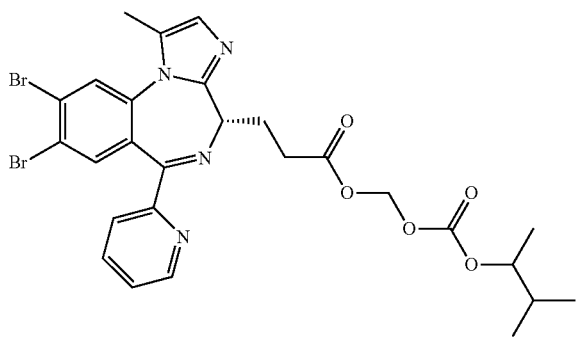

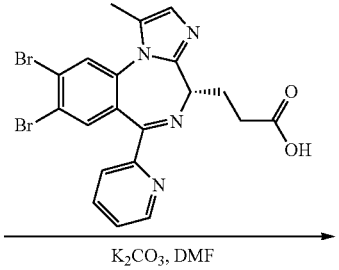

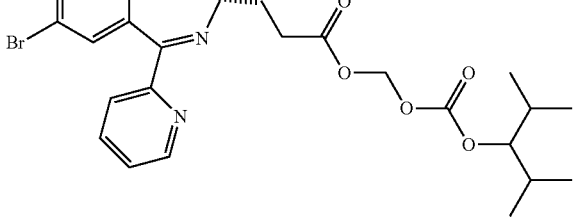

1.0 g of chloromethyl chloroformate was added to 30 mL of anhydrous dichloromethane, to which was added 1.0 g of 3-methyl-2-butanol, and then 1.3 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 1.6 g of crude chloromethyl 3-methylbutane-2-yl carbonate, which was directly used in the next reaction.

500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 428 mg (2.37 mmol, 2.27 eq) of crude chloromethyl 3-methylbutane-2-yl carbonate, followed by addition of 326 mg (2.36 mmol, 2.36 eq) of potassium carbonate. The mixture was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 481 mg of light yellow oil (compound 13).

$^1$H NMR (in MeOH-d$_4$): δ 8.86 (d, J=4.0 Hz, 1H), 8.42 (d, J=8.0 Hz, 1H), 7.82 (dd, J=8.8, 2.0 Hz, 1H), 7.64 (d, J=2.0 Hz, 1H), 7.34 (ddd, J=7.6, 4.8, 0.8 Hz, 1H), 7.30 (d, J=8.8 Hz, 1H), 6.86 (d, J=0.8 Hz, 1H), 5.77 (q, J=5.6 Hz, 2H), 4.61 (p, J=6.0 Hz, 1H), 4.07 (dd, J=8.4, 5.2 Hz, 1H), 2.93-2.72 (m, 4H), 2.33 (s, 3H), 1.66-1.56 (m, 4H), 0.90 (td, J=7.4, 3.3 Hz, 6H). MS: m/z 649.05 [M+H]$^+$.

Example 14 Preparation of Compound 14 of the Present Invention

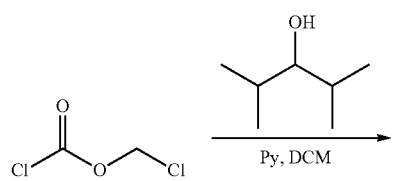

1.0 g of chloromethyl chloroformate was added to 30 mL of anhydrous dichloromethane, to which was added 1.37 g of 2,4-dimethyl-3-pentanol, and then 1.22 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 1.9 g of crude chloromethyl 2,4-dimethylpentane-3-yl carbonate, which was directly used in the next reaction.

500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 428 mg (2.34 mmol, 2.34 eq) of crude chloromethyl 2,4-dimethylpentane-3-yl carbonate, followed by addition of 326 mg (2.36 mmol, 2.36 eq) of potassium carbonate. The mixture was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 550 mg of light yellow oil (compound 14).

$^1$H NMR (in MeOH-d$_4$): δ 8.68 (dd, J=4.8, 0.8 Hz, 1H), 8.23 (d, J=8.0 Hz, 1H), 7.78-7.64 (m, 2H), 7.52 (d, J=2.4 Hz, 1H), 7.48 (dd, J=5.6, 3.2 Hz, 1H), 7.37 (ddd, J=7.6, 4.8, 1.2 Hz, 1H), 7.26 (d, J=8.8 Hz, 1H), 6.79 (d, J=1.2 Hz, 1H), 5.83 (q, J=5.6 Hz, 2H), 4.52 (t, J=6.0 Hz, 1H), 4.41 (t, J=6.8 Hz, 2H), 3.93 (d, J=6.0 Hz, 1H), 2.85-2.71 (m, 4H), 2.45 (d, J=0.8 Hz, 3H), 1.21-1.16 (m, 12H). MS: m/z 677.08 [M+H]$^+$.

Example 15 Preparation of Compound 15 of the Present Invention

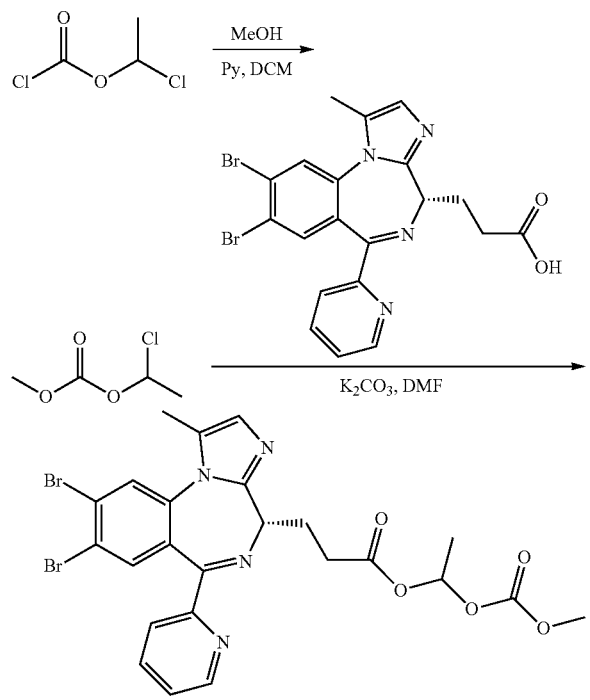

1.0 g of 1-chloroethyloxycarbonyl chloride was added to 30 mL of anhydrous dichloromethane, to which was added 488 mg of methanol, and then 1.1 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 900 mg of crude 1-chloroethyl methyl carbonate, which was directly used in the next reaction.

500 mg (1.00 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 325 mg (2.34 mmol, 2.34 eq) of crude 1-chloroethyl methyl carbonate, followed by addition of 326 mg (2.36 mmol, 2.36 eq) of potassium carbonate. The reaction solution was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 400 mg of light yellow oil (compound 15).

$^1$H NMR (in MeOH-$d_4$): δ 8.37 (d, J=4.2 Hz, 1H), 7.85 (td, J=7.6, 1.6 Hz, 1H), 7.73-7.68 (m, 1H), 7.63 (dd, J=5.2, 2.4 Hz, 1H), 7.37-7.28 (m, 2H), 6.86 (s, 1H), 6.76 (t, J=5.6 Hz, 1H), 4.06 (dd, J=12.4, 6.6 Hz, 1H), 3.76 (d, J=8.8 Hz, 3H), 2.92-2.75 (m, 4H), 2.34 (s, 3H), 1.49 (t, J=5.2 Hz, 3H). MS: m/z 607.00 [M+H]$^+$.

Example 16 Preparation of Compound 16 of the Present Invention

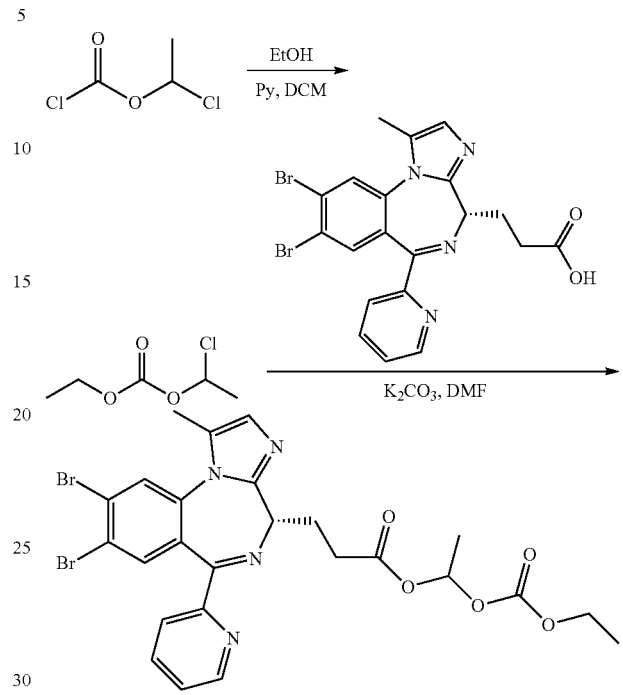

1.0 g of 1-chloroethyloxycarbonyl chloride was added to 30 mL of anhydrous dichloromethane, to which was added 644 mg of ethanol, and then 1.1 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 800 mg of crude 1-chloroethyl ethyl carbonate, which was directly used in the next reaction.

300 mg (0.705 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 215 mg (1.41 mmol, 2.0 eq) of crude 1-chloroethyl ethyl carbonate, followed by addition of 195 mg (1.41 mmol, 2.0 eq) of potassium carbonate. The reaction solution was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 270 mg of light yellow oil (compound 16).

$^1$H NMR (in MeOH-$d_4$): δ 8.34-8.02 (m, 1H), 7.76 (td, J=7.6, 1.6 Hz, 1H), 7.68-7.59 (m, 1H), 7.54 (dd, J=4.4, 2.4 Hz, 1H), 7.35 (ddd, J=7.6, 4.8, 1.2 Hz, 1H), 7.30 (d, J=8.8 Hz, 1H), 6.86 (d, J=1.2 Hz, 1H), 6.76 (t, J=5.6 Hz, 1H), 4.16 (ddd, J=7.1, 6.1, 2.4 Hz, 2H), 4.06 (dd, J=12.4, 6.6 Hz, 1H), 2.87-2.74 (m, 4H), 2.34 (d, J=0.8 Hz, 3H), 1.54-1.46 (m, 3H), 1.30-1.26 (m, 3H). MS: m/z 621.02 [M+H]$^+$.

Example 17 Preparation of Compound 17 of the Present Invention

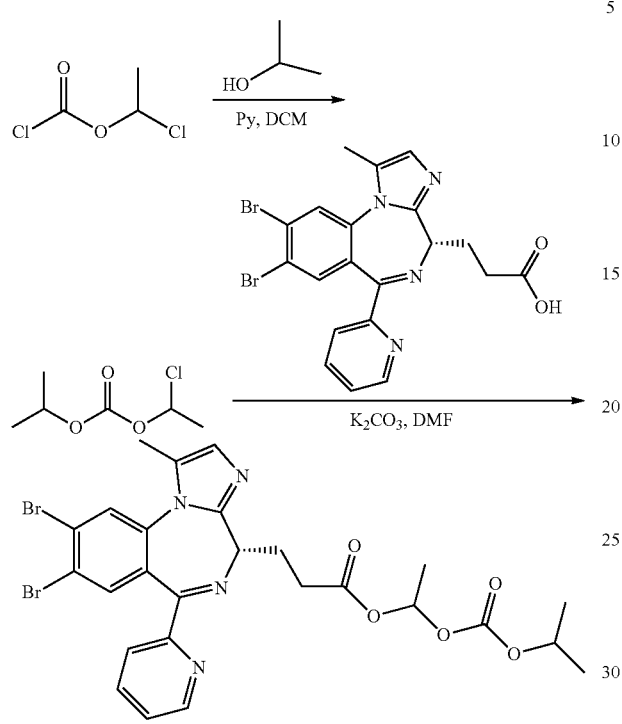

1.0 g of 1-chloroethyloxycarbonyl chloride was added to 30 mL of anhydrous dichloromethane, to which was added 839 mg of isopropanol, and then 1.1 g of pyridine was added dropwise under cooling with cold water. The reaction was stirred for 2 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 1.2 g of crude 1-chloroethyl isopropyl carbonate, which was directly used in the next reaction.

500 mg (1.0 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DMF, to which was added 392 mg (2.0 mmol, 2.0 eq) of crude 1-chloroethyl isopropyl carbonate, followed by addition of 326 mg (2.0 mmol, 2.0 eq) of potassium carbonate. The reaction solution was stirred at room temperature for 5 h. The reaction solution was collected and subjected to TLC, indicating raw materials were almost disappeared. After filtration, the reaction solution was poured into 50 mL of water, and then extracted with 100 mL of dichloromethane. The organic layer was separated, dried over anhydrous sodium sulfate, and then filtered to obtain the filtrate. The filtrate was concentrated under reduced pressure, and the residue was purified by column chromatography, to provide 650 mg of light yellow oil (compound 17).

¹H NMR (in CDCl₃): δ 8.63 (d, J=4.4 Hz, 1H), 8.21 (dd, J=14.4, 8.0 Hz, 2H), 7.82 (d, J=8.8 Hz, 1H), 7.72 (d, J=2.0 Hz, 1H), 7.51 (dd, J=7.2, 5.2 Hz, 1H), 7.47 (s, 1H), 6.73-6.57 (m, 1H), 4.80-4.63 (m, 1H), 4.36 (dt, J=8.8, 5.6 Hz, 1H), 2.87-2.55 (m, 4H), 2.39 (s, 3H), 1.43 (t, J=5.6 Hz, 3H), 1.25-1.12 (m, 6H). MS: m/z 635.03 [M+H]⁺.

Example 18 Preparation of Compound 18 of the Present Invention

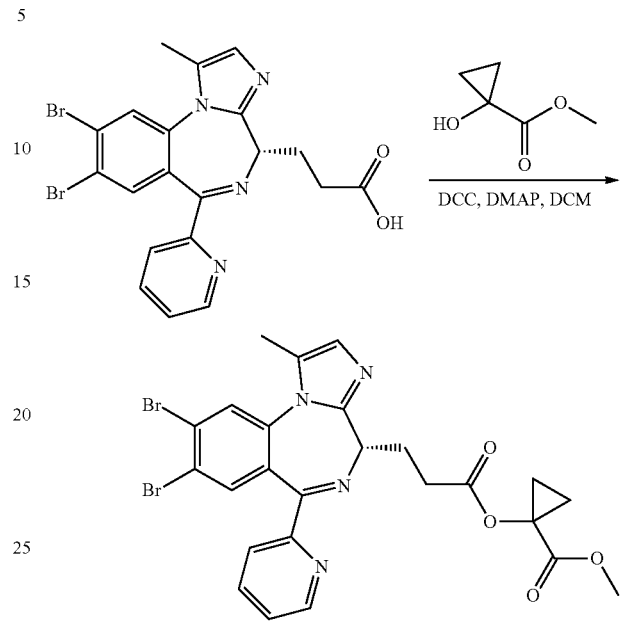

500 mg (1.0 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DCM, to which were added 164 mg (1.4 mmol, 1.4 eq) of methyl 1-hydroxycyclopropane-1-carboxylate, 290 mg (1.4 mmol, 1.4 eq) of DCC and 14 mg (0.11 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 540 mg of light yellow oil (compound 18).

¹H NMR (in CDCl₃): δ 8.72-8.56 (m, 1H), 7.83 (td, J=8.0, 1.6 Hz, 1H), 7.78 (dd, J=8.8, 2.4 Hz, 1H), 7.63 (d, J=2.4 Hz, 1H), 7.38-7.28 (m, 2H), 6.86 (d, J=1.2 Hz, 1H), 4.10 (dd, J=8.0, 5.6 Hz, 1H), 3.60 (s, 3H), 2.93-2.77 (m, 4H), 2.34 (s, 3H), 1.50 (q, J=5.6 Hz, 2H), 1.17 (q, J=5.6 Hz, 2H). MS: m/z 603.01 [M+H]⁺.

Example 19 Preparation of Compound 19 of the Present Invention

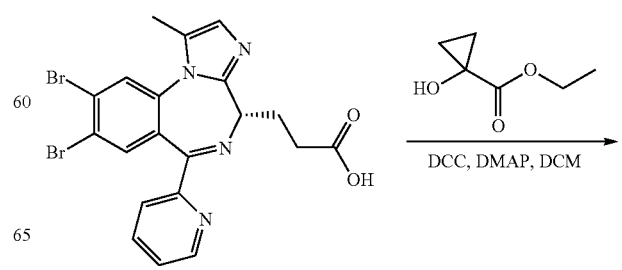

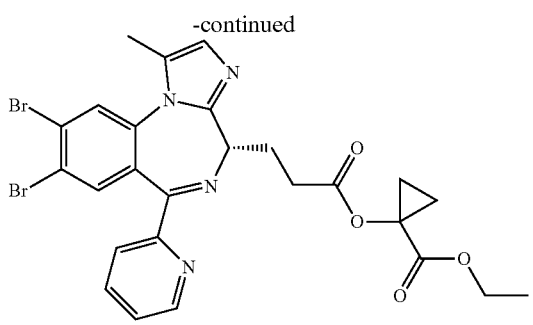

500 mg (1.0 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DCM, to which were added 182.20 mg (1.4 mmol, 1.4 eq) of ethyl 1-hydroxycyclopropane-1-carboxylate, 290 mg (1.4 mmol, 1.4 eq) of DCC and 14 mg (0.11 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 583 mg of light yellow oil (compound 19).

$^1$H NMR (in CDCl$_3$): δ 8.67 (dd, J=4.8, 0.8 Hz, 1H), 7.83 (td, J=8.0, 2.0 Hz, 1H), 7.76-7.65 (m, 1H), 7.63 (d, J=2.0 Hz, 1H), 7.35 (ddd, J=7.6, 4.8, 1.2 Hz, 1H), 7.30 (d, J=8.8 Hz, 1H), 6.86 (d, J=1.2 Hz, 1H), 4.15-4.04 (m, 3H), 2.90-2.74 (m, 4H), 2.34 (d, J=0.8 Hz, 3H), 1.49 (dd, J=8.4, 5.2 Hz, 2H), 1.20-1.12 (m, 5H). MS: m/z 617.02 [M+H]$^+$.

Example 20 Preparation of Compound 20 of the Present Invention

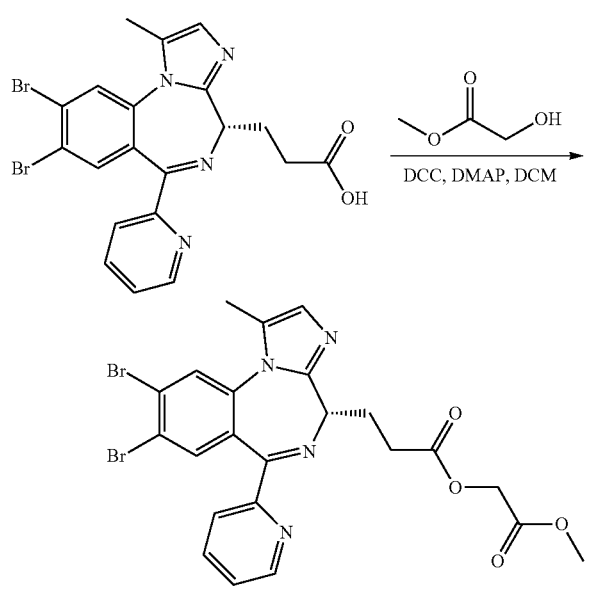

500 mg (1.0 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DCM, to which were added 126.11 mg (1.4 mmol, 1.4 eq) of methyl glycolate, 290 mg (1.4 mmol, 1.4 eq) of DCC and 14 mg (0.11 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 512 mg of light yellow oil (compound 20).

$^1$H NMR (in CDCl$_3$): δ 8.47 (d, J=8.0 Hz, 1H), 8.18-7.92 (m, 2H), 7.81 (d, J=8.8 Hz, 1H), 7.64 (s, 1H), 7.53 (dd, J=7.2, 5.2 Hz, 1H), 7.45 (s, 1H), 4.70-4.58 (m, 2H), 4.55 (dd, J=10.4, 4.4 Hz, 1H), 3.66 (s, 3H), 2.99-2.59 (m, 4H), 2.49 (s, 3H). MS: m/z 576.99 [M+H]$^+$.

Example 21 Preparation of Compound 21 of the Present Invention

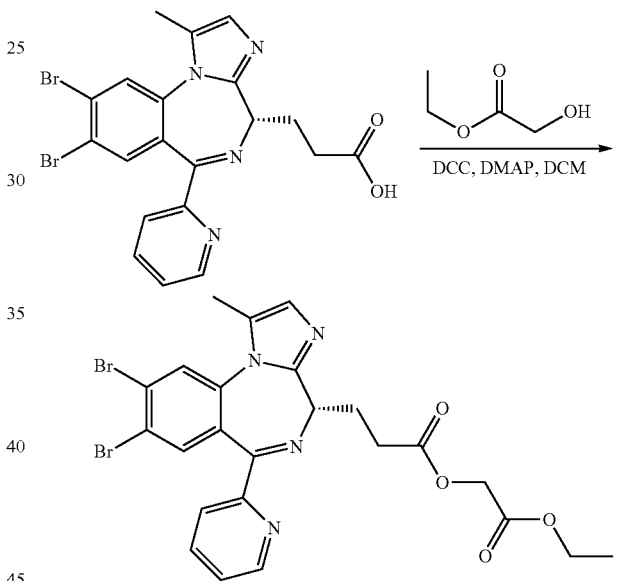

500 mg (1.0 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DCM, to which were added 145.75 mg (1.4 mmol, 1.4 eq) of ethyl glycolate, 290 mg (1.4 mmol, 1.4 eq) of DCC and 14 mg (0.11 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 534 mg of light yellow oil (compound 21).

$^1$H NMR (in CDCl$_3$): δ 8.65-8.51 (m, 1H), 7.87 (td, J=8.0, 1.6 Hz, 1H), 7.72 (dd, J=8.8, 2.4 Hz, 1H), 7.58 (d, J=2.4 Hz, 1H), 7.44 (ddd, J=7.6, 4.8, 1.2 Hz, 1H), 7.30 (d, J=8.8 Hz, 1H), 6.86 (d, J=1.2 Hz, 1H), 4.58 (s, 2H), 4.14 (dt, J=9.2, 4.8 Hz, 3H), 2.98-2.73 (m, 4H), 2.34 (d, J=0.8 Hz, 3H), 1.23 (t, J=7.2 Hz, 3H). MS: m/z 591.01 [M+H]$^+$.

Example 22 Preparation of Compound 22 of the Present Invention

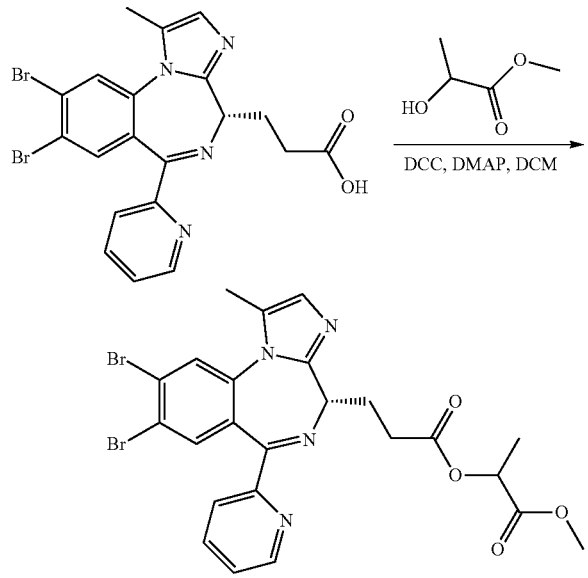

500 mg (1.0 mmol, 1.0 eq) of 3-((4S)-8,9-dibromo-1-methyl-6-(pyridin-2-yl)-4H-benzo[f]imidazo[1,2-a][1,4]diaza-4-yl)propionic acid was dissolved in 10 mL of DCM, to which were added 145.6 mg (1.4 mmol, 1.4 eq) of methyl lactate, 290 mg (1.4 mmol, 1.4 eq) of DCC and 14 mg (0.11 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 521 mg of light yellow oil (compound 22).

$^1$H NMR (in CDCl$_3$): δ 8.63 (dd, J=4.8, 0.8 Hz, 1H), 7.86-7.71 (m, 1H), 7.69 (dt, J=8.8, 2.0 Hz, 1H), 7.57 (dd, J=6.0, 2.4 Hz, 1H), 7.41 (ddd, J=7.6, 4.8, 1.2 Hz, 1H), 7.35 (dd, J=8.8, 3.2 Hz, 1H), 6.86 (d, J=1.2 Hz, 1H), 5.11-5.02 (m, 1H), 4.10 (td, J=5.6, 3.2 Hz, 1H), 3.66 (s, 3H), 2.92-2.78 (m, 4H), 2.34 (s, 3H), 1.44 (d, J=7.2 Hz, 3H). MS: m/z 591.01 [M+H]$^+$.

Example 23 Preparation of Compound 23 of the Present Invention

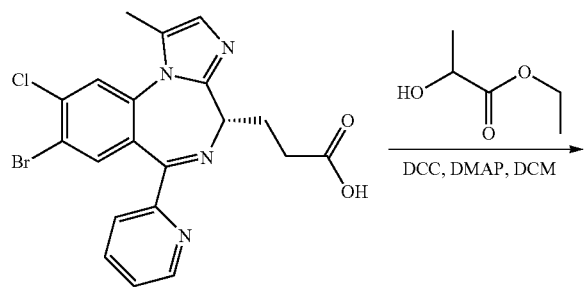

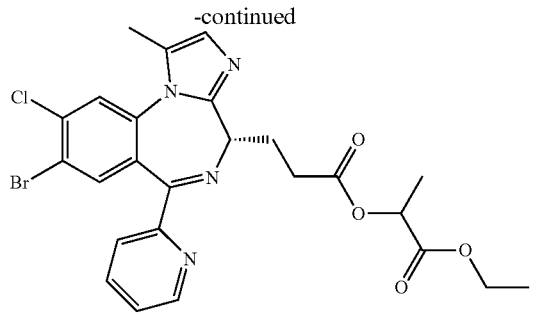

Referring to the synthetic steps of Examples 1 to 7, the intermediate 3-((4S)-8-bromo-9-chloro-1-methyl-6-(pyridin-2-yl)-4H-benzo[f]imidazo[1,2-a][1,4]diaza-4-yl)propionic acid was obtained from the starting material 2-amino-5-bromo-4-chlorobenzoic acid. 500 mg (1.09 mmol, 1.0 eq) of 3-((4S)-8-bromo-9-chloro-1-methyl-6-(pyridin-2-yl)-4H-benzo[f]imidazo[1,2-a][1,4]diaza-4-yl)propionic acid was dissolved in 10 mL of DCM, to which were added 179.87 mg (1.52 mmol, 1.4 eq) of ethyl lactate, 313.12 mg (1.52 mmol, 1.4 eq) of DCC and 18.32 mg (0.15 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 567 mg of light yellow oil (compound 23).

$^1$H NMR (in CDCl$_3$): δ 8.63 (d, J=4.8 Hz, 1H), 7.91-7.82 (m, 1H), 7.78-7.68 (m, 1H), 7.64 (dd, J=5.2, 2.4 Hz, 1H), 7.36-7.32 (m, 1H), 7.30 (dd, J=8.8, 3.2 Hz, 1H), 6.86 (d, J=1.2 Hz, 1H), 5.04 (dt, J=7.2, 4.8 Hz, 1H), 4.22-4.04 (m, 3H), 2.99-2.69 (m, 4H), 2.34 (s, 3H), 1.44 (t, J=6.8 Hz, 3H), 1.21 (td, J=7.2, 2.8 Hz, 3H). MS: m/z 605.02 [M+H]$^+$.

Example 24 Preparation of Compound 24 of the Present Invention

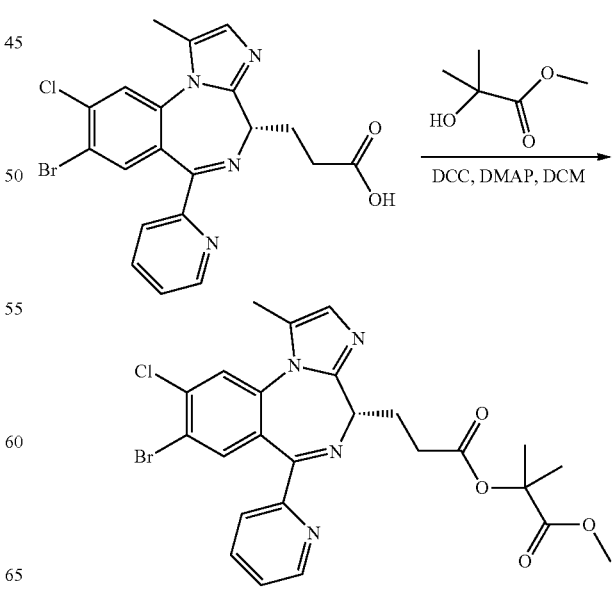

Referring to the synthetic steps of Examples 1 to 7, the intermediate 3-((4S)-8-bromo-9-chloro-1-methyl-6-(pyridin-2-yl)-4H-benzo[f]imidazo[1,2-a][1,4]diaza-4-yl)propionic acid was obtained from the starting material 2-amino-5-bromo-4-chlorobenzoic acid. 500 mg (1.09 mmol, 1.0 eq) of 3-((4S)-8-bromo-9-chloro-1-methyl-6-(pyridin-2-yl)-4H-benzo[f]imidazo[1,2-a][1,4]diaza-4-yl)propionic acid was dissolved in 10 mL of DCM, to which were added 179.56 mg (1.52 mmol, 1.4 eq) of methyl 2-hydroxyisobutyrate, 313.12 mg (1.52 mmol, 1.4 eq) of DCC and 18.32 mg (0.15 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 572 mg of light yellow oil (compound 24).

$^1$H NMR (in CDCl$_3$): δ 8.71 (d, J=4.0 Hz, 1H), 7.92 (td, J=7.8, 1.7 Hz, 1H), 7.78-7.69 (m, 1H), 7.62 (d, J=2.2 Hz, 1H), 7.37-7.32 (m, 1H), 7.30 (d, J=8.7 Hz, 1H), 6.86 (d, J=0.9 Hz, 1H), 4.05 (dd, J=8.1, 5.4 Hz, 1H), 3.58 (s, 3H), 2.92-2.71 (m, 4H), 2.34 (s, 3H), 1.50 (d, J=1.1 Hz, 6H). MS: m/z 605.02 [M+H]$^+$.

Example 25 Preparation of Compound 25 of the Present Invention

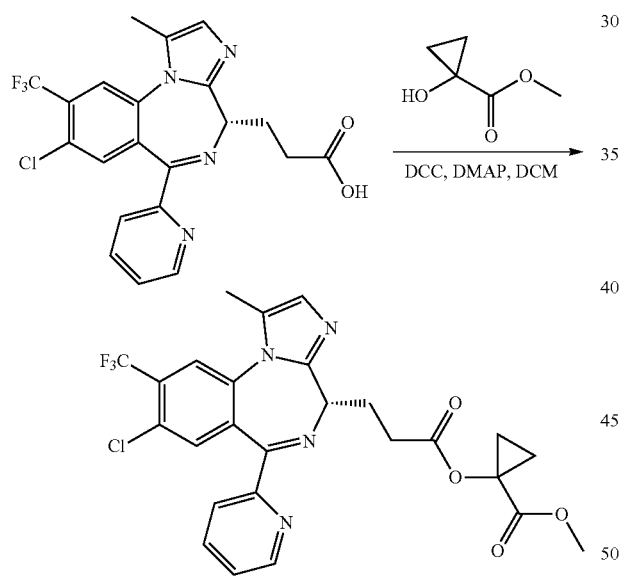

Referring to the synthetic steps of Examples 1 to 7, the intermediate 3-((4S)-8-chloro-1-methyl-6-(pyridin-2-yl)-9-(trifluoromethyl)-4H-benzo[f]imidazo[1,2-a][1,4]diaza-4-yl)propionic acid was obtained from the starting material 2-amino-5-chloro-4-(trifluoromethyl)benzoic acid. 500 mg (1.11 mmol, 1.0 eq) of 3-((4S)-8-chloro-1-methyl-6-(pyridin-2-yl)-9-(trifluoromethyl)-4H-benzo[f]imidazo[1,2-a][1,4]diaza-4-yl)propionic acid was dissolved in 10 mL of DCM, to which were added 164 mg (1.41 mmol, 1.27 eq) of methyl 1-hydroxycyclopropane-1-carboxylate, 290 mg (1.41 mmol, 1.27 eq) of DCC and 14 mg (0.11 mmol, 0.1 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 540 mg of light yellow oil (compound 25).

$^1$H NMR (in CDCl$_3$): δ 8.57 (dd, J=4.8, 0.8 Hz, 1H), 8.19 (d, J=8.0 Hz, 1H), 7.81 (td, J=7.8, 1.6 Hz, 1H), 7.73 (dd, J=8.8, 2.4 Hz, 1H), 7.66 (d, J=2.4 Hz, 1H), 7.36 (ddd, J=7.6, 4.8, 1.2 Hz, 1H), 7.28 (d, J=8.8 Hz, 1H), 4.15-4.08 (m, 1H), 3.59 (s, 3H), 2.91-2.72 (m, 4H), 2.32 (s, 3H), 1.49 (dd, J=8.4, 5.2 Hz, 2H), 1.17 (dd, J=8.4, 5.2 Hz, 2H). MS: m/z 533.11 [M+H]$^+$.

Example 26 Preparation of Compound 26 of the Present Invention

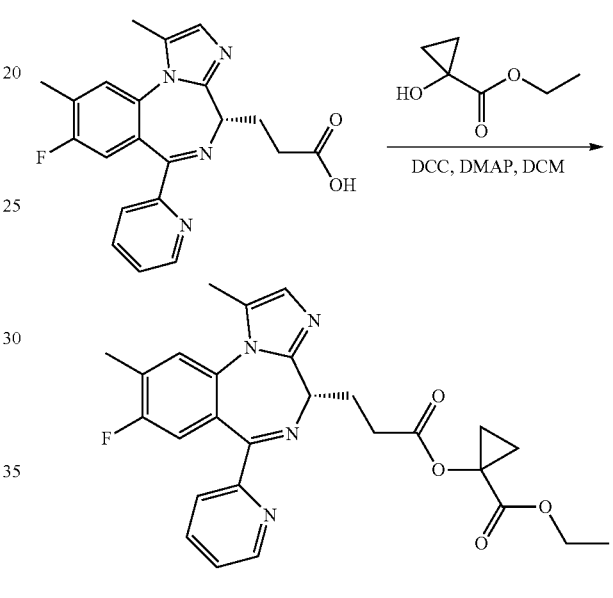

Referring to the synthetic steps of Examples 1 to 7, the intermediate 3-((4S)-8-fluoro-1,9-dimethyl-6-(pyridin-2-yl)-4H-benzo[f]imidazo[1,2-a][1,4]diaza-4-yl)propionic acid was obtained from the starting material 2-amino-5-fluoro-4-methylbenzoic acid.

500 mg (1.32 mmol, 1.0 eq) of 3-((4S)-8-fluoro-1,9-dimethyl-6-(pyridin-2-yl)-4H-benzo[f]imidazo[1,2-a][1,4]diaza-4-yl)propionic acid was dissolved in 10 mL of DCM, to which were added 180 mg (1.41 mmol, 1.07 eq) of ethyl 1-hydroxycyclopropane-1-carboxylate, 290 mg (1.41 mmol, 1.07 eq) of DCC and 20 mg (0.16 mmol, 0.12 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 563 mg of light yellow oil (compound 26).

$^1$H NMR (in CDCl$_3$): δ 8.52 (dd, J=4.8, 0.8 Hz, 1H), 8.17 (d, J=8.0 Hz, 1H), 7.76 (td, J=8.0, 2.0 Hz, 1H), 7.71-7.67 (m, 1H), 7.62 (d, J=2.0 Hz, 1H), 7.31 (ddd, J=7.6, 4.8, 1.2 Hz, 1H), 7.26 (d, J=8.8 Hz, 1H), 4.14-4.02 (m, 3H), 2.88-2.72 (m, 4H), 2.32 (d, J=0.8 Hz, 3H), 2.31 (s, 3H), 1.46 (dd, J=8.4, 5.2 Hz, 2H), 1.22-1.13 (m, 5H). MS: m/z 491.21[M+H]$^+$.

Example 27 Preparation of Compound 27 of the Present Invention

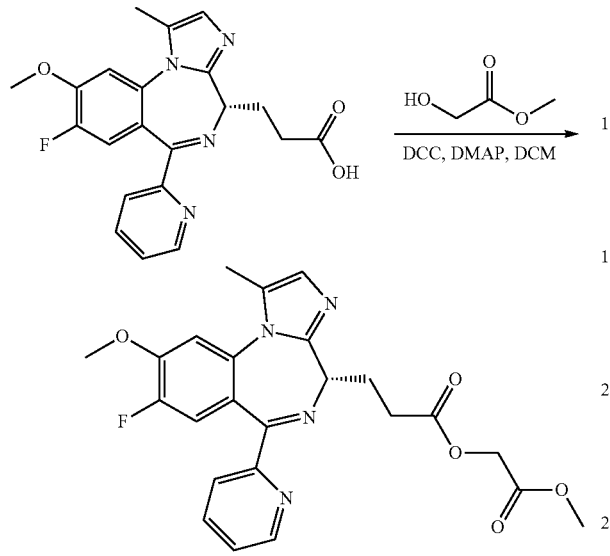

Referring to the synthetic steps of Examples 1 to 7, the intermediate 3-((4S)-8-fluoro-9-methoxy-1-methyl-6-(pyridin-2-yl)-4H-benzo[f]imidazo[1,2-a][1,4]diaza-4-yl)propionic acid was obtained from the starting material 2-amino-5-fluoro-4-methoxybenzoic acid. 500 mg (1.27 mmol, 1.0 eq) of 3-((4S)-8-fluoro-9-methoxy-1-dimethyl-6-(pyridin-2-yl)-4H-benzo[f]imidazo[1,2-a][1,4]diaza-4-yl)propionic acid was dissolved in 10 mL of DCM, to which were added 127 mg (1.41 mmol, 1.11 eq) of methyl 2-hydroxyacetate, 290 mg (1.41 mmol, 1.11 eq) of DCC and 20 mg (0.16 mmol, 0.12 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 514 mg of light yellow oil (compound 27).

$^1$H NMR (in CDCl$_3$): δ 8.57 (d, J=4.8 Hz, 1H), 8.16 (d, J=8.0 Hz, 1H), 8.05-7.96 (m, 2H), 7.82 (d, J=8.8 Hz, 1H), 7.67 (s, 1H), 7.56 (dd, J=7.2, 5.2 Hz, 1H), 4.71-4.59 (m, 2H), 4.57 (dd, J=10.4, 4.4 Hz, 1H), 3.85 (s, 3H), 3.64 (s, 3H), 2.96-2.61 (m, 4H), 2.47 (s, 3H). MS: m/z 467.18 [M+H]$^+$.

Example 28 Preparation of Compound 28 of the Present Invention

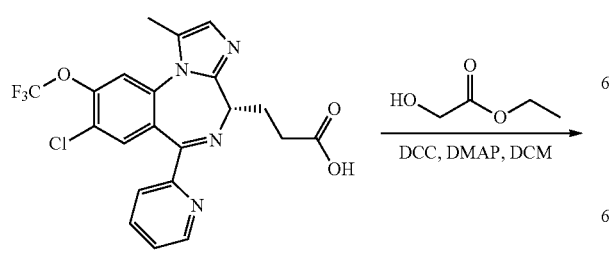

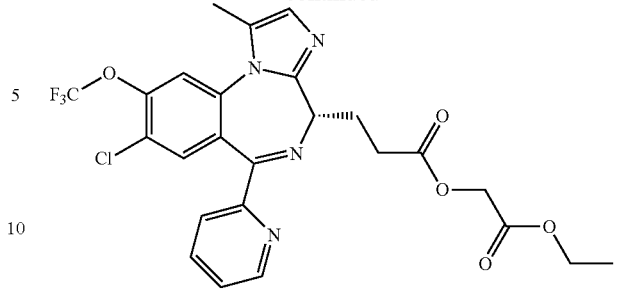

Referring to the synthetic steps of Examples 1 to 7, the intermediate 3-((4S)-8-chloro-1-methyl-6-(pyridin-2-yl)-9-(trifluoromethoxy)-4H-benzo[f]imidazo[1,2-a][1,4]diaza-4-yl)propionic acid was obtained from the starting material 2-amino-5-chloro-4-(trifluoromethoxy)benzoic acid.

500 mg (1.08 mmol, 1.0 eq) of 3-((4S)-8-chloro-1-methyl-6-(pyridin-2-yl)-9-(trifluoromethoxy)-4H-benzo[f]imidazo[1,2-a][1,4]diaza-4-yl)propionic acid was dissolved in 10 mL of DCM, to which were added 147 mg (1.41 mmol, 1.30 eq) of ethyl 2-hydroxyacetate, 290 mg (1.41 mmol, 1.30 eq) of DCC and 20 mg (0.16 mmol, 0.15 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 509 mg of light yellow oil (compound 28).

$^1$H NMR (in CDCl$_3$): δ 8.61-8.54 (m, 1H), 8.19 (d, J=8.0 Hz, 1H), 7.82 (td, J=8.0, 1.6 Hz, 1H), 7.73 (dd, J=8.8, 2.4 Hz, 1H), 7.62 (d, J=2.4 Hz, 1H), 7.33 (ddd, J=7.6, 4.8, 1.2 Hz, 1H), 7.32 (d, J=8.8 Hz, 1H), 4.55 (s, 2H), 4.16 (dt, J=9.2, 4.8 Hz, 3H), 2.95-2.76 (m, 4H), 2.35 (d, J=0.8 Hz, 3H), 1.24 (t, J=7.2 Hz, 3H). MS: m/z 551.13 [M+H]$^+$.

Example 29 Preparation of Compound 29 of the Present Invention

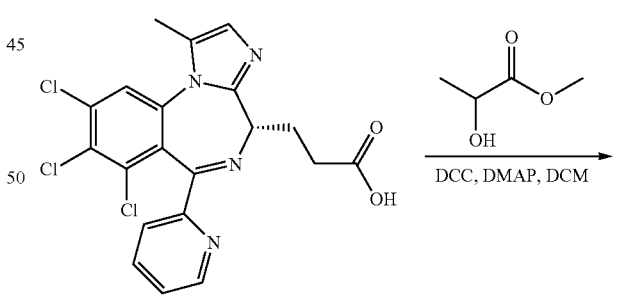

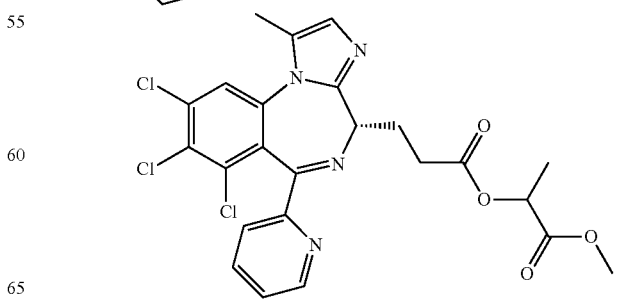

Referring to the synthetic steps of Examples 1 to 7, the intermediate 3-((4S)-7,8,9-trichloro-1-methyl-6-(pyridin-2-yl)-4H-benzo[f]imidazo[1,2-a][1,4]diaza-4-yl)propionic acid was obtained from the starting material 6-amino-2,3,4-trichlorobenzoic acid. 500 mg (1.11 mmol, 1.0 eq) of 3-((4S)-7,8,9-trichloro-1-methyl-6-(pyridin-2-yl)-4H-benzo[f]imidazo[1,2-a][1,4]diaza-4-yl)propionic acid was dissolved in 10 mL of DCM, to which were added 147 mg (1.41 mmol, 1.27 eq) of methyl 2-hydroxypropionate, 290 mg (1.41 mmol, 1.27 eq) of DCC and 20 mg (0.16 mmol, 0.14 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 519 mg of light yellow oil (compound 29).

$^1$H NMR (in CDCl$_3$): δ 8.73 (dd, J=4.8, 0.8 Hz, 1H), 7.95 (t, J=8.0 Hz, 1H), 7.82-7.75 (m, 2H), 7.73 (dt, J=8.8, 2.0 Hz, 1H), 7.71 (dd, J=6.0, 2.4 Hz, 1H), 5.64 (q, 1H), 4.13 (td, J=5.6, 3.2 Hz, 1H), 3.67 (s, 3H), 2.91-2.76 (m, 4H), 2.36 (s, 3H), 1.45 (d, J=7.2 Hz, 3H). MS: m/z 535.07 [M+H]$^+$.

Example 30 Preparation of Compound 30 of the Present Invention

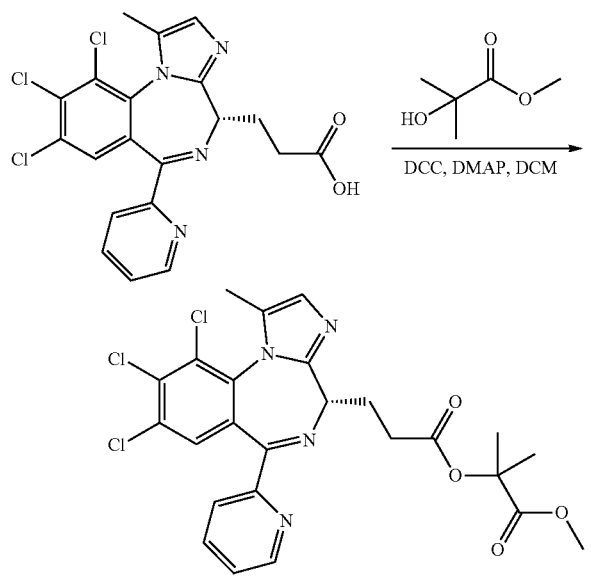

Referring to the synthetic steps of Examples 1 to 7, the intermediate 3-((4S)-7,8,9-trichloro-1-methyl-6-(pyridin-2-yl)-4H-benzo[f]imidazo[1,2-a][1,4]diaza-4-yl)propionic acid was obtained from the starting material 2-amino-3,4,5-trichlorobenzoic acid.

500 mg (1.03 mmol, 1.0 eq) of 3-((4S)-7,8,9-trichloro-1-methyl-6-(pyridin-2-yl)-4H-benzo[f]imidazo[1,2-a][1,4]diaza-4-yl)propionic acid was dissolved in 10 mL of DCM, to which were added 166 mg (1.41 mmol, 1.37 eq) of methyl 2-hydroxy-2-methylpropionate, 290 mg (1.41 mmol, 1.37 eq) of DCC and 20 mg (0.16 mmol, 0.16 eq) of DMAP, and the mixture was allowed to react overnight at room temperature. The reaction solution was collected and subjected to TLC, indicating raw materials were almost disappeared. After filtration, the reaction solution was concentrated under reduced pressure, and the residue was purified by column chromatography, to provide 534 mg of light yellow oil (compound 30).

$^1$H NMR (in CDCl$_3$): δ 8.76 (dd, J=4.8, 0.8 Hz, 1H), 7.97 (t, J=8.0 Hz, 1H), 7.83-7.74 (m, 2H), 7.72 (dt, J=8.8, 2.0 Hz, 1H), 7.68 (dd, J=6.0, 2.4 Hz, 1H), 5.63 (q, 1H), 3.68 (s, 3H), 2.93-2.78 (m, 4H), 2.35 (s, 3H), 1.47 (d, J=7.2 Hz, 6H). MS: m/z 549.09 [M+H]$^+$.

Example 31 Preparation of Compound 31 of the Present Invention

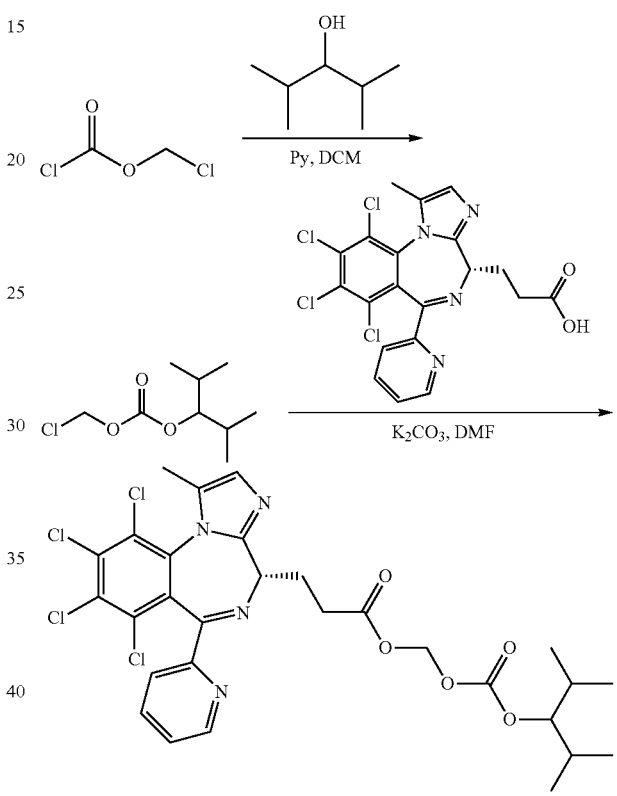

Referring to the synthetic steps of Examples 1 to 7, the intermediate 3-((4S)-7,8,9,10-tetrachloro-1-methyl-6-(pyridin-2-yl)-4H-benzo[f]imidazo[1,2-a][1,4]diaza-4-yl)propionic acid was obtained from the starting material 2-amino-3,4,5,6-tetrachlorobenzoic acid. 1.0 g of chloromethyl chloroformate was added to 30 mL of anhydrous dichloromethane, to which was added 450 mg of 2,4-dimethylpentane-3-ol, and then 1.1 g of pyridine was added dropwise under cooling with cold water. The reaction was stirred for 5 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 860 mg of crude chloromethyl (2,4-dimethylpentane-3-yl) carbonate, which was directly used in the next reaction.

500 mg (1.03 mmol, 1.0 eq) of 3-((4S)-7,8,9,10-tetrachloro-1-methyl-6-(pyridin-2-yl)-4H-benzo[f]imidazo[1,2-a][1,4]diaza-4-yl)propionic acid was dissolved in 10 mL of DMF, to which were added 357 mg (1.71 mmol, 1.66 eq) of chloromethyl (2,4-dimethylpentane-3-yl) carbonate and 325 mg of potassium carbonate, and the mixture was stirred for 5 h. The reaction solution was collected and subjected to TLC, indicating raw materials were almost disappeared. The reaction solution was filtered, and then the filtrate was poured into 50 mL of water, and extracted with 100 mL of dichloromethane. The organic layer was separated, and dried over anhydrous sodium sulfate. After filtration, the filtrate was concentrated under reduced pressure, and the residue was purified by column chromatography, to provide 400 mg of light yellow oil (compound 31).

$^1$H NMR (in CDCl$_3$): δ 8.76 (dd, J=4.8, 0.8 Hz, 1H), 7.97 (t, J=8.0 Hz, 1H), 7.83-7.74 (m, 2H), 7.72 (dt, J=8.8, 2.0 Hz, 1H), 5.63 (q, 1H), 3.68 (s, 3H), 2.93-2.78 (m, 4H), 2.35 (s, 3H), 1.47 (d, J=7.2 Hz, 6H). MS: m/z 657.10 [M+H]$^+$.

Example 32 Preparation of Compound 32 of the Present Invention

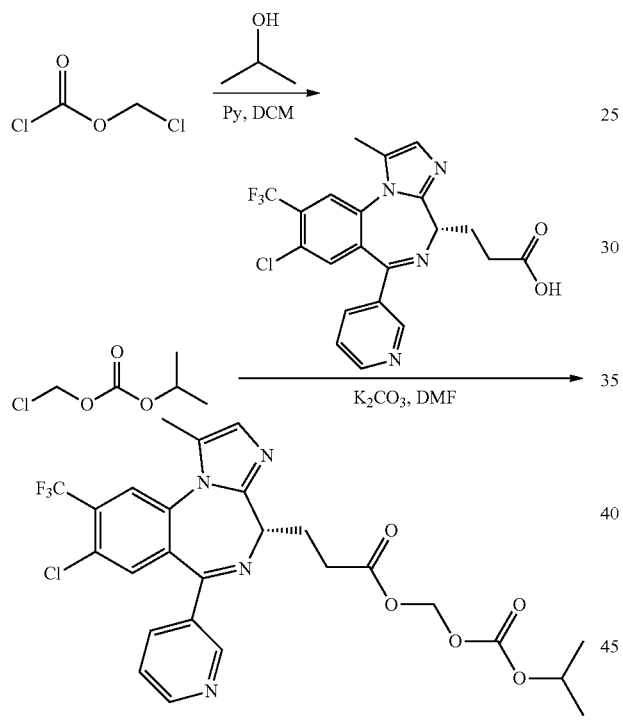

Referring to the synthetic steps of Examples 1 to 7, the intermediate 3-((4S)-8-chloro-1-methyl-6-(pyridin-3-yl)-9-(trifluoromethyl)-4H-benzo[f]imidazo[1,2-a][1,4]diaza-4-yl)propionic acid was obtained from the starting materials 2-amino-5-chloro-4-(trifluoromethyl)benzoic acid and 3-bromopyridine.

1.0 g of chloromethyl chloroformate was added to 30 mL of anhydrous dichloromethane, to which was added 448 mg of propane-2-ol, and then 1.1 g of pyridine was added dropwise under cooling with cold water. The reaction was stirred for 5 h. 50 mL of dichloromethane was added, and then the organic layer was washed twice with 2 N hydrochloric acid, followed by washing the organic layer once with water. The organic layer was separated, dried over anhydrous sodium sulfate, and filtered. The filtrate was evaporated to dry, to provide 900 mg of crude chloromethyl isopropyl carbonate, which was directly used in the next reaction.

500 mg (1.11 mmol, 1.0 eq) of 3-((4S)-8-chloro-1-methyl-6-(pyridin-3-yl)-9-(trifluromethyl)-4H-benzo[f]imidazo[1,2-a][1,4]diaza-4-yl)propionic acid was dissolved in 10 mL of DMF, to which were added 357 mg (2.34 mmol, 2.11 eq) of chloromethyl isopropyl carbonate and 325 mg of potassium carbonate, and the mixture was stirred for 5 h. The reaction solution was collected and subjected to TLC, indicating raw materials were almost disappeared. The reaction solution was filtered, and then the filtrate was poured into 50 mL of water, and extracted with 100 mL of dichloromethane. The organic layer was separated, and dried over anhydrous sodium sulfate. After filtration, the filtrate was concentrated under reduced pressure, and the residue was purified by column chromatography, to provide 400 mg of light yellow oil (compound 32).

$^1$H NMR (in CDCl$_3$): δ 8.57 (d, J=4.8 Hz, 1H), 8.14 (d, J=8.0 Hz, 1H), 8.06-7.97 (m, 2H), 7.82 (d, J=8.8 Hz, 1H), 7.67 (d, J=2.0 Hz, 1H), 7.56 (dd, J=7.2, 5.2 Hz, 1H), 5.76 (q, J=6.0 Hz, 2H), 4.82 (dt, J=12.4, 6.4 Hz, 1H), 4.46 (dd, J=10.0, 4.0 Hz, 1H), 2.95-2.57 (m, 4H), 2.48 (s, 3H), 1.24 (dd, J=10.4, 6.4 Hz, 6H). MS: m/z 565.15 [M+H]$^+$.

Example 33 Preparation of Compound 33 of the Present Invention

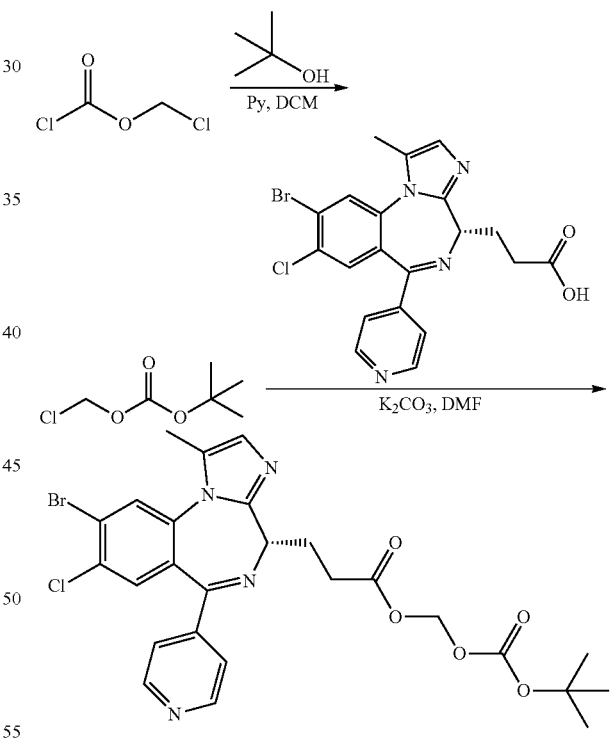

Referring to the synthetic steps of Examples 1 to 7, the intermediate 3-((4S)-9-bromo-8-chloro-1-methyl-6-(pyridin-3-yl)-4H-benzo[f]imidazo[1,2-a][1,4]diaza-4-yl)propionic acid was obtained from the starting materials 2-amino-4-bromo-5-chlorobenzoic acid and 4-bromopyridine.

1.0 g of 1-chloroethyl chloroformate was added to 30 mL of anhydrous dichloromethane, to which was added 448 mg of 2-methylpropane-2-ol, and then 1.1 g of pyridine was added dropwise under cooling with cold water. The reaction was stirred for 5 h. 50 mL of dichloromethane was added, and then the organic layer was washed twice with 2 N hydrochloric acid, followed by washing the organic layer once. The organic layer was separated, dried over anhydrous sodium sulfate, and filtered. The filtrate was evaporated to dry, to provide 878 mg of crude t-butyl (chloromethyl) carbonate, which was directly used in the next reaction.

500 mg (1.11 mmol, 1.0 eq) of 3-((4S)-9-bromo-8-chloro-1-methyl-6-(pyridin-4-yl)-4H-benzo[f]imidazo[1,2-a][1,4]diaza-4-yl)propionic acid was dissolved in 10 mL of DMF, to which were added 390 mg (2.34 mmol, 2.11 eq) of t-butyl (chloromethyl) carbonate and 325 mg of potassium carbonate, and the mixture was stirred for 5 h. The reaction solution was collected and subjected to TLC, indicating raw materials were almost disappeared. The reaction solution was filtered, and then the filtrate was poured into 50 mL of water, and extracted with 100 mL of dichloromethane. The organic layer was separated, and dried over anhydrous sodium sulfate. After filtration, the filtrate was concentrated under reduced pressure, and the residue was purified by column chromatography, to provide 396 mg of light yellow oil (compound 33).

$^1$H NMR (in CDCl$_3$): δ 8.58 (ddd, J=4.8, 1.6, 0.8 Hz, 1H), 8.15 (d, J=8.0 Hz, 1H), 7.81 (td, J=8.0, 1.8 Hz, 1H), 7.70 (dd, J=8.8, 2.0 Hz, 1H), 7.63 (d, J=2.0 Hz, 1H), 7.32 (ddd, J=7.6, 4.8, 1.2 Hz, 1H), 7.28 (d, J=8.8 Hz, 1H), 5.73 (q, J=5.6 Hz, 2H), 4.05 (t, J=6.8 Hz, 1H), 2.93-2.76 (m, 4H), 2.35 (d, J=0.8 Hz, 3H), 1.45 (s, 9H). MS: m/z 589.09 [M+H]$^+$.

Example 34 Preparation of Compound 34 of the Present Invention

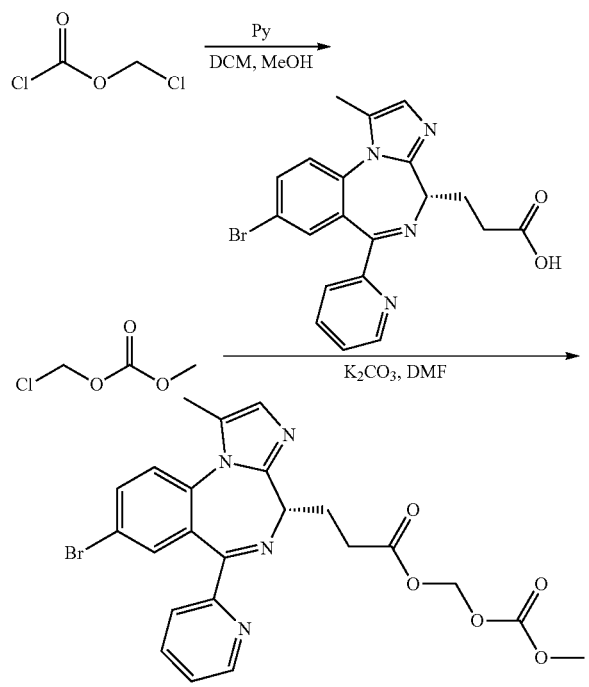

Referring to the synthetic steps of Examples 1 to 7, the intermediate 3-((4S)-8-chloro-1-methyl-6-(pyridin-2-yl)-4H-benzo[f]imidazo[1,2-a][1,4]diaza-4-yl)propionic acid was obtained from the starting materials 2-amino-5-bromobenzoic acid.

By referring to the synthetic steps in Example 8, 1.5 g of chloromethyl chloroformate was added to 30 mL of anhydrous dichloromethane, to which was added 427 mg of methanol, and then 1.72 g of pyridine was added dropwise under cooling with cold water. The reaction was stirred for 2 h. 50 mL of dichloromethane was added, and then the organic layer was washed twice with 2N hydrochloric acid, followed by washing the organic layer once with water. The organic layer was separated, dried over anhydrous sodium sulfate, and filtered. The filtrate was evaporated to dry, to provide 1.2 g of crude chloromethyl methyl carbonate, which was directly used in the next reaction.

500 mg (1.18 mmol, 1.0 eq) of 3-((4S)-8-bromo-1-methyl-6-(pyridin-2-yl)-4H-benzo[f]imidazo[1,2-a][1,4]diaza-4-yl)propionic acid was dissolved in 10 mL of DMF, to which were added 292.8 mg (2.35 mmol, 2.0 eq) of crude chloromethyl methyl carbonate and 325 mg (2.36 mmol, 2.0 eq) of potassium carbonate, and the mixture was stirred for 5 h at room temperature. The reaction solution was collected and subjected to TLC, indicating raw materials were almost disappeared. The reaction solution was filtered, and then the filtrate was poured into 50 mL of water, and extracted with 100 mL of dichloromethane. The organic layer was separated, and dried over anhydrous sodium sulfate. After filtration, the filtrate was concentrated under reduced pressure, and the residue was purified by column chromatography, to provide 547 mg of light yellow oil (compound 34).

$^1$H NMR (in MeOH-d$_4$): δ 8.56 (d, J=4.8 Hz, 1H), 8.15 (d, J=8.0 Hz, 1H), 8.05-7.99 (m, 2H), 7.81 (d, J=8.8 Hz, 1H), 7.69 (s, 1H), 7.58 (dd, J=7.2, 5.2 Hz, 1H), 7.46 (s, 1H), 5.76 (s, 2H), 4.46 (dd, J=10.0, 4.0 Hz, 1H), 3.74 (s, 3H), 2.93-2.59 (m, 4H), 2.51 (d, J=11.2 Hz, 3H). MS: m/z 513.08 [M+H]$^+$.

Example 35 Preparation of Compound 35 of the Present Invention

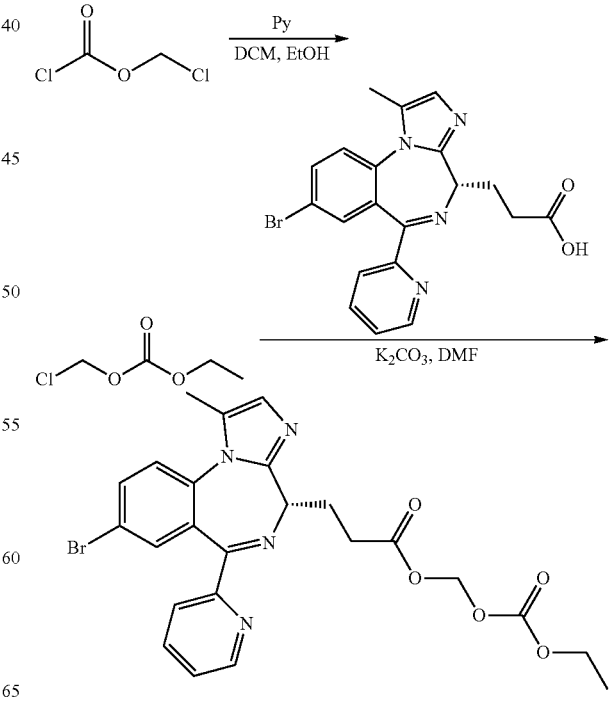

Referring to the synthetic steps of Examples 1 to 7, the intermediate 3-((4S)-8-bromo-1-methyl-6-(pyridin-2-yl)-4H-benzo[f]imidazo[1,2-a][1,4]diaza-4-yl)propionic acid was obtained from the starting material 2-amino-5-bromobenzoic acid.

By referring to the synthetic steps in Example 9, 1.29 g of chloromethyl chloroformate was added to 30 mL of anhydrous dichloromethane, to which was added 860 mg of ethanol, and then 1.9 g of pyridine was added dropwise under cooling with cold water. The reaction was stirred for 2 h. 50 mL of dichloromethane was added, and then the organic layer was washed twice with 2N hydrochloric acid, followed by washing the organic layer once with water. The organic layer was separated, dried over anhydrous sodium sulfate, and filtered. The filtrate was evaporated to dry, to provide 1.4 g of crude chloromethyl ethyl carbonate, which was directly used in the next reaction.

500 mg (1.18 mmol, 1.0 eq) of 3-((4S)-8-bromo-1-methyl-6-(pyridin-2-yl)-4H-benzo[f]imidazo[1,2-a][1,4]diaza-4-yl)propionic acid was dissolved in 10 mL of DMF, to which were added 326.95 mg (2.36 mmol, 2 eq) of crude chloromethyl ethyl carbonate and 324 mg (2.36 mmol, 2.36 eq) of potassium carbonate, and the mixture was stirred for 5 h at room temperature. The reaction solution was collected and subjected to TLC, indicating raw materials were almost disappeared. The reaction solution was filtered, and then the filtrate was poured into 50 mL of water, and extracted with 100 mL of dichloromethane. The organic layer was separated, and dried over anhydrous sodium sulfate. After filtration, the filtrate was concentrated under reduced pressure, and the residue was purified by column chromatography, to provide 597 mg of light yellow oil (compound 35).

$^1$H NMR (in MeOH-d$_4$): δ 8.57 (t, J=7.2 Hz, 1H), 8.18-8.13 (m, 1H), 8.07-7.97 (m, 2H), 7.80 (d, J=8.8 Hz, 1H), 7.69 (d, J=2.0 Hz, 1H), 7.58 (dd, J=7.2, 5.2 Hz, 1H), 7.45 (s, 1H), 5.75 (s, 2H), 4.46 (dd, J=10.0, 4.0 Hz, 1H), 4.14 (q, J=7.2 Hz, 2H), 2.95-2.58 (m, 4H), 2.48 (s, 3H), 1.23 (t, J=7.2 Hz, 3H). MS: m/z 527.09 [M+H]$^+$.

Example 36 Preparation of Compound 36 of the Present Invention

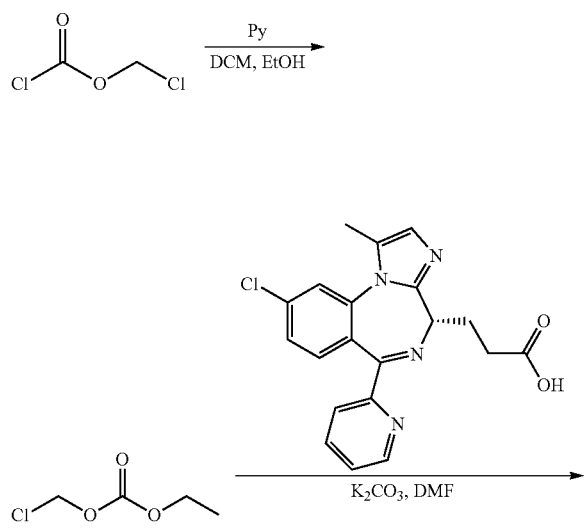

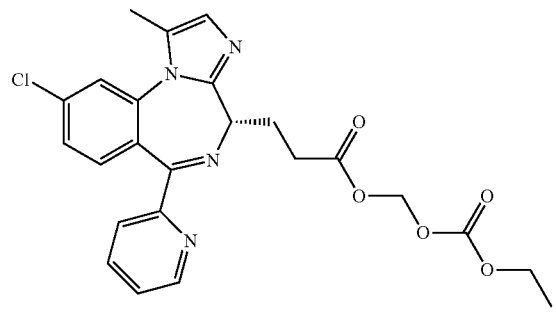

Referring to the synthetic steps of Examples 1 to 7, the intermediate 3-((4S)-9-chloro-1-methyl-6-(pyridin-2-yl)-4H-benzo[f]imidazo[1,2-a][1,4]diaza-4-yl)propionic acid was obtained from the starting material 2-amino-4-chlorobenzoic acid.

By referring to the synthetic steps in Example 9, 1.29 g of chloromethyl chloroformate was added to 30 mL of anhydrous dichloromethane, to which was added 860 mg of ethanol, and then 1.9 g of pyridine was added dropwise under cooling with cold water. The reaction was stirred for 2 h. 50 mL of dichloromethane was added, and then the organic layer was washed twice with 2N hydrochloric acid, followed by washing the organic layer once with water. The organic layer was separated, dried over anhydrous sodium sulfate, and filtered. The filtrate was evaporated to dry, to provide 1.4 g of crude chloromethyl ethyl carbonate, which was directly used in the next reaction.

500 mg (1.32 mmol, 1.0 eq) of 3-((4S)-9-chloro-1-methyl-6-(pyridin-2-yl)-4H-benzo[f]imidazo[1,2-a][1,4]diaza-4-yl)propionic acid was dissolved in 10 mL of DMF, to which were added 326.95 mg (2.36 mmol, 2 eq) of crude chloromethyl ethyl carbonate and 324 mg (2.36 mmol, 2.36 eq) of potassium carbonate, and the mixture was stirred for 5 h at room temperature. The reaction solution was collected and subjected to TLC, indicating raw materials were almost disappeared. The reaction solution was filtered, and then the filtrate was poured into 50 mL of water, and extracted with 100 mL of dichloromethane. The organic layer was separated, and dried over anhydrous sodium sulfate. After filtration, the filtrate was concentrated under reduced pressure, and the residue was purified by column chromatography, to provide 567 mg of light yellow oil (compound 36).

$^1$H NMR (in MeOH-d$_4$): δ 8.67 (t, J=7.2 Hz, 1H), 8.28-8.19 (m, 1H), 8.07-7.97 (m, 2H), 7.80 (d, J=8.8 Hz, 1H), 7.69 (d, J=2.0 Hz, 1H), 7.58 (dd, J=7.2, 5.2 Hz, 1H), 7.45 (s, 1H), 5.75 (s, 2H), 4.46 (dd, J=10.0, 4.0 Hz, 1H), 4.14 (q, J=7.2 Hz, 2H), 2.95-2.58 (m, 4H), 2.48 (s, 3H), 1.23 (t, J=7.2 Hz, 3H). MS: m/z 483.14 [M+H]$^+$.

Example 37 Preparation of Compound 37 of the Present Invention

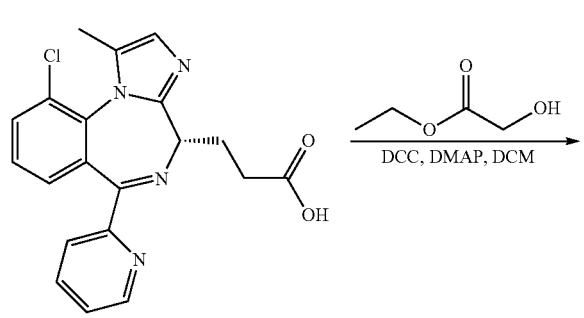

Referring to the synthetic steps of Examples 1 to 7, the intermediate 3-((4S)-10-chloro-1-methyl-6-(pyridin-2-yl)-4H-benzo[f]imidazo[1,2-a][1,4]diaza-4-yl)propionic acid was obtained from the starting material 2-amino-3-chlorobenzoic acid.

500 mg (1.32 mmol, 1.0 eq) of 3-((4S)-10-chloro-1-methyl-6-(pyridin-2-yl)-4H-benzo[f]imidazo[1,2-a][1,4]diaza-4-yl)propionic acid was dissolved in 10 mL of DMF, to which were added 191.58 mg (1.84 mmol, 1.4 eq) of ethyl glycolate, 379 mg (1.84 mmol, 1.4 eq) of DCC and 14 mg (0.13 mmol, 0.1 eq) of DMAP, and the mixture was stirred overnight at room temperature. The reaction solution was collected and subjected to TLC, indicating raw materials were almost disappeared. After filtration, the reaction solution was concentrated under reduced pressure, and the residue was purified by column chromatography, to provide 534 mg of light yellow oil (compound 37).

$^1$H NMR (in CDCl$_3$): δ 8.59-8.53 (m, 1H), 8.18 (d, J=8.0 Hz, 1H), 7.80 (td, J=8.0, 1.6 Hz, 1H), 7.71 (dd, J=8.8, 2.4 Hz, 1H), 7.64 (d, J=2.4 Hz, 1H), 7.34 (ddd, J=7.6, 4.8, 1.2 Hz, 1H), 7.30 (d, J=8.8 Hz, 1H), 6.86 (d, J=1.2 Hz, 1H), 4.58 (s, 2H), 4.14 (dt, J=9.2, 4.8 Hz, 3H), 2.98-2.73 (m, 4H), 2.34 (d, J=0.8 Hz, 3H), 1.23 (t, J=7.2 Hz, 3H). MS: m/z 467.15 [M+H]$^+$.

Example 38 Preparation of Compound 38 of the Present Invention

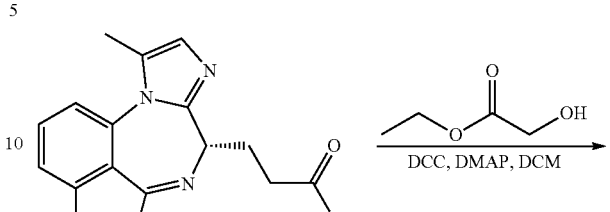

Referring to the synthetic steps of Examples 1 to 7, the intermediate 3-((4S)-7-chloro-1-methyl-6-(pyridin-2-yl)-4H-benzo[f]imidazo[1,2-a][1,4]diaza-4-yl)propionic acid was obtained from the starting material 2-amino-5-chlorobenzoic acid.

500 mg (1.32 mmol, 1.0 eq) of 3-((4S)-7-chloro-1-methyl-6-(pyridin-2-yl)-4H-benzo[f]imidazo[1,2-a][1,4]diaza-4-yl)propionic acid was dissolved in 10 mL of DMF, to which were added 191.58 mg (1.84 mmol, 1.4 eq) of ethyl glycolate, 379 mg (1.84 mmol, 1.4 eq) of DCC and 14 mg (0.13 mmol, 0.1 eq) of DMAP, and the mixture was stirred overnight at room temperature. The reaction solution was collected and subjected to TLC, indicating raw materials were almost disappeared. After filtration, the reaction solution was concentrated under reduced pressure, and the residue was purified by column chromatography, to provide 542 mg of light yellow oil (compound 38).

$^1$H NMR (in CDCl$_3$): δ 8.63-8.54 (m, 1H), 8.33 (d, J=8.0 Hz, 1H), 7.79 (td, J=8.0, 1.6 Hz, 1H), 7.68 (dd, J=8.8, 2.4 Hz, 1H), 7.59 (d, J=2.4 Hz, 1H), 7.27 (ddd, J=7.6, 4.8, 1.2 Hz, 1H), 7.22 (d, J=8.8 Hz, 1H), 6.89 (d, J=1.2 Hz, 1H), 4.68 (s, 2H), 4.24 (dt, J=9.2, 4.8 Hz, 3H), 2.98-2.73 (m, 4H), 2.34 (d, J=0.8 Hz, 3H), 1.23 (t, J=7.2 Hz, 3H). MS: m/z 467.15 [M+H]$^+$.

Example 39 Preparation of Compound 39 of the Present Invention

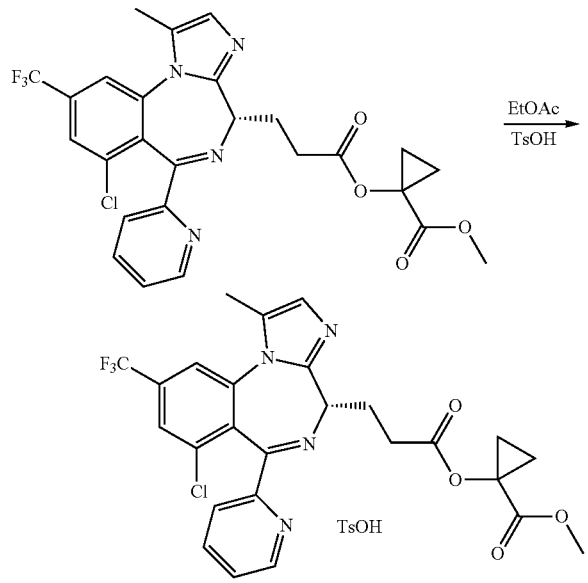

Referring to the synthetic steps of Examples 1 to 7 and Example 25, 1-((3-((4S)-7-chloro-1-methyl-6-(pyridin-2-yl)-9-(trifluoromethyl)-4H-benzo[f]imidazo[1,2-a][1,4]diaza-4-yl)propionyl)oxy)cyclopropane-1-carboxylate was obtained from the starting material 2-amino-4-chloro-4-(trifluoromethyl)benzoic acid.

200 mg (0.36 mmol, 1.0 eq) of 1-((3-((4S)-7-chloro-1-methyl-6-(pyridin-2-yl)-9-(trifluoromethyl)-4H-benzo[f]imidazo[1,2-a][1,4]diaza-4-yl)propionyl)oxy)cyclopropane-1-carboxylate was dissolved in 5 mL of ethyl acetate, to which was added the solution of p-toluenesulfonic acid monohydrate (100 mg, 0.53 mmol, 1.47 eq) in ethanol (5 mL), and then the reaction solution was stirred at room temperature for 1 h. Then, the solution was concentrated under reduced pressure. The residue was crystallized in ethyl acetate, to provide 201 mg of corresponding p-toluenesulfonate as white powdery solid (compound 39).

$^1$H NMR (in CDCl$_3$): δ 8.60-8.52 (m, 1H), 8.19 (d, J=8.0 Hz, 1H), 7.80 (td, J=8.0, 1.6 Hz, 1H), 7.78-7.47 (m, 1H), 7.71 (dd, J=8.8, 2.4 Hz, 1H), 7.64 (d, J=2.4 Hz, 1H), 7.38-7.28 (m, 1H), 4.10 (dd, J=8.0, 5.6 Hz, 1H), 3.60 (s, 3H), 2.93-2.77 (m, 4H), 2.46 (dd, 3H), 2.35 (s, 3H), 1.50 (q, J=5.6 Hz, 2H), 1.17 (q, J=5.6 Hz, 2H). MS: m/z 719.16 (M+1).

Example 40 Preparation of Compound 40 of the Present Invention

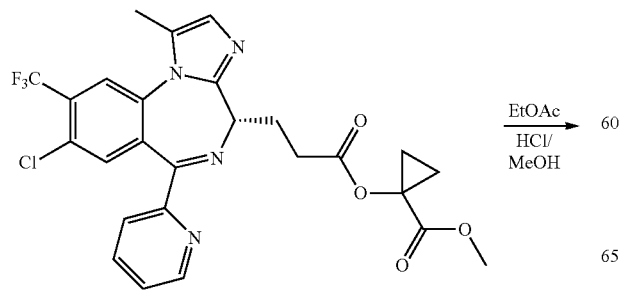

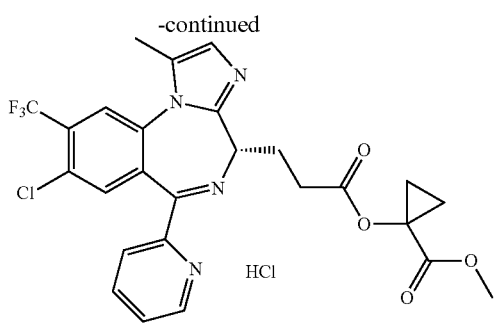

Referring to the synthetic steps of Examples 1 to 7 and Example 25, 1-((3-((4S)-8-chloro-1-methyl-6-(pyridin-2-yl)-9-(trifluoromethyl)-4H-benzo[f]imidazo[1,2-a][1,4]diaza-4-yl)propionyl)oxy)cyclopropane-1-carboxylate was obtained from the starting material 2-amino-5-chloro-4-(trifluoromethyl)benzoic acid.

200 mg (0.36 mmol, 1.0 eq) of 1-((3-((4S)-8-chloro-1-methyl-6-(pyridin-2-yl)-9-(trifluoromethyl)-4H-benzo[f]imidazo[1,2-a][1,4]diaza-4-yl)propionyl)oxy)cyclopropane-1-carboxylate was dissolved in 10 mL of ethyl acetate, to which was drop added 0.1 mol/L of hydrochloric acid-methanol solution at an equal molar amount in an ice bath, and then the reaction solution was stirred at room temperature for 1 h. Then, the solution was concentrated to dry under reduced pressure. The residue was further dried in vacuum, to provide 173 mg of light yellow solid (compound 40).

$^1$H NMR (in CDCl$_3$): δ 8.62-8.53 (m, 1H), 8.14 (d, J=8.0 Hz, 1H), 7.83 (td, J=8.0, 1.6 Hz, 1H), 7.66 (dd, J=8.8, 2.4 Hz, 1H), 7.64 (d, J=2.4 Hz, 1H), 7.36-7.24 (m, 1H), 6.82 (d, J=1.2 Hz, 1H), 4.13 (dd, J=8.0, 5.6 Hz, 1H), 3.65 (s, 3H), 2.91-2.76 (m, 4H), 2.34 (s, 3H), 1.49 (q, J=5.6 Hz, 2H), 1.16 (q, J=5.6 Hz, 2H). MS: m/z 583.11 (M+1).

Example 41 Preparation of Compound 41 of the Present Invention

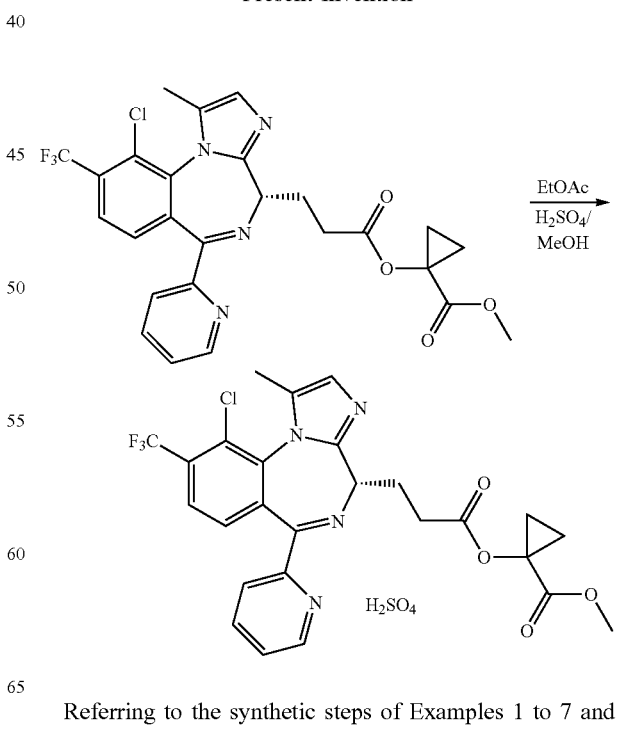

Referring to the synthetic steps of Examples 1 to 7 and Example 25, 1-((3-((4S)-10-chloro-1-methyl-6-(pyridin-2- yl)-9-(trifluoromethyl)-4H-benzo[f]imidazo[1,2-a][1,4]di-aza-4-yl)propionyl)oxy)cyclopropane-1-carboxylate was obtained from the starting material 2-amino-3-chloro-4-(trifluoromethyl)benzoic acid.

200 mg (0.36 mmol, 1.0 eq) of 1-((3-((4S)-10-chloro-1-methyl-6-(pyridin-2-yl)-9-(trifluoromethyl)-4H-benzo[f]imidazo[1,2-a][1,4]diaza-4-yl)propionyl)oxy)cyclopropane-1-carboxylate was dissolved in 10 mL of ethyl acetate, to which was drop added 0.1 mol/L of sulfuric acid-methanol solution at an equal molar amount in an ice bath, and then the reaction solution was concentrated to dry under reduced pressure. The residue was further dried in vacuum, to provide 195 mg of light yellow solid (compound 41).

$^1$H NMR (in MeOH-d$_4$): δ 8.63 (d, J=4.8 Hz, 1H), 8.21 (d, J=8.0 Hz, 1H), 8.05-7.94 (m, 1H), 7.78 (d, J=8.8 Hz, 1H), 7.65 (s, 1H), 7.51 (dd, J=7.2, 5.2 Hz, 1H), 7.41 (s, 1H), 5.72 (s, 2H), 4.43 (dd, J=10.0, 4.0 Hz, 1H), 3.71 (s, 3H), 3.36 (s, 3H), 2.87-2.59 (m, 4H), 2.51 (d, J=11.2 Hz, 3H). MS: m/z 645.11 (M+1).

Example 42 Preparation of Compound 42 of the Present Invention

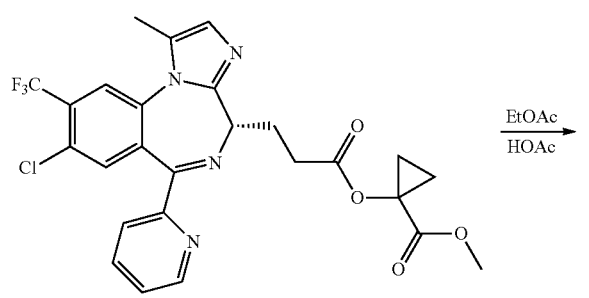

Referring to the synthetic steps of Examples 1 to 7 and Example 25, 1-((3-((4S)-8-chloro-1-methyl-6-(pyridin-2-yl)-9-(trifluoromethoxy)-4H-benzo[f]imidazo[1,2-a][1,4]di-aza-4-yl)propionyl)oxy)cyclopropane-1-carboxylate was obtained from the starting material 2-amino-5-chloro-4-(trifluoromethyl)benzoic acid.

200 mg (0.36 mmol, 1.0 eq) of 1-((3-((4S)-8-chloro-1-methyl-6-(pyridin-2-yl)-9-(trifluoromethoxy)-4H-benzo[f]imidazo[1,2-a][1,4]diaza-4-yl)propionyl)oxy)cyclopropane-1-carboxylate was dissolved in 5 mL of ethyl acetate, to which was drop added an equal molar amount of glacial acetic acid, and then the reaction solution was concentrated under reduced pressure. The residue was further dried in vacuum, to provide 193 mg of light yellow solid (compound 42).

$^1$H NMR (in MeOH-d$_4$): δ 8.65 (d, J=4.8 Hz, 1H), 8.18 (d, J=8.0 Hz, 1H), 8.04-7.97 (m, 1H), 7.84 (d, J=8.8 Hz, 1H), 7.65 (s, 1H), 7.63 (d, J=8.0 Hz, 1H), 7.57 (dd, J=7.2, 5.2 Hz, 1H), 5.78 (s, 2H), 4.47 (dd, J=10.0, 4.0 Hz, 1H), 3.75 (s, 3H), 2.92-2.62 (m, 4H), 2.53 (d, J=11.2 Hz, 3H), 2.35 (s, 3H). MS: m/z 623.15 (M+1).

Example 43 Preparation of Compound 43 of the Present Invention

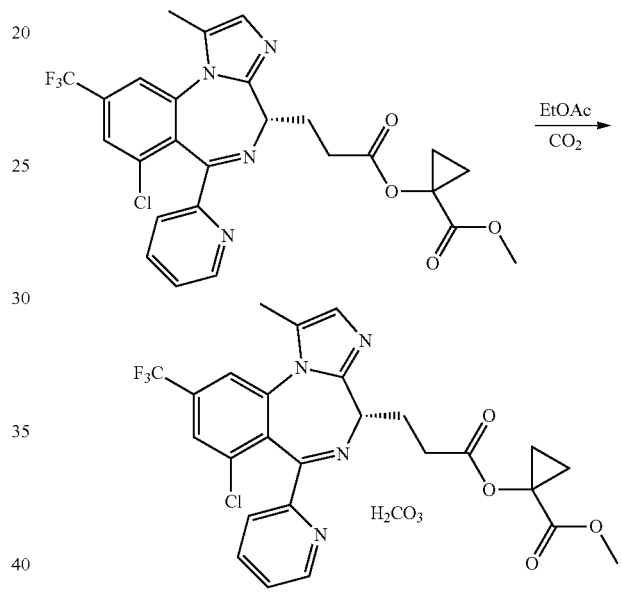

Referring to the synthetic steps of Examples 1 to 7 and Example 25, 1-((3-((4S)-10-chloro-1-methyl-6-(pyridin-2-yl)-9-(trifluoromethoxy)-4H-benzo[f]imidazo[1,4]diaza-4-yl)propionyl)oxy)cyclopropane-1-carboxylate was obtained from the starting material 2-amino-6-chloro-4-(trifluoromethoxy)benzoic acid.

200 mg (0.36 mmol, 1.0 eq) of 1-((3-((4S)-10-chloro-1-methyl-6-(pyridin-2-yl)-9-(trifluoromethoxy)-4H-benzo[f]imidazo[1,2-a][1,4]diaza-4-yl)propionyl)oxy)cyclopropane-1-carboxylate was dissolved in 5 mL of ethyl acetate, to which was purged CO2 gas for 10 min (flow rate: 2 mL/min), and then the reaction solution was concentrated under reduced pressure. The residue was further dried in vacuum, to provide 197 mg of light yellow solid (compound 43).

$^1$H NMR (in MeOH-d$_4$): δ 8.67 (d, J=4.8 Hz, 1H), 8.15 (d, J=8.0 Hz, 1H), 8.13 (s, 1H), 8.03-7.96 (m, 1H), 7.85 (d, J=8.8 Hz, 1H), 7.64 (s, 1H), 7.62 (d, J=8.0 Hz, 1H), 5.75 (s, 2H), 4.46 (dd, J=10.0, 4.0 Hz, 1H), 3.73 (s, 3H), 2.91-2.63 (m, 4H), 2.54 (d, J=11.2 Hz, 3H), 2.37 (s, 3H). MS: m/z 625.13 (M+1).

Example 44 Preparation of Compound 44 of the Present Invention

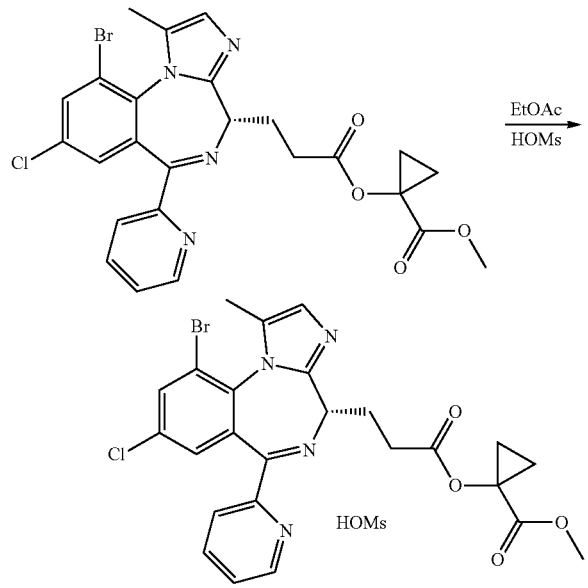

Referring to the synthetic steps of Examples 1 to 7 and Example 25, 1-((3-((4S)-10-bromo-8-chloro-1-methyl-6-(pyridin-2-yl)-4H-benzo[f]imidazo[1,2-a][1,4]diaza-4-yl)propionyl)oxy)cyclopropane-1-carboxylate was obtained from the starting material 2-amino-5-bromo-3-chlorobenzoic acid.

200 mg (0.36 mmol, 1.0 eq) of 1-((3-((4S)-10-bromo-8-chloro-1-methyl-6-(pyridin-2-yl)-4H-benzo[f]imidazo[1,2-a][1,4]diaza-4-yl)propionyl)oxy)cyclopropane-1-carboxylate was dissolved in 5 mL of ethyl acetate, to which was added 1.0 eq methanesulfonic acid, and then the reaction solution was concentrated under reduced pressure, to provide 201 mg of light yellow solid (compound 44).

$^1$H NMR (in MeOH-d$_4$): δ 8.67 (d, J=4.8 Hz, 1H), 8.15 (d, J=8.0 Hz, 1H), 8.01-7.92 (m, 1H), 7.82 (d, J=8.8 Hz, 1H), 7.63 (s, 1H), 7.62 (d, J=8.0 Hz, 1H), 7.55 (dd, J=7.2, 5.2 Hz, 1H), 5.75 (s, 2H), 4.46 (dd, J=10.0, 4.0 Hz, 1H), 3.72 (s, 3H), 3.32 (s, 1H), 2.94-2.65 (m, 4H), 2.54 (d, J=11.2 Hz, 3H), 2.36 (s, 3H). MS: m/z 653.05 (M+1).

Example 45 Preparation of Compound 45 of the Present Invention

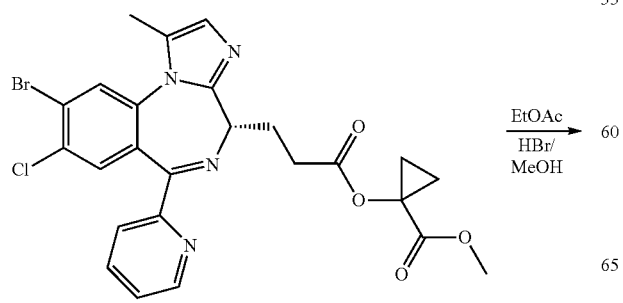

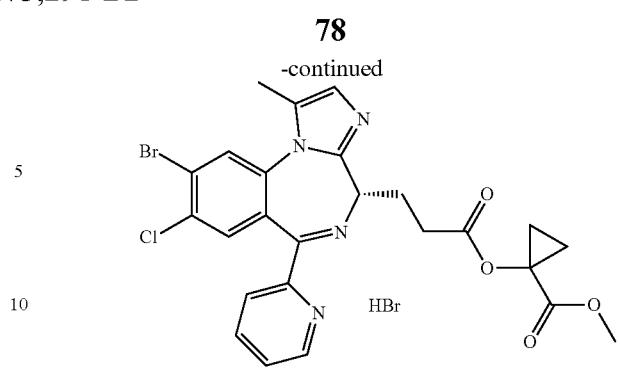

Referring to the synthetic steps of Examples 1 to 7 and Example 25, 1-((3-((4S)-9-bromo-8-chloro-1-methyl-6-(pyridin-2-yl)-4H-benzo[f]imidazo[1,2-a][1,4]diaza-4-yl)propionyl)oxy)cyclopropane-1-carboxylate was obtained from the starting material 2-amino-4-bromo-5-chlorobenzoic acid.

200 mg (0.36 mmol, 1.0 eq) of 1-((3-((4S)-9-bromo-8-chloro-1-methyl-6-(pyridin-2-yl)-4H-benzo[f]imidazo[1,2-a][1,4]diaza-4-yl)propionyl)oxy)cyclopropane-1-carboxylate was dissolved in 5 mL of ethyl acetate, to which was drop added 0.1 mol/L of hydrobromic acid-methanol solution at an equal molar amount in an ice bath, and then the reaction solution was concentrated under reduced pressure, to provide 193 mg of light yellow solid (compound 45).

$^1$H NMR (in MeOH-d$_4$): δ 8.64-8.56 (m, 1H), 8.12 (d, J=8.0 Hz, 1H), 7.85 (td, J=8.0, 1.6 Hz, 1H), 7.67 (dd, J=8.8, 2.4 Hz, 1H), 7.63 (d, J=2.4 Hz, 1H), 7.38-7.25 (m, 1H), 6.81 (d, J=1.2 Hz, 1H), 4.15 (dd, J=8.0, 5.6 Hz, 1H), 3.64 (s, 3H), 2.89-2.74 (m, 4H), 2.33 (s, 3H), 1.48 (q, J=5.6 Hz, 2H), 1.15 (q, J=5.6 Hz, 2H). MS: m/z 638.99 (M+1).

Example 46 Preparation of Compound 46 of the Present Invention

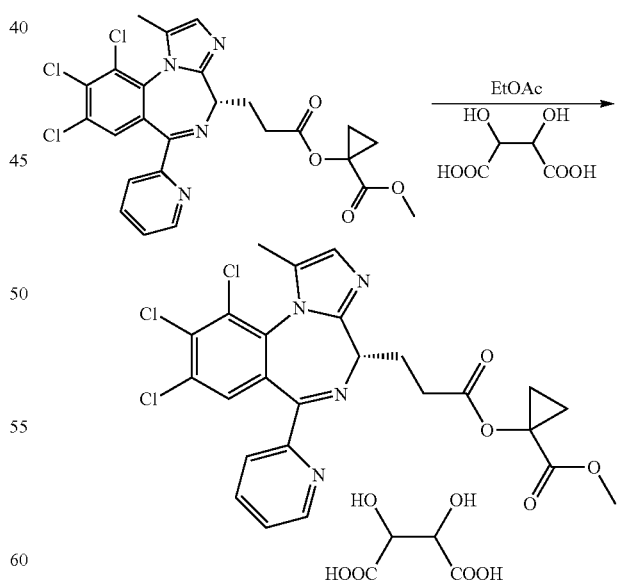

Referring to the synthetic steps of Examples 1 to 7 and Example 25, 1-((3-((4S)-8,9,10-trichloro-1-methyl-6-(pyridin-2-yl)-4H-benzo[f]imidazo[1,2-a][1,4]diaza-4-yl)propionyl)oxy)cyclopropane-1-carboxylate was obtained from the starting material 2-amino-3,4,5-trichlorobenzoic acid.

200 mg (0.36 mmol, 1.0 eq) of 1-((3-((4S)-8,9,10-trichloro-1-methyl-6-(pyridin-2-yl)-4H-benzo[f]imidazo[1,2-a][1,4]diaza-4-yl)propionyl)oxy)cyclopropane-1-carboxylate was dissolved in 5 mL of ethyl acetate, to which was added 1.0 eq tartaric acid, and then the reaction solution was concentrated under reduced pressure, to provide 213 mg of light yellow solid (compound 46).

$^1$H NMR (in MeOH-d$_4$): δ 8.63-8.57 (m, 1H), 8.14 (d, J=8.0 Hz, 1H), 7.87 (td, J=8.0, 1.6 Hz, 1H), 7.65 (dd, J=8.8, 2.4 Hz, 1H), 7.63 (d, J=2.4 Hz, 1H), 7.36-7.24 (m, 1H), 4.81 (s, 6H), 4.13 (dd, J=8.0, 5.6 Hz, 1H), 3.65 (s, 3H), 2.87-2.72 (m, 4H), 2.31 (s, 3H), 1.47 (q, J=5.6 Hz, 2H), 1.12 (q, J=5.6 Hz, 2H). MS: m/z 697.09 (M+1).

Compounds 47-81 of Examples 47-81 were prepared according to the method of the above examples. The specific structure, name, raw materials and characteristic data of compounds 47-81 are shown in Table 1.

TABLE 1

The specific structure, name, raw materials and characteristic data of compounds 47-81 of Examples 47-81.

| Compounds | Name | Raw materials | NMR and MS data |
|---|---|---|---|
| 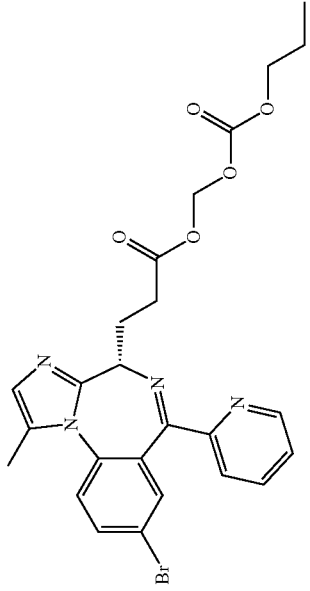  Example 47 | ((Propoxycarbonyl)oxy)methyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, MeOD) δ 8.57 (t, J = 7.2 Hz, 1H), 8.18-8.13 (m, 1H), 8.07-7.97 (m, 2H), 7.80 (d, J = 8.8 Hz, 1H), 7.69 (d, J = 2.0 Hz, 1H), 7.58 (dd, J = 7.2, 5.2 Hz, 1H), 7.45 (s, 1H), 5.75 (s, 2H), 4.46 (dd, J = 10.0, 4.0 Hz, 1H), 4.14 (q, J = 7.2 Hz, 2H), 2.95-2.58 (m, 6H), 2.48 (s, 3H), 1.23 (t, J = 7.2 Hz, 3H). MS: m/z 541.11 [M + H]$^+$ |
| 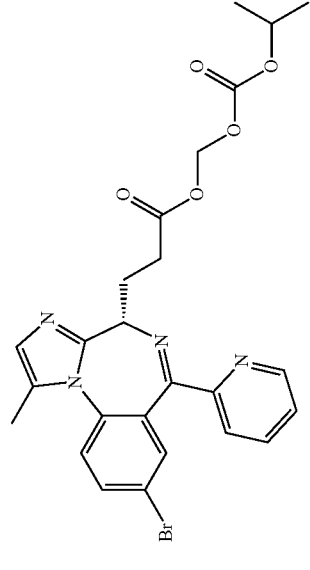  Example 48 | ((Isopropoxycarbonyl)oxy)methyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, MeOD) δ 8.56 (d, J = 4.8 Hz, 1H), 8.15 (d, J = 8.0 Hz, 1H), 8.08-7.98 (m, 2H), 7.81 (d, J = 8.8 Hz, 1H), 7.69 (d, J = 2.0 Hz, 1H), 7.59 (dd, J = 7.2, 5.2 Hz, 1H), 7.46 (s, 1H), 5.74 (q, J = 6.0 Hz, 2H), 4.80 (dt, J = 12.4, 6.4 Hz, 1H), 4.47 (dd, J = 10.0, 4.0 Hz, 1H), 2.93-2.56 (m, 4H), 2.49 (s, 3H), 1.22 (dd, J = 10.4, 6.4 Hz, 6H). MS: m/z 541.11 [M + H]$^+$ |

TABLE 1-continued

The specific structure, name, raw materials and characteristic data of compounds 47-81 of Examples 47-81.

| Compounds | Name | Raw materials | NMR and MS data |
|---|---|---|---|
| 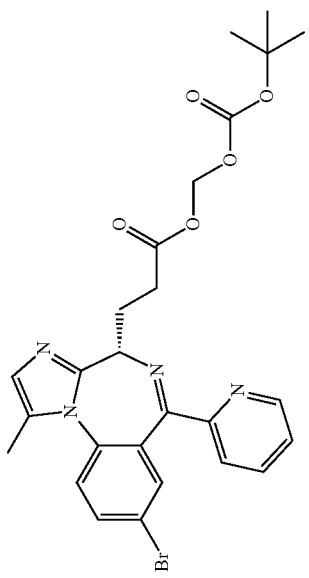<br>Example 49 | ((tert-butoxycarbonyl)oxy)methyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, CDCl$_3$) δ 8.57 (ddd, J = 4.8, 1.6, 0.8 Hz, 1H), 8.17 (d, J = 8.0 Hz, 1H), 7.80 (td, J = 8.0, 1.8 Hz, 1H), 7.72 (dd, J = 8.8, 2.0 Hz, 1H), 7.64 (d, J = 2.0 Hz, 1H), 7.34 (ddd, J = 7.6, 4.8, 1.2 Hz, 1H), 7.30 (d, J = 8.8 Hz, 1H), 6.86 (d, J = 1.2 Hz, 1H), 5.71 (q, J = 5.6 Hz, 2H), 4.07 (t, J = 6.8 Hz, 1H), 2.91-2.74 (m, 4H), 2.34 (d, J = 0.8 Hz, 3H), 1.48 (s, 9H). MS: m/z 555.12 [M + H]$^+$ |
| 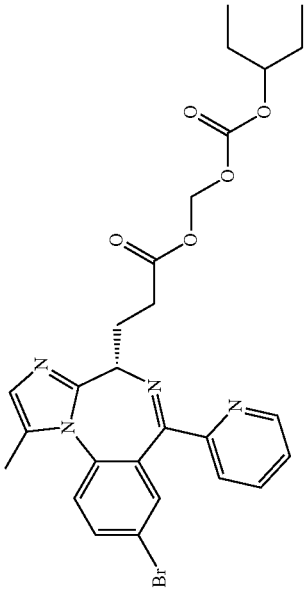<br>Example 50 | ((((Pentanyl-3-yl)oxy)carbonyl)oxy)methyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, CDCl$_3$) δ 8.56 (d, J = 4.0 Hz, 1H), 8.16 (d, J = 8.0 Hz, 1H), 7.80 (td, J = 8.0, 1.6 Hz, 1H), 7.71 (dd, J = 8.8, 2.0 Hz, 1H), 7.64 (d, J = 2.0 Hz, 1H), 7.34 (ddd, J = 7.6, 4.8, 0.8 Hz, 1H), 7.30 (d, J = 8.8 Hz, 1H), 6.86 (d, J = 0.8 Hz, 1H), 5.77 (q, J = 5.6 Hz, 2H), 4.61 (p, J = 6.0 Hz, 1H), 4.07 (dd, J = 8.4, 5.2 Hz, 1H), 2.93-2.72 (m, 4H), 2.33 (s, 3H), 1.66-1.56 (m, 4H), 0.90 (td, J = 7.4, 3.3 Hz, 6H). MS: m/z 569.14 [M + H]$^+$ |

TABLE 1-continued

The specific structure, name, raw materials and characteristic data of compounds 47-81 of Examples 47-81.

| Compounds | Name | Raw materials | NMR and MS data |
|---|---|---|---|
| 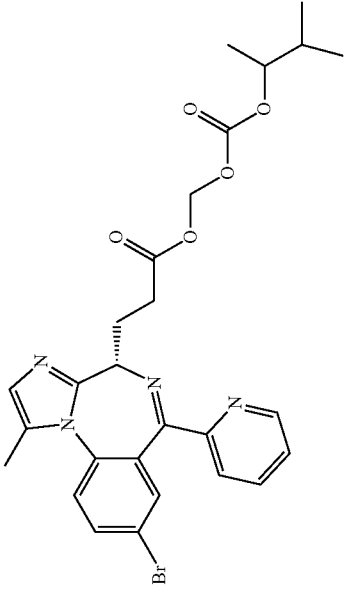<br>Example 51 | (((((3-Methylbutan-2-yl)oxy)carbonyl)oxy)methyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, MeOD) δ 8.55 (d, J = 4.8 Hz, 1H), 8.16 (d, J = 8.0 Hz, 1H), 8.05-7.97 (m, 2H), 7.80 (d, J = 8.8 Hz, 1H), 7.66 (s, 1H), 7.57 (dd, J = 7.2, 5.2 Hz, 1H), 7.44 (s, 1H), 5.75 (dt, J = 6.0, 4.0 Hz, 2H), 4.53 (dd, J = 11.6, 6.0 Hz, 1H), 4.46 (dd, J = 9.6, 4.0 Hz, 1H), 2.89-2.55 (m, 4H), 2.48 (s, 3H), 1.76 (m, 1H), 1.16 (dd, J = 15.6, 6.4 Hz, 3H), 0.87 (td, J = 7.2, 2.8 Hz, 6H). MS: m/z 569.14 [M + H]$^+$ |
| 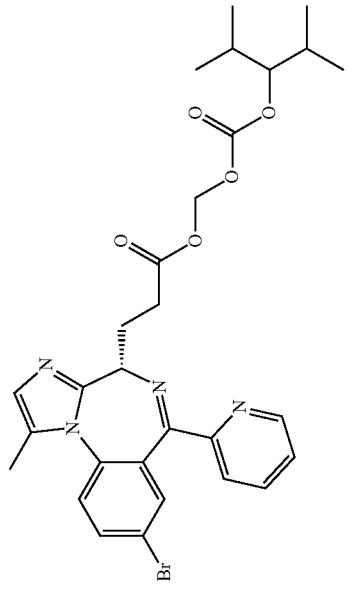<br>Example 52 | (((((2,4-Dimethylpentane-3-yl)oxy)carbonyl)oxy)methyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, CDCl$_3$) δ 8.57 (dd, J = 4.8, 0.8 Hz, 1H), 8.16 (d, J = 8.0 Hz, 1H), 7.80 (td, J = 7.6, 2.0 Hz, 1H), 7.74-7.69 (m, 2H), 7.64 (d, J = 2.4 Hz, 1H), 7.53 (dd, J = 5.6, 3.2 Hz, 1H), 7.34 (ddd, J = 7.6, 4.8, 1.2 Hz, 1H), 7.30 (d, J = 8.8 Hz, 1H), 6.85 (d, J = 1.2 Hz, 1H), 5.77 (q, J = 5.6 Hz, 2H), 4.40 (t, J = 6.0 Hz, 1H), 4.31 (t, J = 6.8 Hz, 2H), 4.05 (d, J = 6.0 Hz, 1H), 2.88-2.77 (m, 4H), 2.34 (d, J = 0.8 Hz, 3H), 0.91-0.86 (m, 12H). MS: m/z 597.17 [M + H]$^+$ |

TABLE 1-continued

The specific structure, name, raw materials and characteristic data of compounds 47-81 of Examples 47-81.

| Compounds | Name | Raw materials | NMR and MS data |
|---|---|---|---|
| Example 53 | 1-((methoxycarbonyl)oxy)ethyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, CDCl$_3$) δ 8.57 (d, J = 4.2 Hz, 1H), 8.17 (dd, J = 8.0, 2.8 Hz, 1H), 7.80 (td, J = 7.6, 1.6 Hz, 1H), 7.73-7.70 (m, 1H), 7.64 (dd, J = 5.2, 2.4 Hz, 1H), 7.37-7.28 (m, 2H), 6.86 (s, 1H), 6.76 (t, J = 5.6 Hz, 1H), 4.06 (dd, J = 12.4, 6.6 Hz, 1H), 3.76 (d, J = 8.8 Hz, 3H), 2.92-2.75 (m, 4H), 2.34 (s, 3H), 1.49 (d, J = 5.2 Hz, 3H). MS: m/z 527.09 [M + H]$^+$ |
| 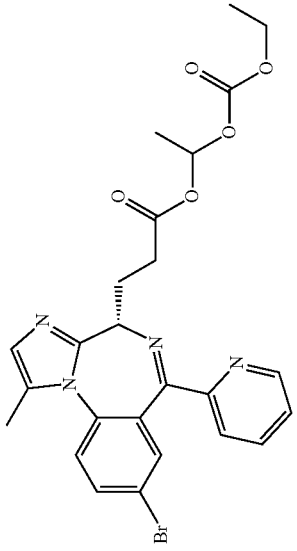 | 1-((ethoxycarbonyl)oxy)ethyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, CDCl$_3$) δ 8.57 (d, J = 4.6 Hz, 1H), 8.21-8.14 (m, 1H), 7.80 (td, J = 7.6, 1.6 Hz, 1H), 7.72-7.69 (m, 1H), 7.64 (dd, J = 4.4, 2.4 Hz, 1H), 7.35 (ddd, J = 7.6, 4.8, 1.2 Hz, 1H), 7.30 (d, J = 8.8 Hz, 1H), 6.86 (d, J = 1.2 Hz, 1H), 6.76 (t, J = 5.6 Hz, 1H), 4.16 (ddd, J = 7.1, 6.1, 2.4 Hz, 2H), 4.06 (dd, J = 12.4, 6.6 Hz, 1H), 2.87-2.74 (m, 4H), 2.34 (d, J = 0.8 Hz, 3H), 1.54-1.46 (m, 3H), 1.30-1.26 (m, 3H). MS: m/z 541.11 [M + H]$^+$ |
| Example 54 | 1-((Isopropoxycarbonyl)oxy)ethyl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, DMSO-d$_6$) δ 8.58 (d, J = 4.4 Hz, 1H), 8.13 (d, J = 8.0 Hz, 1H), 8.00 (dd, J = 14.4, 8.0 Hz, 2H), 7.85 (d, J = 8.8 Hz, 1H), 7.74 (s, 1H), 7.56 (dd, J = 7.2, 5.2 Hz, 1H), 7.47 (s, 1H), 6.73-6.57 (m, 1H), 4.8-4.63 (m, 1H), 4.36 (dt, J = 8.8, 5.6 Hz, 1H), 2.87-2.55 (m, 4H), 2.39 (s, 3H), 1.43 (t, J = 5.6 Hz, 3H), 1.25-1.12 (m, 6H). MS: m/z 555.12 [M + H]$^+$ |

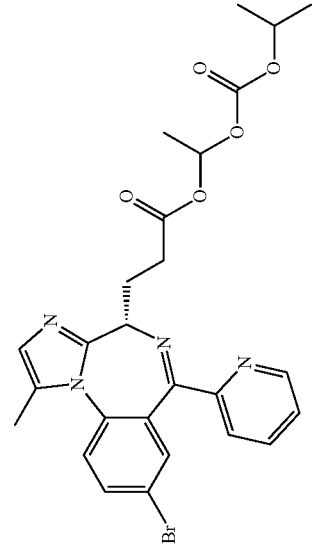

TABLE 1-continued

The specific structure, name, raw materials and characteristic data of compounds 47-81 of Examples 47-81.

| Compounds | Name | Raw materials | NMR and MS data |
|---|---|---|---|
| Example 55 | 2-Methoxy-2-oxoethyl-3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, MeOD) δ 8.56 (d, J = 4.8 Hz, 1H), 8.17 (d, J = 8.0 Hz, 1H), 8.08-7.94 (m, 2H), 7.80 (d, J = 8.8 Hz, 1H), 7.69 (s, 1H), 7.58 (dd, J = 7.2, 5.2 Hz, 1H), 7.45 (s, 1H), 4.70-4.58 (m, 2H), 4.55 (dd, J = 10.4, 4.4 Hz, 1H), 3.66 (s, 3H), 2.99-2.59 (m, 4H), 2.49 (s, 3H). MS: m/z 497.08 [M + H]$^+$ |
| Example 56 | 2-Ethoxy-2-oxoethyl-3-((4S)-8-bromo-1-methyl-6-(pyridine-2-yl)-4H-benzo[f]imidazo[1,2-a][1,4]diaza-4-yl)propionate | e | $^1$H NMR (400 MHz, CDCl$_3$) δ 8.59-8.53 (m, 1H), 8.18 (d, J = 8.0 Hz, 1H), 7.80 (td, J = 8.0, 1.6 Hz, 1H), 7.71 (dd, J = 8.8, 2.4 Hz, 1H), 7.64 (d, J = 2.4 Hz, 1H), 7.34 (ddd, J = 7.6, 4.8, 1.2 Hz, 1H), 7.30 (d, J = 8.8 Hz, 1H), 6.86 (d, J = 1.2 Hz, 1H), 4.58 (s, 2H), 4.14 (dt, J = 9.2, 4.8 Hz, 3H), 2.98-2.73 (m, 4H), 2.34 (d, J = 0.8 Hz, 3H), 1.23 (t, J = 7.2 Hz, 3H). MS: m/z 511.10 [M + H]$^+$ |
| Example 57 | | | |

TABLE 1-continued

The specific structure, name, raw materials and characteristic data of compounds 47-81 of Examples 47-81.

| Compounds | Name | Raw materials | NMR and MS data |
|---|---|---|---|
| Example 58 | Methyl 1-((3-((4S)-8-bromo-1-methyl-6-(pyridine-2-yl)-4H-benzo[f]imidazo[1,2-a][1,4]diaza-4-yl)propionyl)oxy)cyclopropane-1-carboxylate | 2-amino-5-bromo-benzoic acid | $^1$H NMR (400 MHz, CDCl$_3$) δ 8.60-8.52 (m, 1H), 8.19 (d, J = 8.0 Hz, 1H), 7.80 (td, J = 8.0, 1.6 Hz, 1H), 7.71 (dd, J = 8.8, 2.4 Hz, 1H), 7.64 (d, J = 2.4 Hz, 1H), 7.38-7.28 (m, 2H), 6.86 (d, J = 1.2 Hz, 1H), 4.10 (dd, J = 8.0, 5.6 Hz, 1H), 3.60 (s, 3H), 2.93-2.77 (m, 4H), 2.34 (s, 3H), 1.50 (q, J = 5.6, 5.6 Hz, 2H), 1.17 (q, J = 5.6 Hz, 2H). MS: m/z 523.10 [M + H]$^+$ |
| Example 58 | Ethyl 1-((3-((4S)-8-bromo-1-methyl-6-(pyridine-2-yl)-4H-benzo[f]imidazo[1,2-a][1,4]diaza-4-yl)propionyl)oxy)cyclopropane-1-carboxylate | 2-amino-5-bromo-benzoic acid | $^1$H NMR (400 MHz, CDCl$_3$) δ 8.57 (dd, J = 4.8, 0.8 Hz, 1H), 8.19 (d, J = 8.0 Hz, 1H), 7.80 (td, J = 8.0, 2.0 Hz, 1H), 7.72-7.69 (m, 1H), 7.63 (d, J = 2.0 Hz, 1H), 7.35 (ddd, J = 7.6, 4.8, 1.2 Hz, 1H), 7.30 (d, J = 8.8 Hz, 1H), 6.86 (d, J = 1.2 Hz, 1H), 4.15-4.04 (m, 3H), 2.90-2.74 (m, 4H), 2.34 (d, J = 0.8 Hz, 3H), 1.49 (dd, J = 8.4, 5.2 Hz, 2H), 1.20-1.12 (m, 5H). MS: m/z 537.11 [M + H]$^+$ |
| Example 59 | 1-Methoxy-1-oxopropane-2-yl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, CDCl$_3$) δ 8.57 (dd, J = 4.8, 0.8 Hz, 1H), 8.19 (t, J = 8.0 Hz, 1H), 7.83-7.77 (m, 1H), 7.71 (dt, J = 8.8, 2.0 Hz, 1H), 7.64 (dd, J = 6.0, 2.4 Hz, 1H), 7.34 (ddd, J = 7.6, 4.8, 1.2 Hz, 1H), 7.30 (d, J = 8.8, 3.2 Hz, 1H), 6.86 (d, J = 1.2 Hz, 1H), 5.11-5.02 (m, 1H), 4.10 (td, J = 5.6, 3.2 Hz, 1H), 3.66 (s, 3H), 2.92-2.78 (m, 4H), 2.34 (s, 3H), 1.44 (d, J = 7.2 Hz, 3H). MS: m/z 511.10 [M + H]$^+$ |

TABLE 1-continued

The specific structure, name, raw materials and characteristic data of compounds 47-81 of Examples 47-81.

| Compounds | Name | Raw materials | NMR and MS data |
|---|---|---|---|
| Example 60 | 1-Ethoxy-1-oxopropane-2-yl 3-((4S)-8-bromo-1-methyl-6-(pyridine-2-yl)-4H-benzo[f]imidazo[1,2-a][1,4]diaza-4-yl)propionate | 2-amino-5-bromo-benzoic acid | $^1$H NMR (400 MHz, CDCl$_3$) δ 8.57 (d, J = 4.8 Hz, 1H), 8.19 (t, J = 8.0 Hz, 1H), 7.84-7.76 (m, 1H), 7.74-7.68 (m, 1H), 7.64 (dd, J = 5.2, 2.4 Hz, 1H), 7.36-7.32 (m, 1H), 7.30 (dd, J = 8.8, 3.2 Hz, 1H), 6.86 (d, J = 1.2 Hz, 1H), 5.04 (dt, J = 7.2, 4.8 Hz, 1H), 4.22-4.04 (m, 3H), 2.99-2.69 (m, 4H), 2.34 (s, 3H), 1.44 (t, J = 6.8 Hz, 3H), 1.21 (td, J = 7.2, 2.8 Hz, 3H). MS: m/z 525.11 [M + H]$^+$ |
| Example 61 | | | |
| Example 62 | Methyl 2-((3-((4S)-8-bromo-1-methyl-6-(pyridine-2-yl)-4H-benzo[f]imidazo[1,2-a][1,4]diaza-4-yl)propionyl)oxy)-2-methylpropionate | 2-amino-5-bromo-benzoic acid | $^1$H NMR (400 MHz, CDCl$_3$) δ 8.57 (d, J = 4.0 Hz, 1H), 8.20 (d, J = 8.0 Hz, 1H), 7.80 (td, J = 7.8, 1.7 Hz, 1H), 7.73-7.70 (m, 1H), 7.64 (d, J = 2.2 Hz, 1H), 7.37-7.32 (m, 1H), 7.30 (d, J = 8.7 Hz, 1H), 6.86 (d, J = 0.9 Hz, 1H), 4.05 (dd, J = 8.1, 5.4 Hz, 1H), 3.58 (s, 3H), 2.92-2.71 (m, 4H), 2.34 (s, 3H), 1.50 (d, J = 1.1 Hz, 6H). MS: m/z 525.11 [M + H]$^+$ |

TABLE 1-continued

The specific structure, name, raw materials and characteristic data of compounds 47-81 of Examples 47-81.

| Compounds | Name | Raw materials | NMR and MS data |
|---|---|---|---|
| 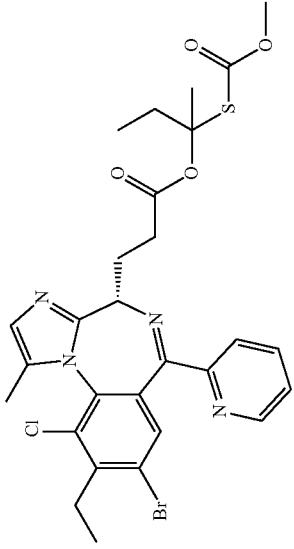<br>Example 63 | 2-((methoxycarbonyl)thio)Butan-2-yl 3-((4S)-8-bromo-10-chloro-9-ethyl-1-methyl-6-(pyridine-2-yl)-4H-benzo[f]imidazo[1,2-a][1,4]diaza-4-yl)propionate | 2-amino-5-bromo-3-chloro-4-ethyl-benzoic acid | MS: m/z 633.0932 [M + H]⁺ |
| 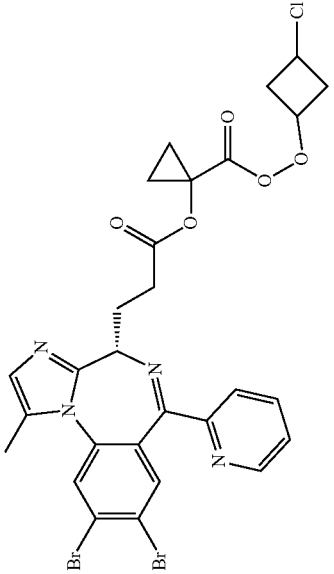<br>Example 64 | 1-(((3-chlorocyclobutyl)peroxy)carbonyl)cyclopropyl 3-((4S)-8,9-dibromo-1-methyl-6-(pyridine-2-yl)-4H-benzo[f]imidazo[1,2-a][1,4]diaza-4-yl)propionate | 2-amino-4,5-dibromo-benzoic acid | MS: m/z 692.9933 [M + H]⁺ |

TABLE 1-continued

The specific structure, name, raw materials and characteristic data of compounds 47-81 of Examples 47-81.

| Compounds | Name | Raw materials | NMR and MS data |
|---|---|---|---|
| Example 65 | Methyl 5-((3-((4S)-8-bromo-10-chloro-1-methyl-6-(pyridine-2-yl)-4H-benzo[f]imidazo[1,2-a][1,4]diazapin-4-yl)propionyl)oxy)-2-ethoxy-5-methylcaproate | 2-amino-5-bromo-3-chloro-benzoic acid | MS: m/z 645.1474 [M + H]$^+$ |
| Example 66 | 2-((cyclobutoxycarbonyl)amino)propane-2-yl3-((4S)-8-bromo-10-chloro-1,9-dimethyl-6-(pyridine-2-yl)-4H-benzo[f]imidazo[1,2-a][1,4]diaza-4-yl)propionate | 2-amino-5-bromo-3-chloro-4-methyl-benzoic acid | MS: m/z 28.1321 [M + H]$^+$ |

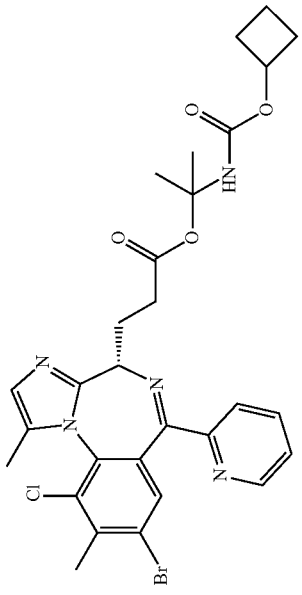

TABLE 1-continued

The specific structure, name, raw materials and characteristic data of compounds 47-81 of Examples 47-81.

| Compounds | Name | Raw materials | NMR and MS data |
|---|---|---|---|
| (structure shown) Example 67 | Methyl 5-((3-((4S)-8-bromo-9-methoxy-1-methyl-6-(pyridine-2-yl)-4H-benzo[f]imidazo[1,2-a][1,4]diazapin-4-yl)propionyl)oxy)-4-fluoro-2-methoxy-5-hexanoate adipate | 2-amino-5-chloro-4-methoxybenzoic acid | MS: m/z 645.1719 [M + H]$^+$ |
| 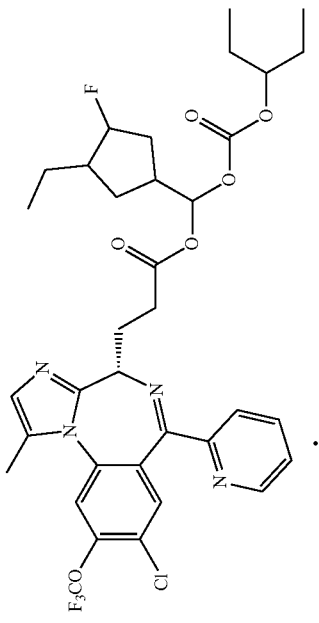 | (3-Ethyl-4-fluorocyclopentyl)(((pentanyl-3-yloxy)carbonyl)oxy)methyl 3-((4S)-8-chloro-1-methyl-6-(pyridine-2-yl)-9-(trifluoromethoxy)-4H-benzo[f]imidazo[1,2-a][1,4]diazapin-4-yl)propionate L-aspartate | 2-amino-5-chloro-4-(trifluoromethyl)benzoic acid | MS: m/z 724.2567 [M + H]$^+$ |

TABLE 1-continued
The specific structure, name, raw materials and characteristic data of compounds 47-81 of Examples 47-81.
| Compounds | Name | Raw materials | NMR and MS data |
|---|---|---|---|
| 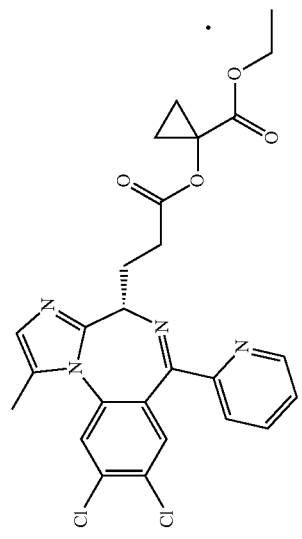<br>Example 68 | Ethyl 1-(3-((4S)-8,9-dichloro-1-methyl-6-(pyridine-2-yl)-4H-benzo[f]imidazo[1,2-a][1,4]diaza-4-yl)propionyl)oxy)cyclopropane-1-carboxylate benzoic acid | 2-amino-4,5-di-chloro-benzoic acid | MS: m/z 649.1615 [M + H]$^+$ |
| Example 69 | | | |

TABLE 1-continued

The specific structure, name, raw materials and characteristic data of compounds 47-81 of Examples 47-81.

| Compounds | Name | Raw materials | NMR and MS data |
|---|---|---|---|
| Example 70 | ((Methoxycarbonyl)oxy)methyl 3-((4S)-8-chloro-9-fluoro-1-methyl-6-(pyridine-2-yl)-4H-benzo[f]imidazo[1,2-a][1,4]diaza-4-yl)propionate borate | 2-amino-5-chloro-4-fluoro-benzoic acid | MS: m/z 549.1354 [M + H]$^+$ |
| Example 71 | ((Ethoxycarbonyl)oxy)methyl 3-((4S)-8-chloro-10-fluoro-1-methyl-6-(pyridine-2-yl)-4H-benzo[f]imidazo[1,2-a][1,4]diaza-4-yl)propionate 2-hydroxypropane-1,2,3-tricarboxylate | 2-amino-5-chloro-3-fluoro-benzoic acid | MS: m/z 693.1606 [M + H]$^+$ |

TABLE 1-continued

The specific structure, name, raw materials and characteristic data of compounds 47-81 of Examples 47-81.

| Compounds | Name | Raw materials | NMR and MS data |
|---|---|---|---|
| 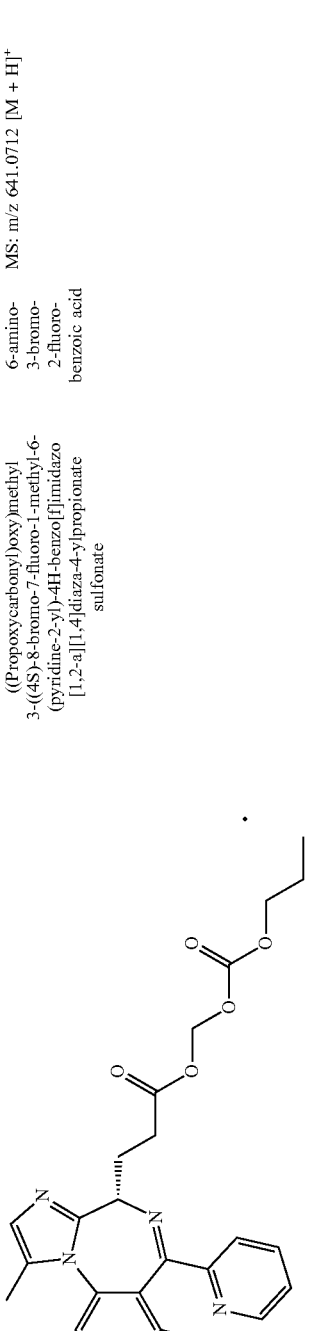 Example 72 | ((Propoxycarbonyl)oxy)methyl 3-((4S)-8-bromo-7-fluoro-1-methyl-6-(pyridine-2-yl)-4H-benzo[f]imidazo[1,2-a][1,4]diaza-4-yl)propionate sulfonate | 6-amino-3-bromo-2-fluoro-benzoic acid | MS: m/z 641.0712 [M + H]⁺ |
| 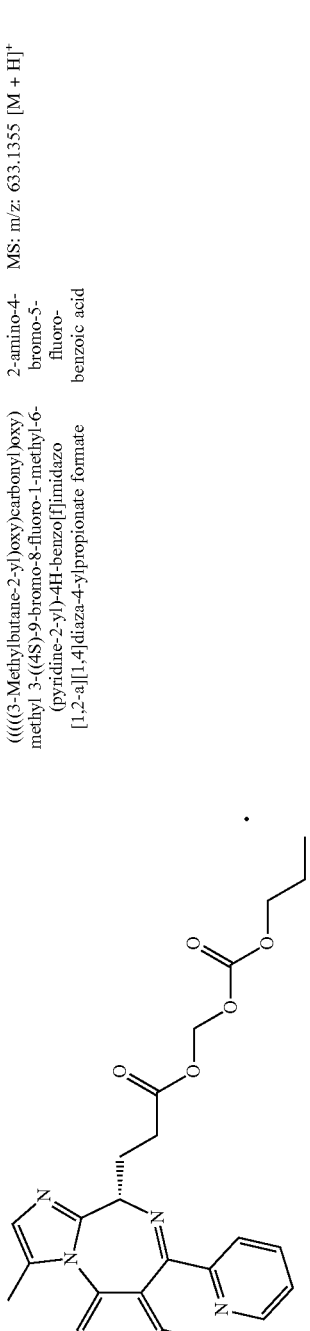  Example 73 | (((((3-Methylbutane-2-yl)oxycarbonyl)oxy)methyl 3-((4S)-9-bromo-8-fluoro-1-methyl-6-(pyridine-2-yl)-4H-benzo[f]imidazo[1,2-a][1,4]diaza-4-yl)propionate formate | 2-amino-4-bromo-5-fluoro-benzoic acid | MS: m/z 633.1355 [M + H]⁺ |

TABLE 1-continued

The specific structure, name, raw materials and characteristic data of compounds 47-81 of Examples 47-81.

| Compounds | Name | Raw materials | NMR and MS data |
|---|---|---|---|
| Example 74  | 2-methoxy-2-oxo-1-(tetrahydrothiophene-3-yl)ethyl 3-((4S)-8-bromo-1,10-dimethyl-6-(pyridine-2-yl)-9-(trifluoromethoxy)-4H-benzo[f]imidazo[1,2-a][1,4]diazapin-4-yl)propionate stearate | 2-amino-5-bromo-3-methyl-4-(trifluoromethoxy)benzoic acid | MS: m/z 965.3704 [M + H]$^+$ |
| Example 75 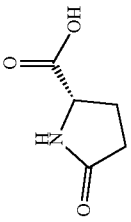 | Propyl 1-((3-((4S)-8-chloro-1,7-dimethyl-6-(pyridine-2-yl)-9-(trifluoromethoxy)-4H-benzo[f]imidazo[1,2-a][1,4]diazapin-4-yl)propionyl)oxy)cyclopropane-1-carboxylate (S)-5-oxopyrrolidine-2-carboxylate | 6-amino-3-chloro-2-methyl-4-(trifluoromethoxy)benzoic acid | MS: m/z 734.2199 [M + H]$^+$ |

TABLE 1-continued

The specific structure, name, raw materials and characteristic data of compounds 47-81 of Examples 47-81.

| Compounds | Name | Raw materials | NMR and MS data |
|---|---|---|---|
| 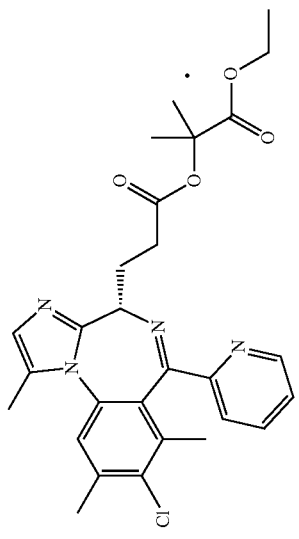 Example 76 | 2-Isopropoxy-2-oxoethyl-3-(((4S)-1,7,8,9-tetramethyl-6-(pyridine-2-yl)-4H-benzo[f]imidazo[1,2-a][1,4]diaza-4-yl)propionate phosphate | 6-amino-2,3,4-trimethyl-benzoic acid | MS: m/z 587.2265 [M + H]+ |
| 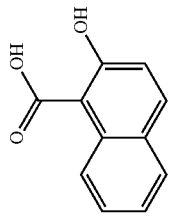 Example 77 | Ethyl 2-(3-((4S)-8-chloro-1,7,9-trimethyl-6-(pyridine-2-yl)-4H-benzo[f]imidazo[1,2-a][1,4]diazapin-4-yl)propionyl)oxy)-2-methylpropionate 2-hydroxy-1-naphthoate | 6-amino-3-chloro-2,4-dimethyl-benzoic acid | MS: m/z 711.2580 [M + H]+ |

TABLE 1-continued

The specific structure, name, raw materials and characteristic data of compounds 47-81 of Examples 47-81.

| Compounds | Name | Raw materials | NMR and MS data |
|---|---|---|---|
| 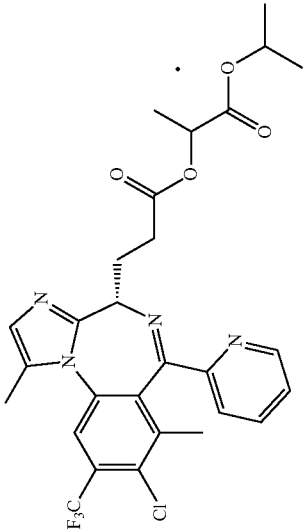 | 1-Isopropoxy-1-oxopropane-2-yl3-((4S)-8-chloro-1,7-dimethyl-6-(pyridine-2-yl)-9-(trifluoromethyl)-4H-benzo[f]imidazo[1,2-a][1,4]diaza-4-yl)propionate nicotinate | 6-amino-3-chloro-2-methyl-4-(trifluoromethyl)benzoic acid | MS: m/z 700.2144 [M + H]⁺ |
| 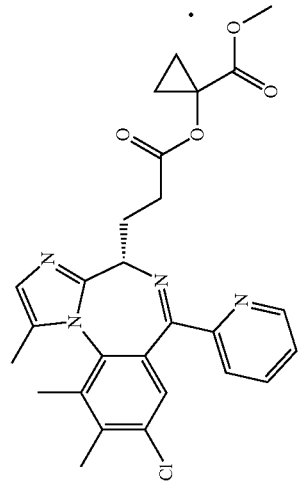  Example 78 | 1-((3-((4S)-8-chloro-1,9,10-trimethyl-6-(pyridine-2-yl)-4H-benzo[f]imidazo[1,2-a][1,4]diaza-4-yl)propionyl)oxy)cyclopropane-1-carboxylate 1-naphthoate | 2-amino-5-chloro-3,4-dimethylbenzoic acid | MS: m/z 679.2318 [M + H]⁺ |

TABLE 1-continued

The specific structure, name, raw materials and characteristic data of compounds 47-81 of Examples 47-81.

| Compounds | Name | Raw materials | NMR and MS data |
|---|---|---|---|
| Example 79 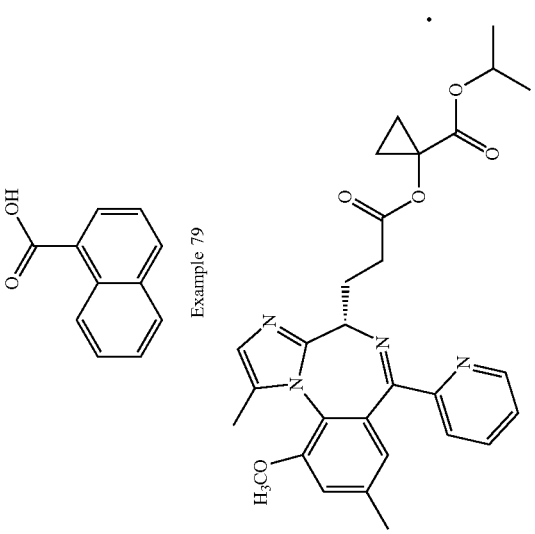 | Isopropyl 1-((3-((4S)-10-methoxy-1,8-dimethyl-6-(pyridine-2-yl)-4H-benzo[f]imidazo[1,2-a][1,4]diaza-4-yl)propionyl)oxy)cyclopropane-1-carboxylate methyl sulfate | 2-amino-3-methoxy-5-methyl-benzoic acid | MS: m/z 629.2276 [M + H]+ |
| Example 80 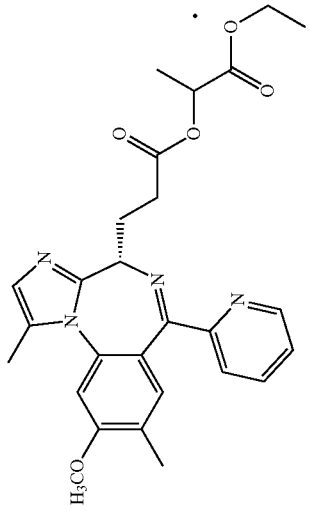 | 1-Ethoxy-1-oxopropane-2-yl3-((4S)-9-methoxy-1,8-dimethyl-6-(pyridine-2-yl)-4H-benzo[f]imidazo[1,2-a][1,4]diaza-4-yl)propionate malonate | 2-amino-4-methoxy-5-methyl-benzoic acid | MS: m/z 595.2399 [M + H]+ |

TABLE 1-continued

The specific structure, name, raw materials and characteristic data of compounds 47-81 of Examples 47-81.

| Compounds | Name | Raw materials | NMR and MS data |
|---|---|---|---|
| Example 81 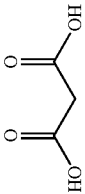 | | | |
| Example 82 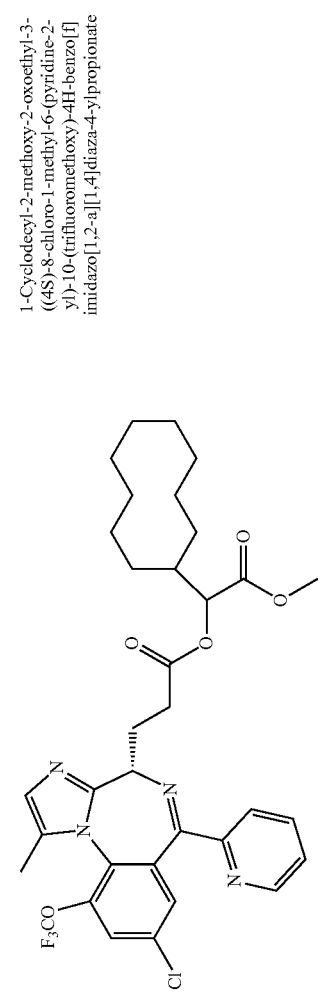 | 1-Cyclodecyl-2-methoxy-2-oxoethyl-3-((4S)-8-chloro-1-methyl-6-(pyridine-2-yl)-10-(trifluoromethoxy)-4H-benzol[f]imidazo[1,2-a][1,4]diaza-4-ylpropionate | 2-amino-6-chloro-3-trifluoromethoxy-benzoic acid | MS: m/z 675.2556 [M + H]+ |
| Example 83  | 1-(((((2,4-Dimethylpentane-3-yl)oxy)carbonyl)oxy)-2-(2-(2-methoxy-1,3-dimethylhexahydropyrimidine-5-yl)ethyl)3-((4S)-1,10-dimethyl-6-(pyridine-2-yl)-8-(trifluoro(oxo)-1-6-methyl)-4H-benzo[f]imidazo[1,2-a][1,4]diaza-4-propionate | 2-amino-3-methyl-5-trifluoro-methoxy-benzoic acid | MS: m/z 773.3844 [M + H]+ |

TABLE 1-continued
The specific structure, name, raw materials and characteristic data of compounds 47-81 of Examples 47-81.
| Compounds | Name | Raw materials | NMR and MS data |
|---|---|---|---|
| | 2-(((2-Bromo-5-((E)-propan-1-en-1-yl)-4-(trifluoromethyl)cyclohexyl)oxy)methoxy)-2-oxoethyl-3-((4S)-8-bromo-9-chloro-1-methyl-6-(pyridine-2-yl)-4H-benzo[f]imidazo[1,2-a][1,4]diaza-4-yl)propionate | 2-amino-4-chloro-5-bromo-benzoic acid | MS: m/z 817.0438 [M + H]+ |
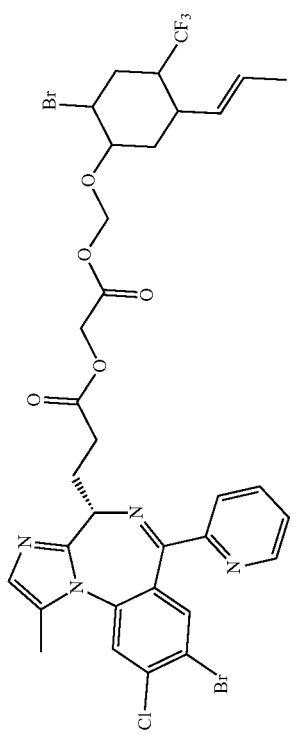
Example 84

The beneficial effects of the compound according to the present invention are demonstrated by following specific experimental examples.

The pharmacological activity, efficacy and safety of compounds 8-84 according to the present invention were evaluated.

In clinical practice, it is necessary to strictly control the effect of anesthetic drugs, so as to ensure the smooth progress of surgery and diagnosis, and terminate anesthesia as soon as possible after the operation, accompanied by making patients wake up quickly. If anesthesia lasts too long, it may cause some adverse effects on cardiovascular system and respiratory system, such as drowsiness, dizziness, etc. Therefore, the ideal anesthetic should have the advantages of rapid onset, rapid recovery and high safety.

Experimental Example 1 the Compound of the Present Invention Inducing the Disappearance of Righting Reflex in Mice KM mice (male, 18-22 g) were given each test compound by injection via the tail vein, to determine the corresponding $ED_{50}$ value of each compound. After a single injection through the tail vein at a dosage of $2 \times ED_{50}$, the duration and recovery time for the disappearance of righting reflex were recorded. The compound remimazolam was used as the control. The experimental results are shown in Table 2.

TABLE 2

The anesthetic effect of the compound according to the pesent invention injected via the tail vein of mice

| Compounds | $ED_{50}$/mg/kg | $2ED_{50}$ duration/min[1] | $2ED_{50}$ recovery time/min[2] | Quality of recovery/min[3] |
|---|---|---|---|---|
| Remimazolam | 40 | 8.58 | 5.49 | +++++ |
| Example 8 | 27.5 | 5.23 | 2.18 | +++ |
| Example 9 | 31.6 | 5.48 | 2.07 | ++++ |
| Example 10 | 28.3 | 5.12 | 2.06 | +++ |
| Example 11 | 22.4 | 5.31 | 2.13 | ++ |
| Example 12 | 31.3 | 5.32 | 2.04 | +++ |
| Example 13 | 27 | 5.22 | 2.34 | +++ |
| Example 14 | 32 | 6.42 | 2.29 | +++ |
| Example 15 | 18.3 | 1.43 | 1.01 | + |
| Example 16 | 15.7 | 1.57 | 1.23 | + |
| Example 17 | 29.2 | 4.39 | 2.53 | ++ |
| Example 18 | 30.1 | 5.09 | 2.49 | +++ |
| Example 19 | 23.2 | 6.07 | 2.09 | ++++ |
| Example 20 | 31.4 | 4.47 | 2.43 | +++ |
| Example 21 | 25.9 | 3.08 | 2.01 | ++ |
| Example 22 | 30.7 | 5.58 | 2.18 | ++ |
| Example 23 | 31.5 | 5.37 | 2.09 | +++ |
| Example 24 | 12 | 1.50 | 1.02 | + |
| Example 25 | 34 | 5.32 | 2.19 | ++ |
| Example 26 | 23.7 | 4.38 | 2.08 | +++ |
| Example 27 | 15.3 | 1.46 | 1.20 | + |
| Example 28 | 9.5 | 0.52 | 0.58 | + |
| Example 29 | 30.8 | 4.59 | 2.48 | +++ |
| Example 30 | 30.2 | 4.04 | 1.59 | ++ |
| Example 31 | 17.3 | 2.13 | 1.04 | ++ |
| Example 32 | 31.1 | 4.34 | 2.01 | ++++ |
| Example 33 | 21.2 | 3.21 | 1.48 | ++ |
| Example 34 | 14.4 | 1.31 | 1.23 | + |
| Example 35 | 25.2 | 5.25 | 2.02 | +++ |
| Example 36 | 27.8 | 4.34 | 1.49 | +++ |
| Example 37 | 25.7 | 4.42 | 1.58 | ++ |
| Example 38 | 25 | 3.25 | 1.25 | ++ |
| Example 39 | 26.7 | 5.09 | 2.28 | +++ |
| Example 40 | 24.8 | 4.26 | 1.55 | ++ |
| Example 41 | 28.9 | 3.53 | 1.57 | ++ |
| Example 42 | 8.7 | 0.58 | 0.53 | + |
| Example 43 | 29.5 | 6.01 | 2.13 | ++++ |
| Example 44 | 26 | 1.49 | 1.58 | +++ |
| Example 45 | 30 | 2.20 | 1.53 | ++++ |
| Example 46 | 32 | 1.21 | 1.08 | +++ |
| Example 47 | 27 | 3.90 | 2.42 | ++++ |
| Example 48 | 26.97 | 8.56 | 2.48 | ++++ |
| Example 49 | 20 | 2.65 | 1.22 | + |
| Example 50 | 24.6 | 7.84 | 1.47 | ++ |
| Example 51 | 27.8 | >10 | 2.39 | +++ |
| Example 52 | 32 | >10 | 1.49 | ++++ |
| Example 53 | 25.7 | 3.61 | 2.41 | + |
| Example 54 | 25 | 8.52 | 1.56 | + |
| Example 55 | 28.1 | 4.65 | 1.29 | + |
| Example 56 | 27.2 | 4.08 | 1.20 | ++ |
| Example 57 | 25 | 3.90 | 2.31 | + |
| Example 58 | 28 | 3.18 | 1.41 | +++ |
| Example 59 | 13.8 | 2.77 | 1.38 | + |
| Example 60 | 22.5 | 2.46 | 1.47 | ++ |
| Example 61 | 29.9 | 3.01 | 1.58 | +++ |
| Example 62 | 13.5 | 3.23 | 1.27 | +++ |

TABLE 2-continued

The anesthetic effect of the compound according to the pesent invention injected via the tail vein of mice

| Compounds | $ED_{50}$/mg/kg | $2ED_{50}$ duration/min[1] | $2ED_{50}$ recovery time/min[2] | Quality of recovery/min[3] |
|---|---|---|---|---|
| Example 63 | 29.8 | 3.14 | 2.03 | ++ |
| Example 64 | 24.1 | 3.09 | 2.12 | +++ |
| Example 65 | 31.2 | 3.4 | 2.04 | ++ |
| Example 66 | 30.4 | 3.14 | 2.35 | +++ |
| Example 67 | 31.7 | 2.58 | 2.38 | ++ |
| Example 68 | 28.9 | 3.09 | 2.49 | ++ |
| Example 69 | 23.8 | 3.45 | 2.38 | ++++ |
| Example 70 | 26.7 | 3.27 | 2.54 | +++ |
| Example 71 | 28.2 | 3.09 | 2.36 | ++ |
| Example 72 | 32.5 | 3.12 | 2.48 | +++ |
| Example 73 | 26.3 | 3.33 | 2.38 | +++ |
| Example 74 | 24.5 | 3.42 | 2.17 | ++ |
| Example 75 | 29.1 | 3.53 | 1.58 | +++ |
| Example 76 | 27.8 | 3.28 | 2.49 | ++++ |
| Example 77 | 30.2 | 3.28 | 2.39 | +++ |
| Example 78 | 28.2 | 3.39 | 1.36 | ++ |
| Example 79 | 31.3 | 3.45 | 1.38 | +++ |
| Example 80 | 30.9 | 3.56 | 2.01 | +++ |
| Example 81 | 31.1 | 3.49 | 2.43 | +++ |
| Example 82 | 29.8 | 3.54 | 2.13 | +++ |
| Example 83 | 30.1 | 3.26 | 2.46 | +++ |
| Example 84 | 28.8 | 3.16 | 2.17 | +++ |

The duration of anesthesia in Table 2 is the time from the disappearance of righting reflex to the recovery of righting reflex, and the recovery time is the time from the recovery of righting reflex to free crawling; the recovery quality "+" means <1 mm, "++" means 1-3 min, "+++" means 3-5 min, "++++" means 5-10 min, and "+++++" means >10 mm.

As shown in Table 2, the anesthetic effect of the compound according to the present invention was comparable to that of remimazolam, and even has better anesthetic activity; the recovery quality of the compound according to the present invention was better than that of remimazolam. Among them, the effective doses of compounds 15, 16, 24, 27, 28, 31, 34, 42, 49, 53, 54, 55, 57 and 59 were significantly lower than that of remimazolam, and the duration and recovery time were significantly shorter than that of remimazolam. During anesthesia, the compounds mentioned above showed fast onset, rapid recovery, high safety and better anesthetic performance, compared with remimazolam.

Experimental Example 2 the Compound of the Present Invention Inducing the Disappearance of Righting Reflex in Mice SD rats (male, 220-300 g) were given each test compound by injection via the tail vein, to determine the respective $ED_{50}$ value of each compound. After a single injection through the tail vein at a dosage of $2 \times ED_{50}$, the duration and recovery time for the disappearance of righting reflex were recorded. The compound remimazolam was used as the control. The experimental results are shown in Table 3.

TABLE 3

The anesthetic effect of the compound according to the pesent invention injected via the tail vein of rats.

| Compounds | $ED_{50}$/mg/kg | $2ED_{50}$ Duration/min[1] | $2ED_{50}$ recovery time/min[2] | Quality of recovery/min[3] |
|---|---|---|---|---|
| Remimazolam | 8.9 | 7.58 | 6.46 | +++++ |
| Example 8 | 5.8 | 5.05 | 2.18 | ++++ |
| Example 9 | 5.6 | 4.12 | 2.57 | +++ |
| Example 10 | 5.8 | 5.31 | 2.06 | ++ |
| Example 11 | 5.9 | 5.03 | 2.43 | +++ |
| Example 12 | 5.7 | 5.24 | 2.04 | ++ |
| Example 13 | 5.3 | 4.02 | 2.45 | +++ |
| Example 14 | 6.9 | 5.06 | 2.39 | ++ |
| Example 15 | 1.5 | 1.29 | 1.01 | + |
| Example 16 | 3.4 | 0.57 | 0.53 | + |
| Example 17 | 4.3 | 4.39 | 2.43 | ++ |
| Example 18 | 4.8 | 4.49 | 2.58 | +++ |
| Example 19 | 5.6 | 4.07 | 2.12 | +++ |
| Example 20 | 4.7 | 3.47 | 2.49 | ++ |
| Example 21 | 4.2 | 3.08 | 2.27 | ++ |
| Example 22 | 4.3 | 3.28 | 2.46 | ++ |
| Example 23 | 5.9 | 3.37 | 2.39 | +++ |
| Example 24 | 6.8 | 0.50 | 0.47 | + |
| Example 25 | 4.2 | 3.53 | 2.21 | ++ |
| Example 26 | 3.7 | 3.48 | 2.04 | ++ |

TABLE 3-continued

The anesthetic effect of the compound according to the pesent invention injected via the tail vein of rats.

| Compounds | $ED_{50}$/mg/kg | $2ED_{50}$ Duration/ min[1] | $2ED_{50}$ recovery time/min[2] | Quality of recovery/min[3] |
|---|---|---|---|---|
| Example 27 | 6.3 | 1.16 | 1.05 | + |
| Example 28 | 4.5 | 0.58 | 0.33 | + |
| Example 29 | 5.8 | 3.59 | 2.44 | +++ |
| Example 30 | 6.2 | 3.01 | 2.51 | ++ |
| Example 31 | 2.3 | 1.23 | 1.14 | + |
| Example 32 | 3.1 | 3.34 | 2.41 | +++ |
| Example 33 | 6.2 | 3.51 | 2.38 | +++ |
| Example 34 | 3.4 | 1.21 | 1.01 | + |
| Example 35 | 5.2 | 3.20 | 2.52 | ++ |
| Example 36 | 2.8 | 3.14 | 2.39 | +++ |
| Example 37 | 5.7 | 3.02 | 2.51 | ++ |
| Example 38 | 6.5 | 4.05 | 2.55 | ++++ |
| Example 39 | 6.7 | 4.03 | 2.48 | ++ |
| Example 40 | 6.8 | 4.06 | 2.01 | ++ |
| Example 41 | 5.9 | 3.43 | 2.47 | ++ |
| Example 42 | 4.7 | 0.51 | 0.31 | + |
| Example 43 | 6.5 | 3.01 | 2.41 | ++ |
| Example 44 | 6.4 | 3.13 | 2.48 | ++ |
| Example 45 | 7.1 | 3.01 | 2.00 | ++ |
| Example 46 | 6.3 | 3.17 | 2.28 | + |
| Example 47 | 6.2 | 4.07 | 2.38 | ++ |
| Example 48 | 5.3 | 4.16 | 2.42 | +++ |
| Example 49 | 5 | 1.24 | 2.01 | + |
| Example 50 | 6.3 | 3.56 | 2.41 | ++ |
| Example 51 | 6.5 | 3.09 | 2.32 | +++ |
| Example 52 | 6.8 | 4.03 | 2.41 | ++ |
| Example 53 | 6 | 3.18 | 2.47 | ++ |
| Example 54 | 6.4 | 3.22 | 2.52 | +++ |
| Example 55 | 5.2 | 3.28 | 2.51 | + |
| Example 56 | 6.8 | 1.05 | 1.12 | ++ |
| Example 57 | 4.7 | 5.07 | 2.41 | + |
| Example 58 | 5.6 | 5.09 | 3.01 | +++ |
| Example 59 | 1.76 | 5.02 | 2.51 | ++ |
| Example 60 | 3.5 | 2.12 | 2.14 | +++ |
| Example 61 | 2.7 | 1.21 | 2.01 | ++ |
| Example 62 | 1.3 | 1.08 | 2.14 | +++ |
| Example 63 | 3.5 | 2.03 | 2.09 | ++ |
| Example 64 | 2.7 | 3.15 | 2.18 | ++ |
| Example 65 | 6.3 | 3.25 | 2.29 | ++++ |
| Example 66 | 4.8 | 4.02 | 2.17 | ++ |
| Example 67 | 6.9 | 3.18 | 3.01 | +++ |
| Example 68 | 5.9 | 4.28 | 2.18 | ++ |
| Example 69 | 6.1 | 3.16 | 2.48 | ++ |
| Example 70 | 4.6 | 3.56 | 2.57 | +++ |
| Example 71 | 4.8 | 3.21 | 2.36 | + |
| Example 72 | 4.9 | 4.01 | 2.43 | ++ |
| Example 73 | 5.2 | 2.45 | 2.44 | ++ |
| Example 74 | 5.7 | 2.67 | 2.54 | +++ |
| Example 75 | 5.8 | 2.26 | 2.15 | +++ |
| Example 76 | 6.3 | 2.47 | 2.23 | +++ |
| Example 77 | 6.1 | 2.38 | 2.47 | +++ |
| Example 78 | 6.2 | 2.55 | 2.38 | ++ |
| Example 79 | 6.6 | 2.48 | 2.19 | +++ |
| Example 80 | 6.7 | 2.36 | 2.18 | ++ |
| Example 81 | 6.2 | 2.43 | 2.09 | +++ |
| Example 82 | 5.8 | 2.15 | 2.10 | ++ |
| Example 83 | 6.1 | 2.09 | 2.09 | +++ |
| Example 84 | 6.23 | 2.18 | 1.58 | ++ |

The duration of anesthesia in Table 3 is the time from the disappearance of righting reflex to the recovery of righting reflex, and the recovery time is the time from the recovery of righting reflex to free crawling; the recovery quality "+" means <1 min, "++" means 1-3 min, "+++" means 3-5 min, "++++" means 5-10 min, and "+++++" means >10 min.

As shown in Table 3, the anesthetic effect of the compound according to the present invention was comparable to that of remimazolam, and even has better anesthetic activity; the recovery quality of the compound according to the present invention was better than that of remimazolam. Among them, the effective doses of compounds 15, 16, 24, 27, 28, 31, 34, 42, 46, 49, 53, 54, 55, 57, 59 and 71 were significantly lower than that of remimazolam, and the duration and recovery time were significantly shorter than that of remimazolam. Moreover, the duration and recovery time were significantly shorter than that of remimazolam. During anesthesia, by comparing with remimazolam, the compounds mentioned above showed fast onset, rapid recovery, high safety and good anesthetic performance.

The above experimental results indicated that the compound of the present invention, as a rapid-effect anesthetic, had a good anesthesia cycle and would play a very key role in the pharmaceutical industry.

In summary, the compound of the present invention had a good intravenous sedative anesthesia effect, and the anesthesia effect was comparable to that of remimazolam and even better than that of remimazolam, particularly seen in that the effective dose was significantly decreased, and the duration time and recovery time were significantly reduced. At the same time, the recovery quality of the compound according to the present invention was significantly improved compared with remimazolam in rat and mouse caudal venous anesthesia models. During anesthetization, the compound had a rapid onset, a short duration, a quick recovery and a good tolerance, could be used for anesthesia induction, anesthesia maintenance and day surgery anesthesia, and had good application prospects.

The invention claimed is:

1. A compound of formula I, or a salt thereof, or a stereoisomer thereof, or a solvate thereof, or a cocrystallization thereof, or a composition thereof:

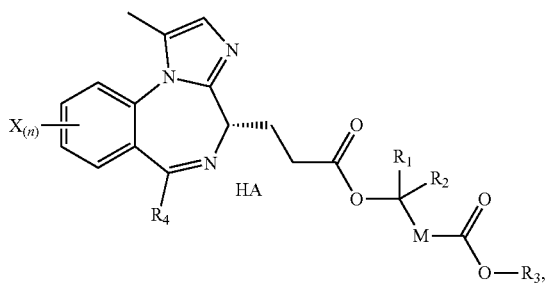

Formula I wherein, $R_1$ is selected from the group consisting of H, short-chain hydrocarbon group, $C_{3-10}$ cycloalkyl, and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl or alkoxy, and said heterocycle comprises 1-3 heteroatoms selected from N, O, and S;

$R_2$ is selected from the group consisting of H, short-chain hydrocarbon group, $C_{3-10}$ cycloalkyl and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

or $R_1$ and $R_2$ are connected to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

M is absent or selected from the group consisting of O, S, NH, and $C_{1-5}$ alkylene, wherein said alkylene is substituted with 0-4 substituents selected from the group consisting of halogen, trifluoromethyl, and $C_{1-6}$ alkoxy;

$R_3$ is selected from the group consisting of H, short-chain hydrocarbon group, and —$(CH_2)_a$—$(O)_b$—$R_5$, wherein $R_5$ is $C_{3-10}$ cycloalkyl or 3-10 membered heterocyclic group, said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —$NHC_{1-4}$ alkyl, and said heterocyclic ring comprises 1-3 heteroatoms selected from N, O, and S;

a is selected from 0, 1 and 2;

b is 0 or 1;

$R_4$ is a pyridine ring with nitrogen at position 2, 3 or 4;

each of X is independently selected from the group consisting of halogen, substituted or unsubstituted $C_{1-8}$ alkyl, and substituted or unsubstituted $C_{1-8}$ alkoxy; the substituent of said alkyl or alkoxy is halogen;

n is selected from 1, 2, 3 and 4; and

HA is a pharmaceutically acceptable organic acid or inorganic acid.

2. The compound according to claim 1, or a salt thereof, or a stereoisomer thereof, or a solvate thereof, or a cocrystallization thereof, or a composition thereof, wherein:

each of $R_1$ or $R_2$ is independently selected from the group consisting of H, substituted or unsubstituted $C_{1-8}$ alkyl, substituted or unsubstituted $C_{3-10}$ cycloalkyl, and substituted or unsubstituted 3-10 membered heterocyclic group; or $R_1$ and $R_2$ are connected form substituted or unsubstituted $C_{3-10}$ cycloalkyl or substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl, and $C_{1-8}$ alkoxy; the heteroatom of the heterocyclic group is selected from N, O and S, and the number of heteroatoms is 1, 2 or 3;

$R_3$ is selected from the group consisting of H, $C_{1-8}$ alkyl, and —$(CH_2)_a$—$(O)_b$—$R_5$; wherein $R_5$ is selected from the group consisting of substituted or unsubstituted $C_{3-10}$ cycloalkyl and substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —$NHR_6$; the heteroatom of the heterocyclic group is selected from N, O, and S, and the number of heteroatoms is 1, 2 or 3; $R_6$ is selected from $C_{1-4}$ alkyl;

a is selected from 0, 1 and 2;

b is 0 or 1;

$R_4$ is a pyridine ring with nitrogen at position 2, 3 or 4;

M is selected from the group consisting of none, O, S, NH, and substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl, and $C_{1-4}$ alkoxy;

each X is independently selected from halogen, substituted or unsubstituted $C_{1-8}$ alkyl, and substituted or unsubstituted $C_{1-8}$ alkoxy; the substituent of said alkyl or alkoxy is halogen; and n is selected from 1, 2, 3 and 4.

3. The compound according to claim 1, or a salt thereof, or a stereoisomer thereof, or a solvate thereof, or a cocrystallization thereof, or a composition thereof, wherein said compound is of formula II:

Formula II

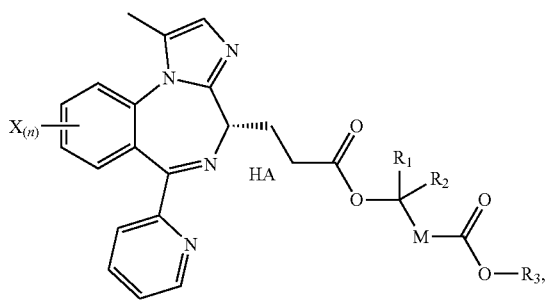

wherein,
$R_1$ is selected from the group consisting of H, short-chain hydrocarbon group, $C_{3-10}$ cycloalkyl, and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

$R_2$ is selected from the group consisting of H, short-chain hydrocarbon group, $C_{3-10}$ cycloalkyl, and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, S;

or $R_1$ and $R_2$ are connected to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl, and alkoxy, and said heterocycle includes 1-3 heteroatoms selected from N, O, and S;

M is absent or selected from the group consisting of O, S, NH, and $C_{1-5}$ alkylene, wherein said alkylene is substituted with 0-4 substituents selected from the group consisting of halogen, trifluoromethyl, and $C_{1-6}$ alkoxy;

$R_3$ is selected from the group consisting of H, short-chain hydrocarbon group, and —$(CH_2)_a$—$(O)_b$—$R_5$, wherein $R_5$ is $C_{3-10}$ cycloalkyl or 3-10 membered heterocyclic group, said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —$NHC_{1-4}$ alkyl, and said heterocyclic ring includes 1-3 heteroatoms selected from N, O, and S;

a is selected from 0, 1 and 2;
b is 0 or 1;
each X is independently selected from the group consisting of halogen, substituted or unsubstituted $C_{1-8}$ alkyl, substituted or unsubstituted $C_{1-8}$ alkoxy; the substituent of said alkyl or alkoxy is halogen; and
n is selected from 1, 2, 3 and 4.

4. The compound according to claim 3, or a salt thereof, or a stereoisomer thereof, or a solvate thereof, or a cocrystallization thereof, or a composition thereof, wherein:
$R_1$ or $R_2$ is each independently selected from the group consisting of H, substituted or unsubstituted $C_{1-3}$ alkyl, substituted or unsubstituted $C_{3-5}$ cycloalkyl or substituted, and unsubstituted 3-5 membered heterocyclic group; or $R_1$ and $R_2$ are connected to form substituted or unsubstituted $C_{3-6}$ cycloalkyl or substituted or unsubstituted 3-6 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-3}$ alkyl, and $C_{1-3}$ alkoxy; the heteroatom of the heterocyclic group is selected from N, O, and S, and the number of heteroatoms is 1, 2 or 3;

$R_3$ is selected from the group consisting of H, $C_{1-8}$ alkyl, and —$(CH_2)_a$—$(O)_b$—$R_5$; wherein $R_5$ is selected from the group consisting of substituted or unsubstituted $C_{4-6}$ cycloalkyl, and substituted or unsubstituted 4-6 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —$NHR_6$; the heteroatom of said heterocyclic group is selected from N, O, and S, and the number of heteroatoms is 1, 2 or 3; $R_6$ is selected from $C_{1-4}$ alkyl;

a is selected from 0, 1, and 2;
b is 0 or 1;
$R_4$ is a pyridine ring with nitrogen at position 2, 3 or 4;
M is selected from the group consisting of none, O, S, NH, and substituted or unsubstituted $C_{1-3}$ alkylene; the number of substituents of said substituted alkylene is 1, 2, 3 or 4, and the substituents of said substituted alkylene are selected from the group consisting of halogen, trifluoromethyl, and $C_{1-2}$ alkoxy;

each X is independently selected from halogen, substituted or unsubstituted $C_{1-6}$ alkyl, and substituted or unsubstituted $C_{1-6}$ alkoxy; the substituent of said alkyl or alkoxy is halogen;
n is selected from 1, 2, 3 and 4; and
each X is independently selected from —F, —Cl, —Br, —$CH_3$, —$OCH_3$, —$CF_3$, —$OCF_3$.

5. The compound according to claim 1, or a salt thereof, or a stereoisomer thereof, or a solvate thereof, or a cocrystallization thereof, or a composition thereof, wherein said compound is of formula III:

Formula III

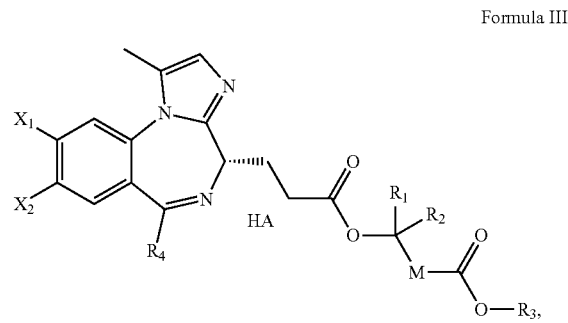

wherein,
$R_1$ is selected from the group consisting of H, short-chain hydrocarbon group, $C_{3-10}$ cycloalkyl, and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

$R_2$ is selected from the group consisting of H, short-chain hydrocarbon group, $C_{3-10}$ cycloalkyl, and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

or $R_1$ and $R_2$ are connected to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

M is absent or selected from the group consisting of O, S, NH, and $C_{1-5}$ alkylene, wherein said alkylene is substituted with 0-4 substituents selected from the group consisting of halogen, trifluoromethyl, and $C_{1-6}$ alkoxy;

$R_3$ is selected from the group consisting of H, short-chain hydrocarbon group, and $-(CH_2)_a-(O)_b-R_5$, wherein $R_5$ is $C_{3-10}$ cycloalkyl or 3-10 membered heterocyclic group, said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, or $-NHC_{1-4}$ alkyl, and said heterocyclic ring comprises 1-3 heteroatoms selected from N, O, and S;

a is selected from 0, 1, and 2;

b is 0 or 1;

$R_4$ is a pyridine ring with nitrogen at position 2, 3 or 4; and preferably, $R_4$ is a pyridine each of $X_1$ and $X_2$ is independently selected from the group consisting of halogen, substituted or unsubstituted $C_{1-8}$ alkyl, substituted or unsubstituted $C_{1-8}$ alkoxy; the substituent of said alkyl or alkoxy is halogen.

6. The compound according to claim 5, or a salt thereof, or a stereoisomer thereof, or a solvate thereof, or a cocrystallization thereof, or a composition thereof, wherein said compound is of formula III-A:

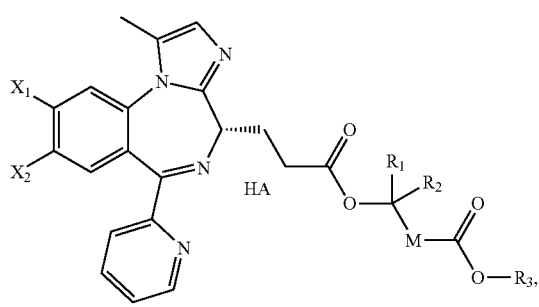

Formula III-A wherein, each of $R_1$ or $R_2$ is independently selected from the group consisting of H, substituted or unsubstituted $C_{1-3}$ alkyl, substituted or unsubstituted $C_{3-5}$ cycloalkyl, and substituted or unsubstituted 3-5 membered heterocyclic group; or $R_1$ and $R_2$ are connected form substituted or unsubstituted $C_{3-6}$ cycloalkyl or substituted or unsubstituted 3-6 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-3}$ alkyl, and $C_{1-3}$ alkoxy; the heteroatom of the heterocyclic group is selected from N, O, and S, and the number of heteroatoms is 1, 2 or 3;

$R_3$ is selected from the group consisting of H, $C_{1-8}$ alkyl, and $-(CH_2)_a-(O)_b-R_5$; wherein $R_5$ is selected from the group consisting of substituted or unsubstituted $C_{4-6}$ cycloalkyl, and substituted or unsubstituted 4-6 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl, and $-NHR_6$; the heteroatom of the heterocyclic group is selected from N, O, and S, and the number of heteroatoms is 1, 2 or 3; $R_6$ is $C_{1-4}$ alkyl;

a is selected from 0, 1 and 2;

b is 0 or 1;

M is selected from the group consisting of none, O, S, NH, and substituted or unsubstituted $C_{1-3}$ alkylene; the number of substituents of said substituted alkylene is 1, 2, 3 or 4, and the substituents of said substituted alkylene are selected from the group consisting of halogen, trifluoromethyl, and $C_{1-2}$ alkoxy; and each of $X_1$ and $X_2$ is selected from the group consisting of halogen, substituted or unsubstituted $C_{1-6}$ alkyl, and substituted or unsubstituted $C_{1-6}$ alkoxy; the substituent of said alkyl or alkoxy is halogen.

7. The compound according to claim 1, or a salt thereof, or a stereoisomer thereof, or a solvate thereof, or a cocrystallization thereof, or a composition thereof, wherein said compound has a structure of formula IV:

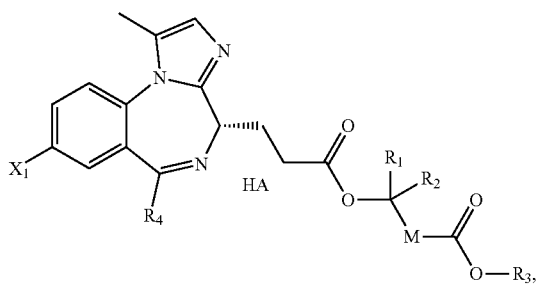

Formula IV wherein, $R_1$ is selected from the group consisting of H, short-chain hydrocarbon group, $C_{3-10}$ cycloalkyl, and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

$R_2$ is selected from the group consisting of H, short-chain hydrocarbon group, $C_{3-10}$ cycloalkyl, and 3-10 membered heterocyclic group, wherein said short-chain hydrocarbon group, cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and S;

or $R_1$ and $R_2$ are connected to form $C_{3-10}$ cycloalkyl or 3-10 membered heterocyclic group, wherein said cycloalkyl or heterocyclic group is substituted with 0-4 substituents selected from the group consisting of halogen, trifluoromethyl, cyano, nitro, short-chain alkyl, and alkoxy, and said heterocycle comprises 1-3 heteroatoms selected from N, O, and or S; and M is absent or selected from the group consisting of O, S, NH, and $C_{1-5}$ alkylene, wherein said alkylene is substituted with 0-4 substituents selected from the group consisting of halogen, trifluoromethyl, and $C_{1-6}$ alkoxy;

$R_3$ is selected from the group consisting of H, short-chain hydrocarbon group, and —$(CH_2)_a$—$(O)_b$—$R_5$, wherein $R_5$ is $C_{3-10}$ cycloalkyl or 3-10 membered heterocyclic group, said hydrocarbon group, cycloalkyl or heterocyclic group is substituted with 0-4 substituents selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —$NHC_{1-4}$ alkyl, and said heterocycle comprises 1-3 heteroatoms selected from N, O, and S;

a is selected from 0, 1, and 2;

b is 0 or 1;

$R_4$ is a pyridine ring with nitrogen at position 2, 3 or 4; and $X_1$ is selected from the group consisting of halogen, substituted or unsubstituted $C_{1-8}$ alkyl, and substituted or unsubstituted $C_{1-8}$ alkoxy; the substituent of said alkyl or alkoxy is halogen.

8. The compound according to claim 7, or a salt thereof, or a stereoisomer thereof, or a solvate thereof, or a cocrystallization thereof, or a composition thereof, wherein said compound is of formula IV-A:

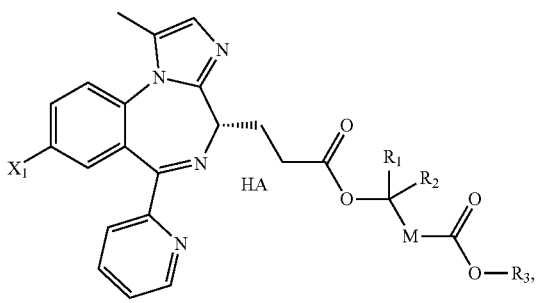

IV-A wherein, each of $R_1$ or $R_2$ is independently selected from the group consisting of H, substituted or unsubstituted $C_{1-3}$ alkyl, substituted or unsubstituted $C_{3-5}$ cycloalkyl or substituted, and unsubstituted 3-5 membered heterocyclic group; or $R_1$ and $R_2$ are connected to form substituted or unsubstituted $C_{3-6}$ cycloalkyl or substituted or unsubstituted 3-6 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-3}$ alkyl, and $C_{1-3}$ alkoxy; the heteroatom of the heterocyclic group is selected from N, O, and S, and the number of heteroatoms is 1, 2 or 3;

$R_3$ is selected from the group consisting of H, $C_{1-8}$ alkyl, and —$(CH_2)_a$—$(O)_b$—$R_5$; wherein $R_5$ is selected from the group consisting of substituted or unsubstituted $C_{4-6}$ cycloalkyl or substituted, and unsubstituted 4-6 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —$NHR_6$; the heteroatom of the heterocyclic group is selected from N, O, and S, and the number of heteroatoms is 1, 2 or 3; $R_6$ is $C_{1-4}$ alkyl;

a is selected from 0, 1 and 2;

b is 0 or 1;

M is selected from the group consisting of none, O, S, NH, and substituted or unsubstituted $C_{1-3}$ alkylene; the number of substituents of said substituted alkylene is 1, 2, 3 or 4, and the substituents of said substituted alkylene are selected from the group consisting of halogen, trifluoromethyl, and $C_{1-2}$ alkoxy; and $X_1$ is selected from the group consisting of halogen, substituted or unsubstituted $C_{1-6}$ alkyl, and substituted or unsubstituted $C_{1-6}$ alkoxy; and the substituent of said alkyl or alkoxy is halogen.

9. The compound according to claim 1, or a salt thereof, or a stereoisomer thereof, or a solvate thereof, or a cocrystallization thereof, or a composition thereof, wherein said inorganic acid is selected from the group consisting of hydrochloric acid, sulfuric acid, phosphoric acid, carbonic acid, hydrobromic acid, and boric acid; and said organic acid is selected from the group consisting of formic acid, acetic acid, oxalic acid, adipic acid, L-aspartic acid, fumaric acid, benzoic acid (2S,3S,4S,5R)-2,3,4,5-tetrahydroxy-6-oxohexanoic acid, 2-hydroxyethane-1-sulfonic acid, 2-hydroxypropane-1,2,3-tricarboxylic acid, 2-hydroxypropionic acid, sulfonic acid, p-toluenesulfonic acid, methanesulfonic acid, 2-hydroxysuccinic acid, stearic acid, (S)-5-oxopyrrolidine-2-carboxylic acid, 2-hydroxy-1-naphthoic acid, nicotinic acid, 1-naphthoic acid, malonic acid, tartaric acid and maleic acid.

10. A compound, or a salt thereof, or a stereoisomer thereof, or a solvate thereof, or a cocrystallization thereof, or a composition thereof, wherein said compound is selected from the following compounds:

133
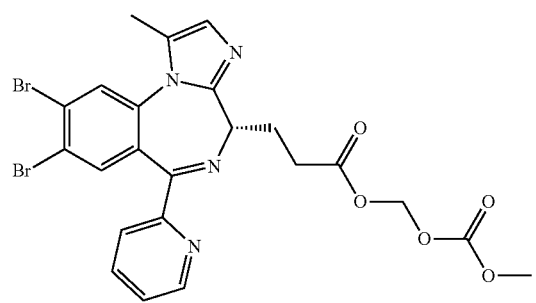 [SMILES: COC(=O)OCOC(=O)CC[C@@H]1N=C(c2ccccn2)c2cc(Cl)c(F)cc2-n2c(C)cnc21]
134
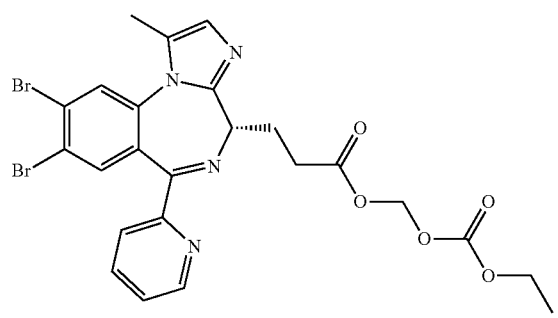
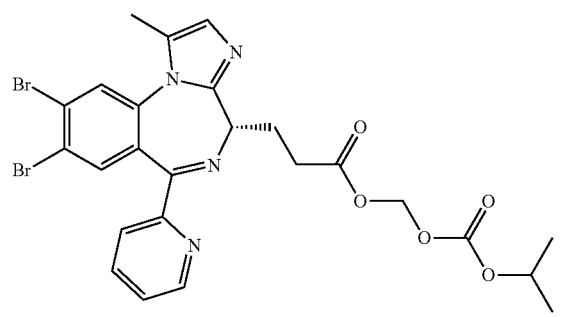
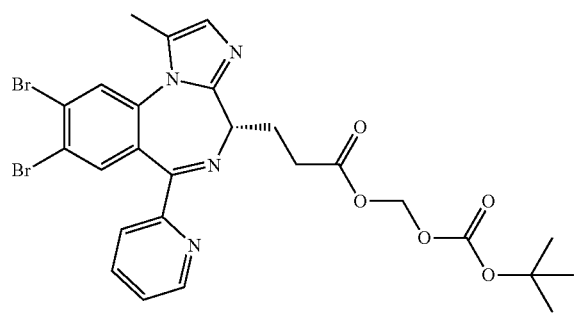
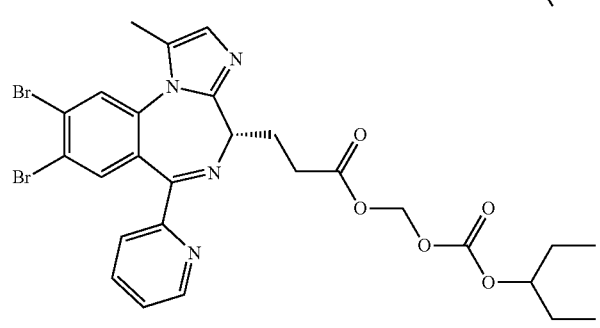
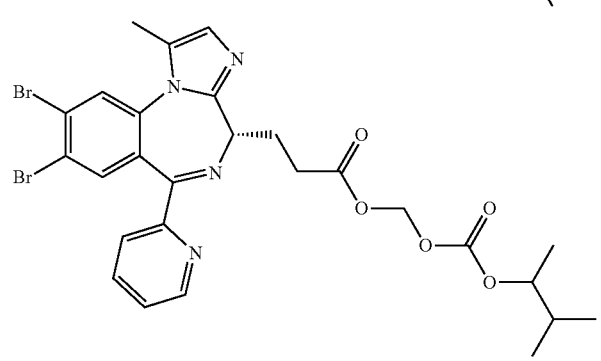
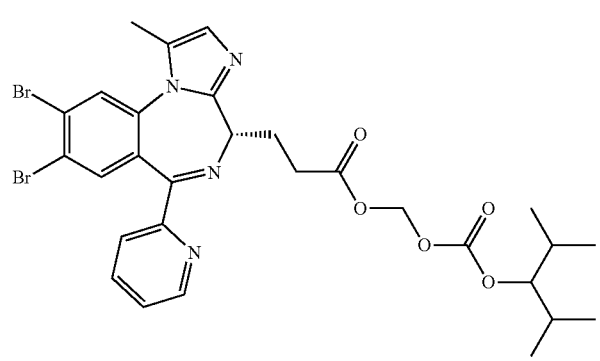
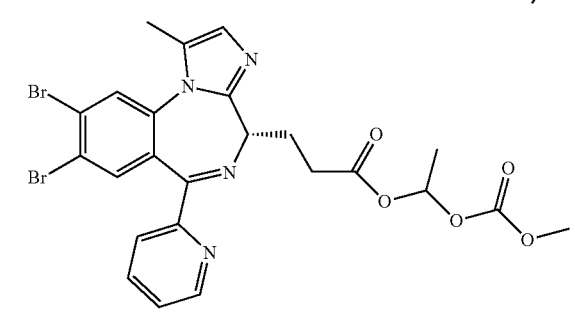
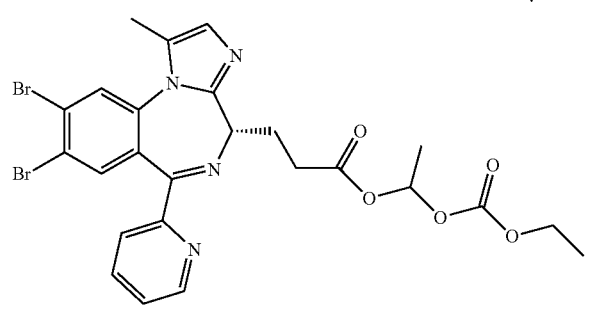
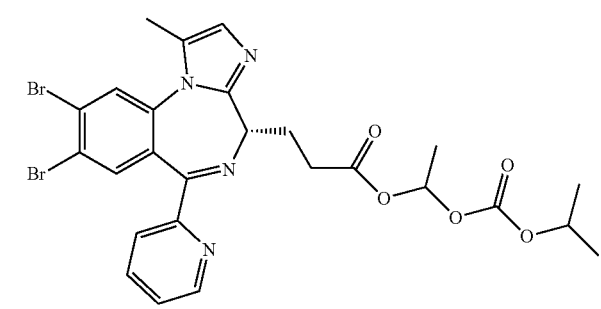

135
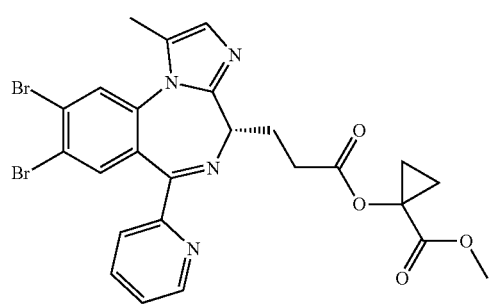
136
-continued
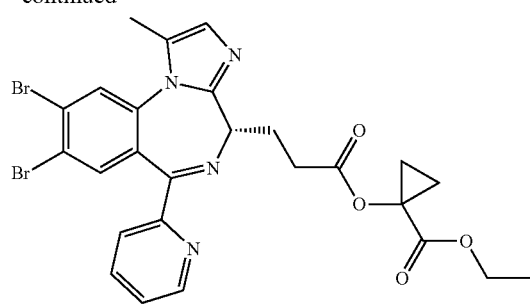
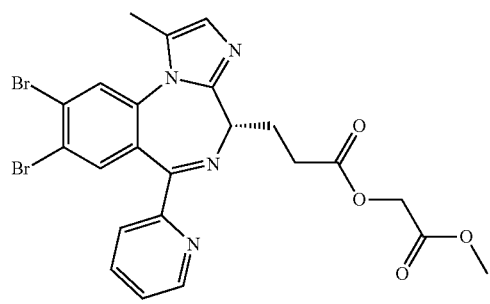
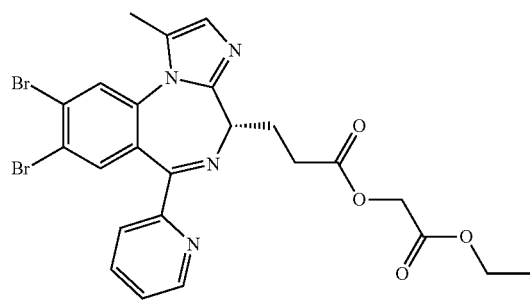 [SMILES: CCOC(=O)C(C)(C)OC(=O)CC[C@@H]1N=C(c2ccccn2)c2c(cc(C)c(Cl)c2C)-n2c(C)cnc21]
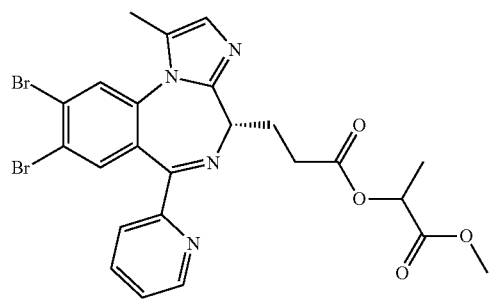
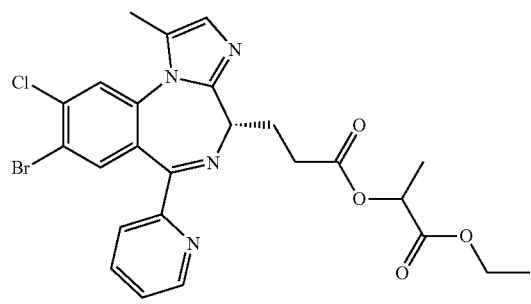
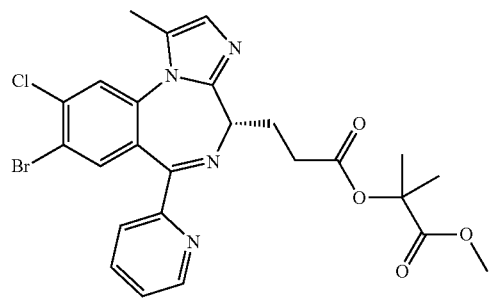
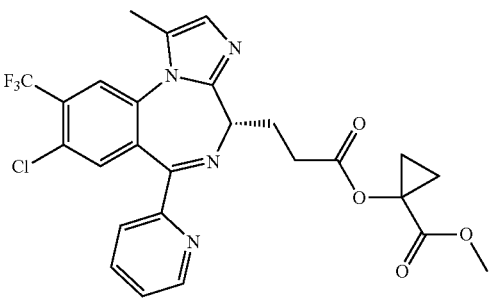
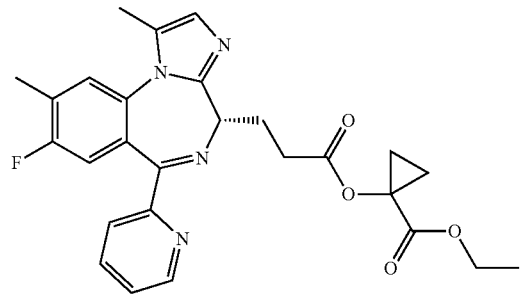
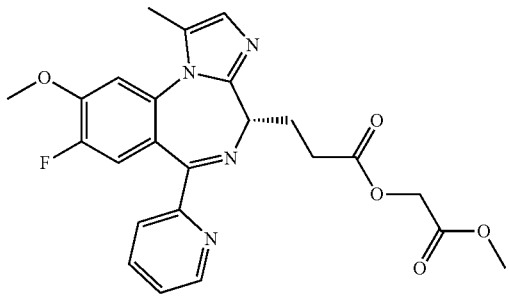

137 138
-continued
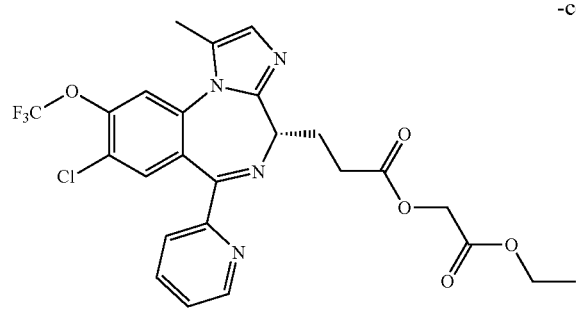
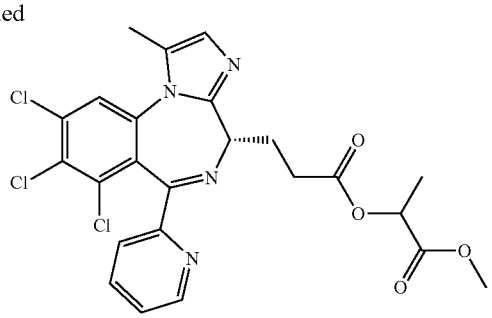
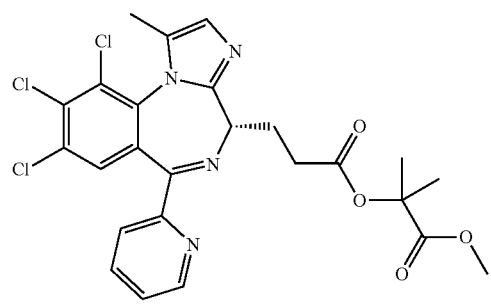 [SMILES: COC(=O)C1(OC(=O)CC[C@@H]2N=C(c3ccccn3)c3cc(Cl)c(C)c(C)c3-n3c(C)cnc32)CC1]
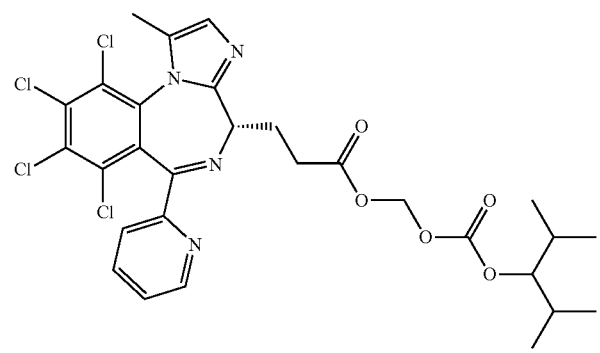
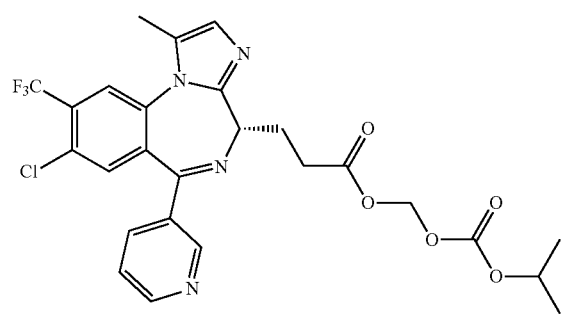
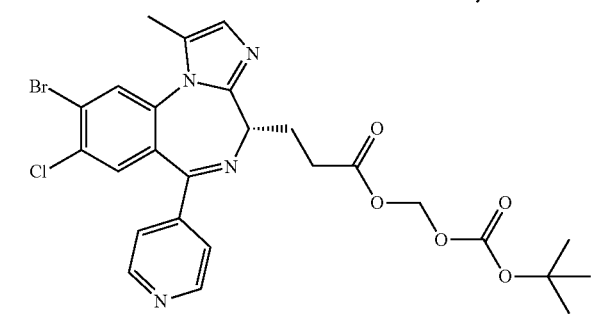
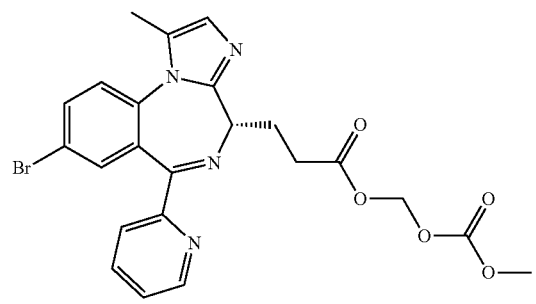
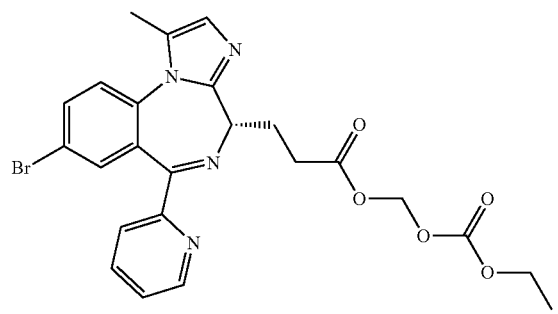
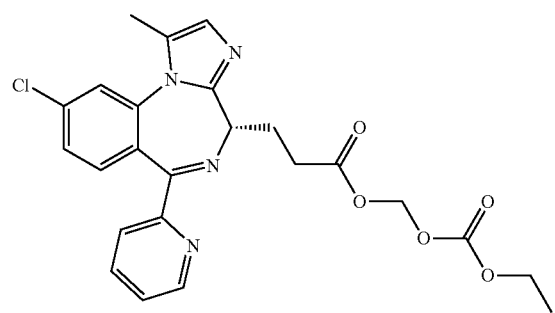
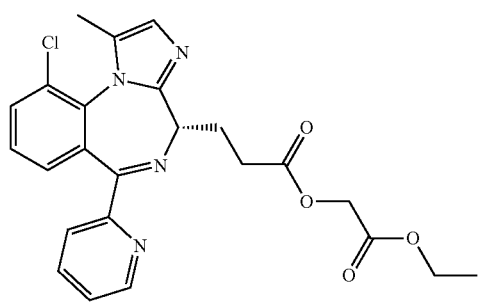

-continued
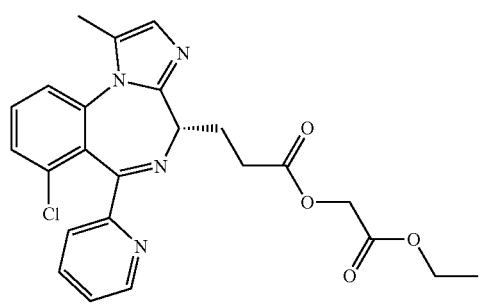
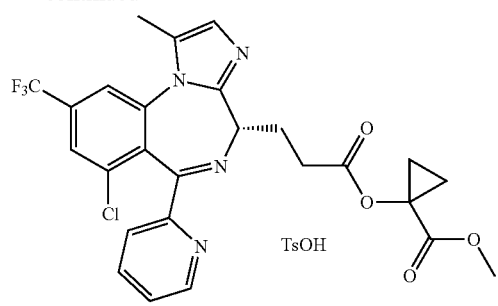
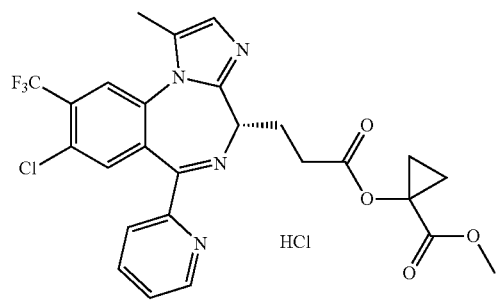
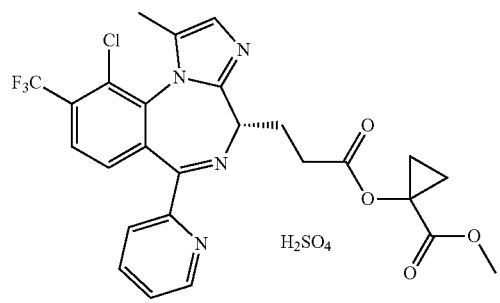
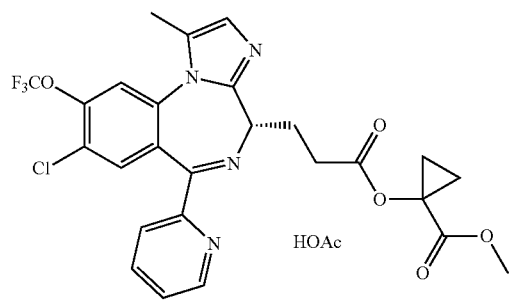
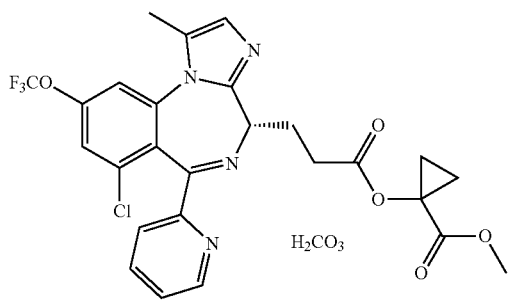
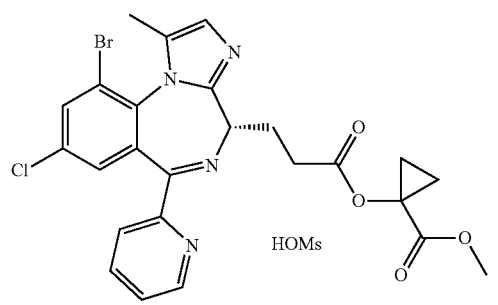
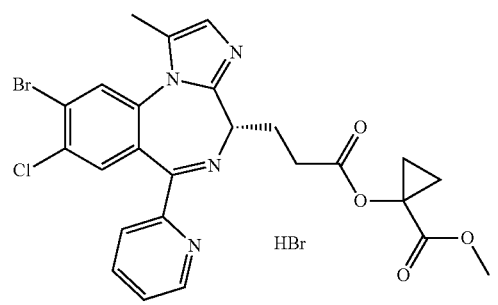
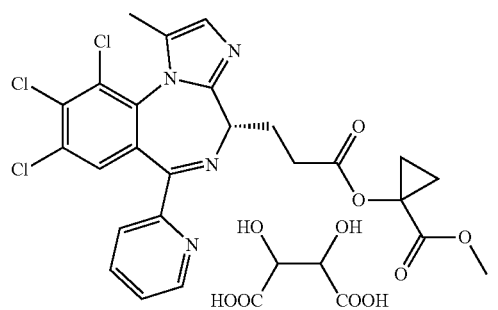
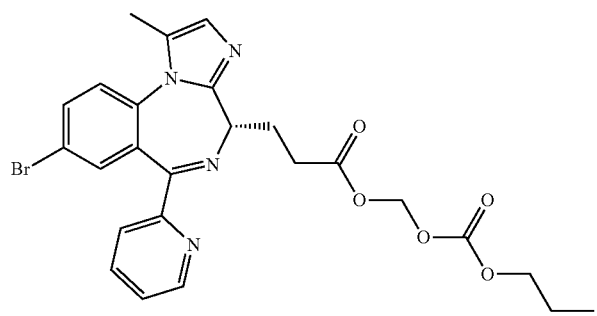

-continued
141
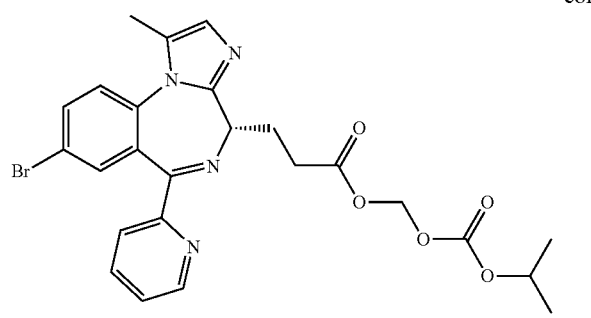
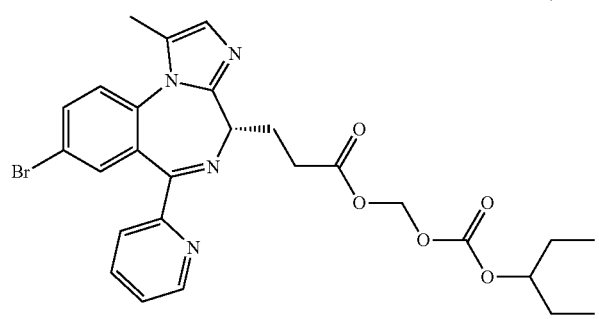
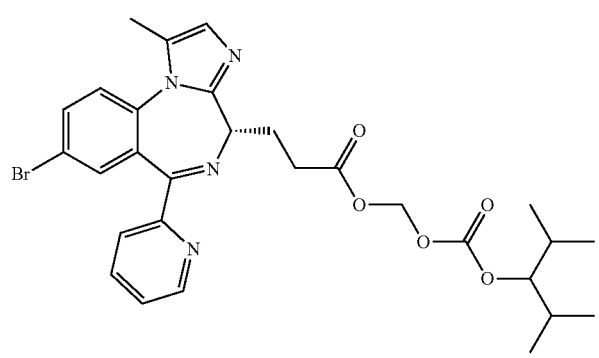
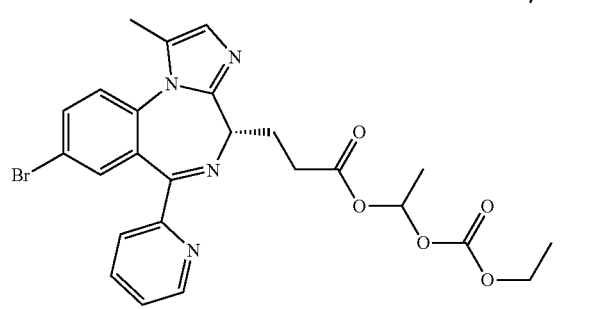
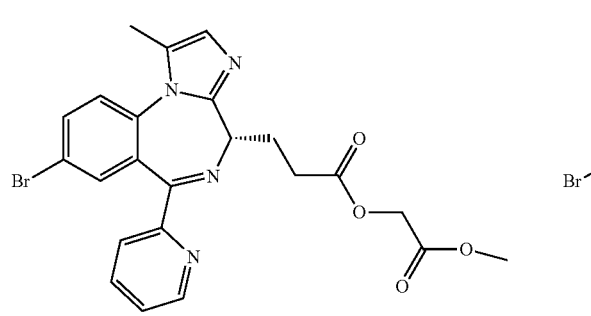
142
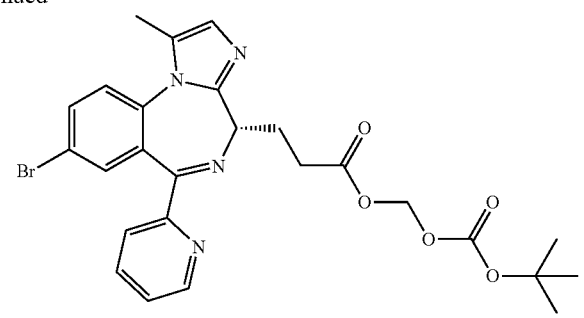
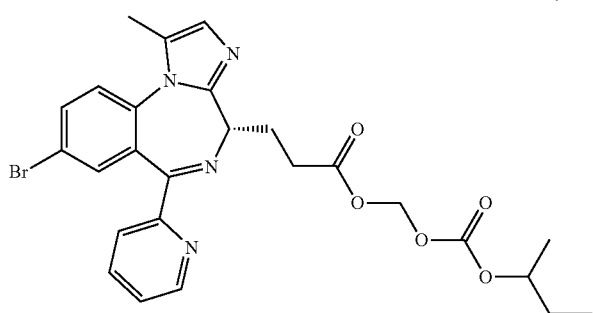
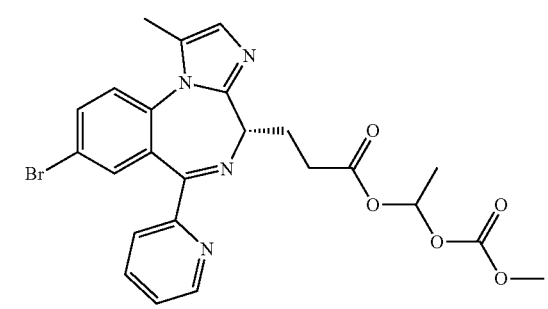
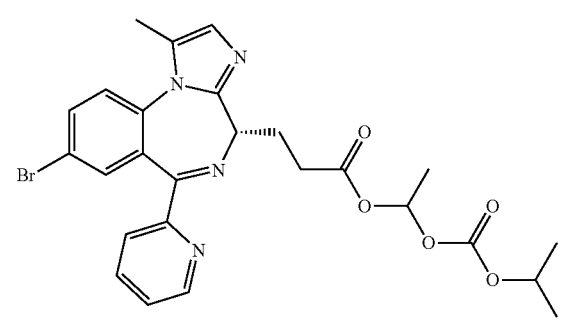
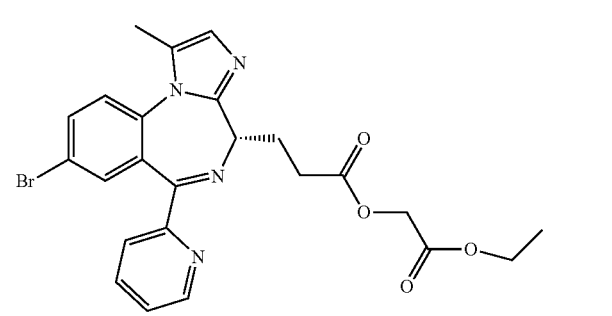

143 144
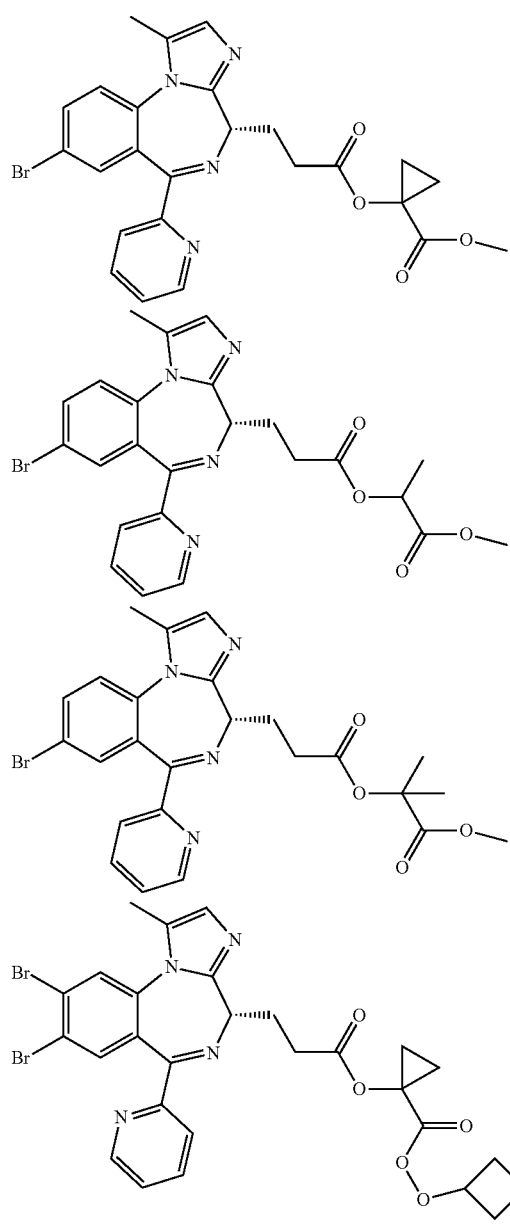
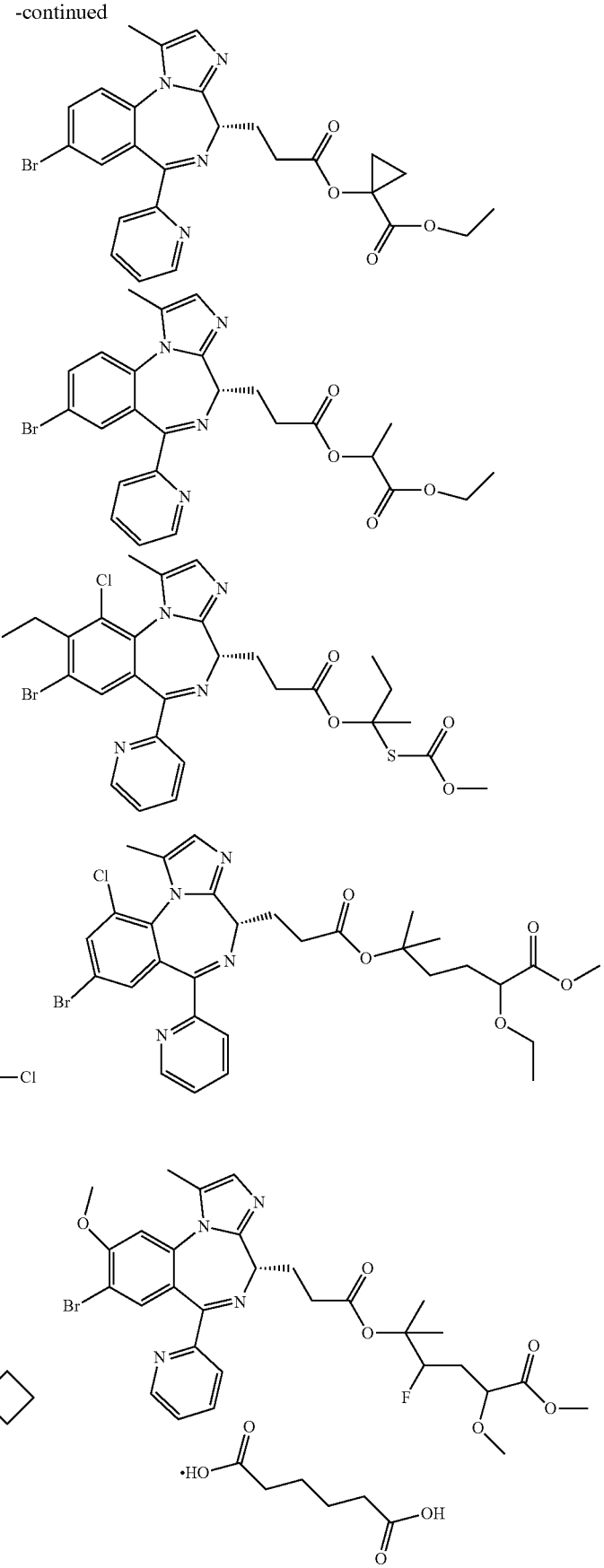

145
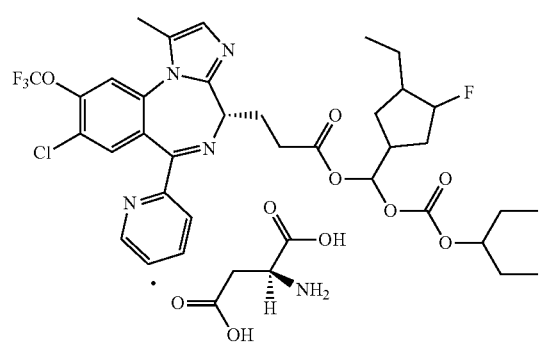
146
-continued
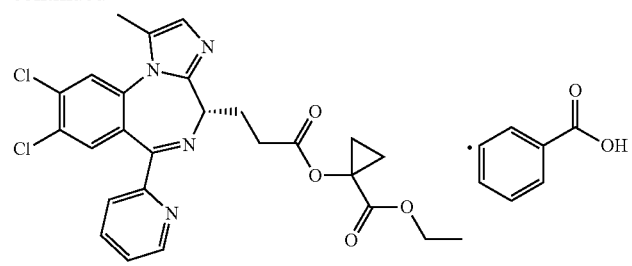
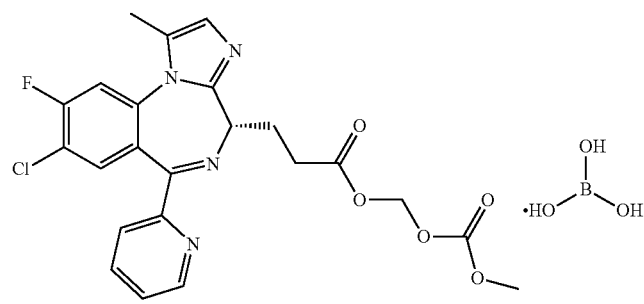
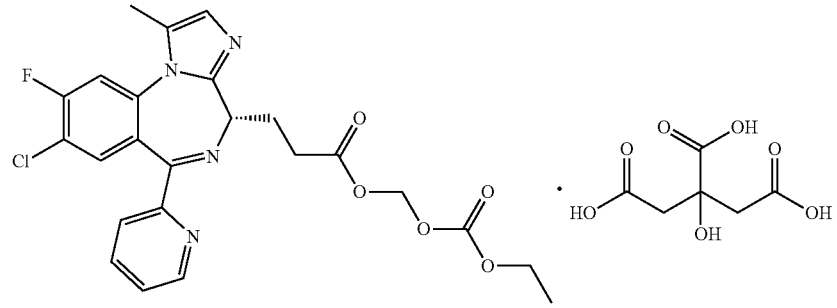
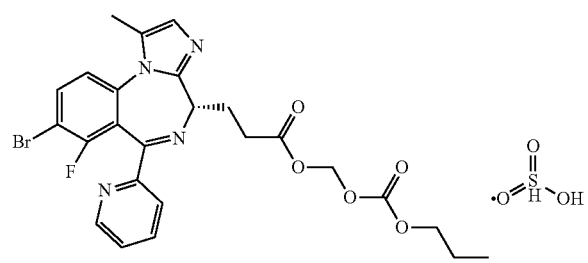
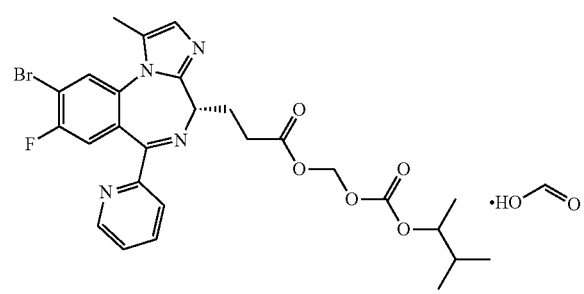
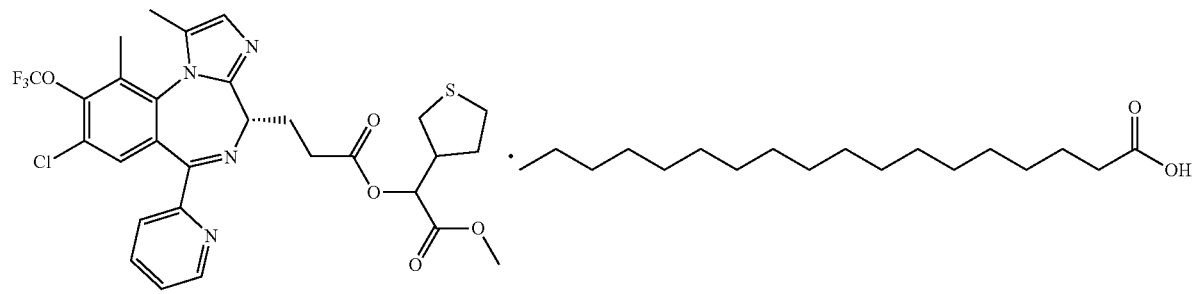

-continued
147
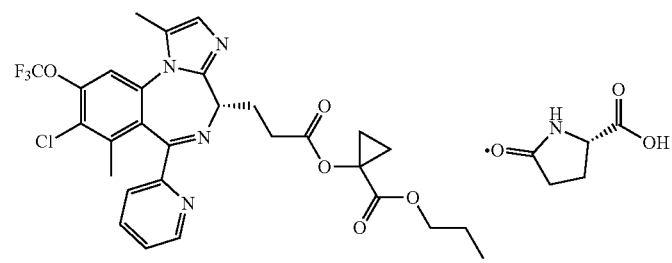
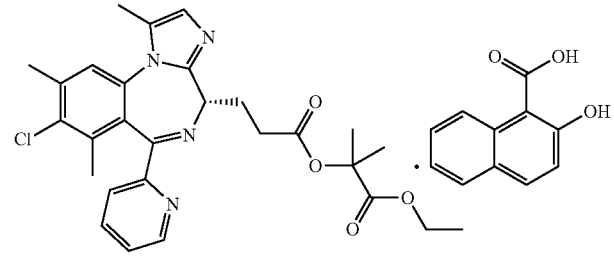
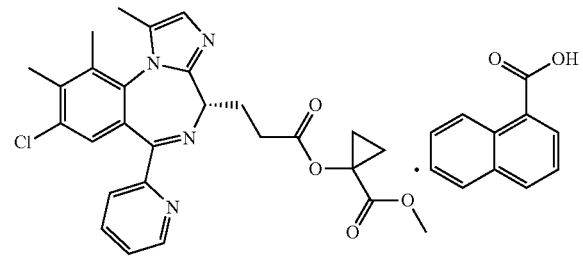
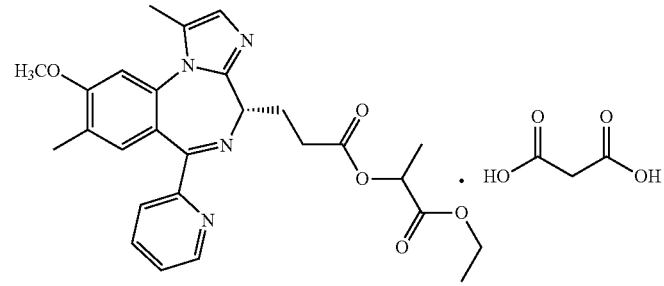
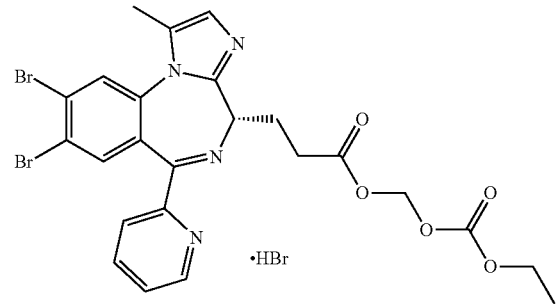
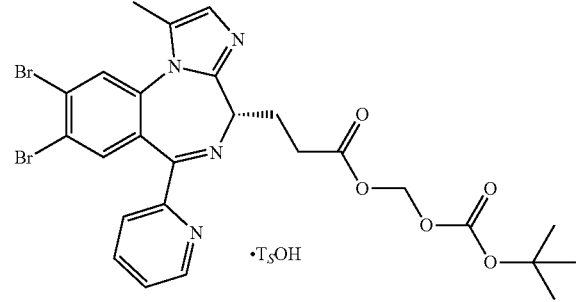
148
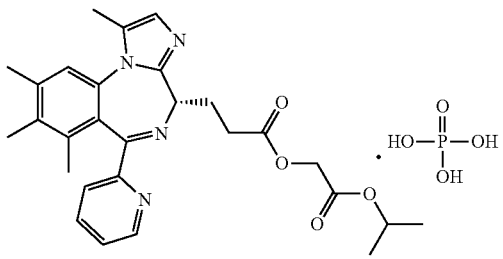
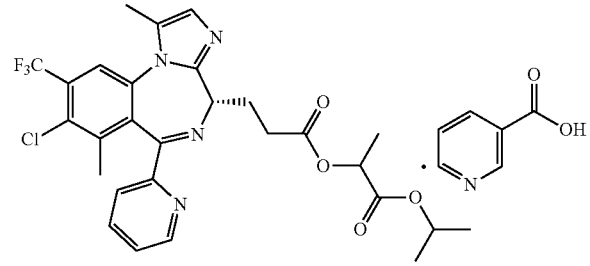
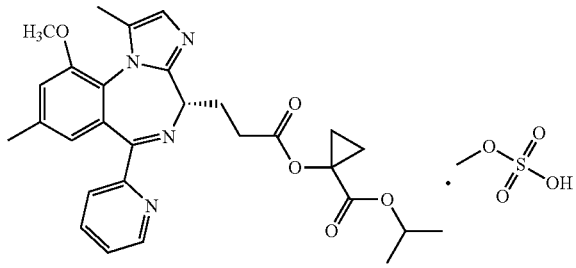
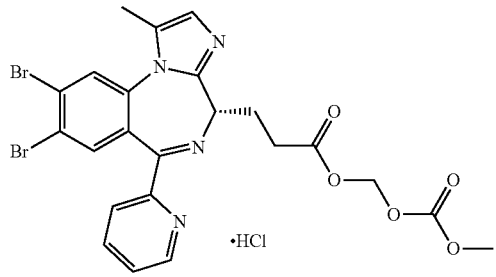
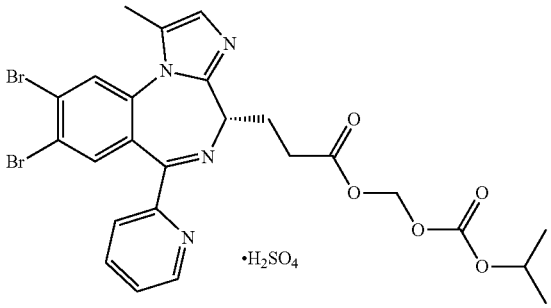
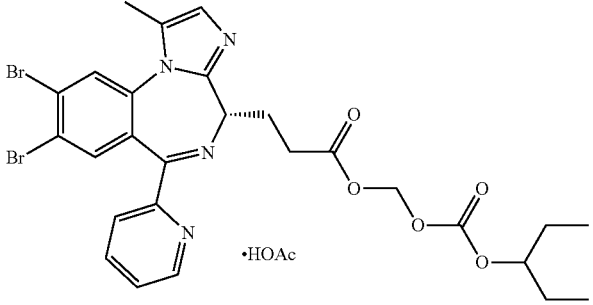

149           150
-continued
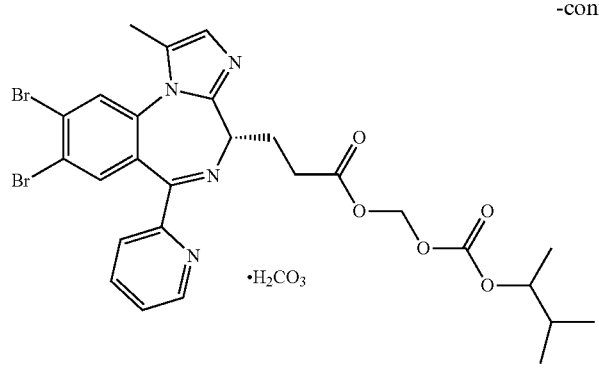 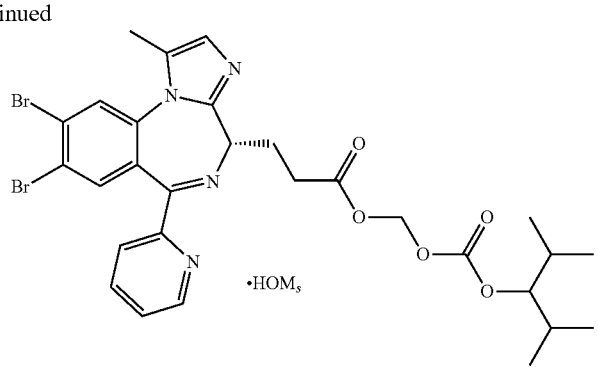
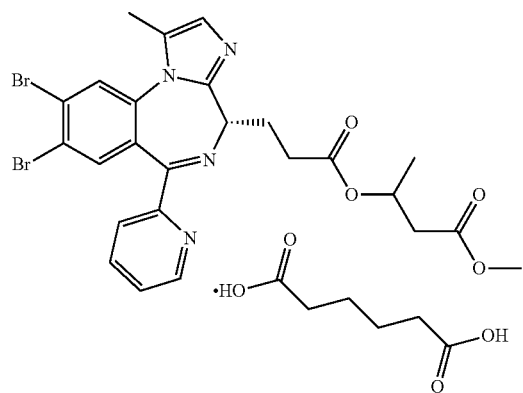 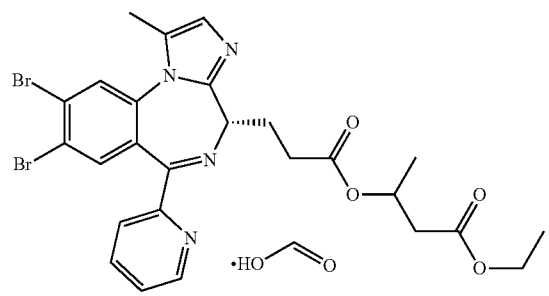
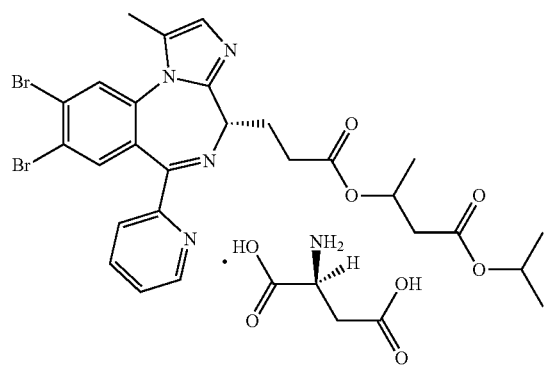 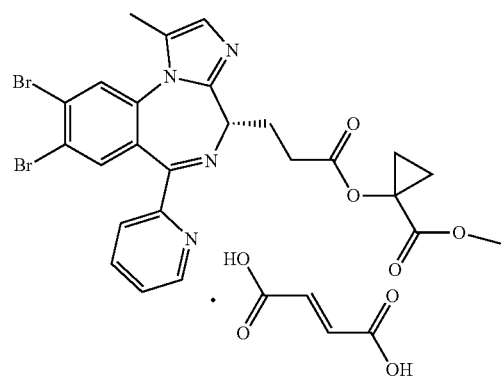
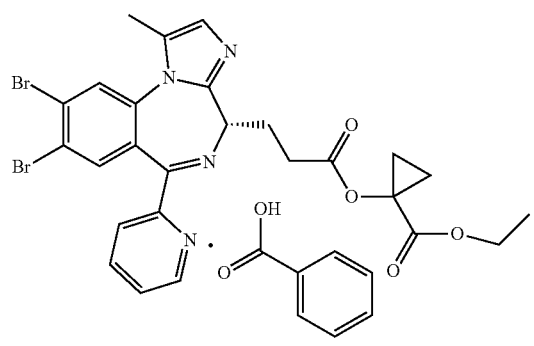 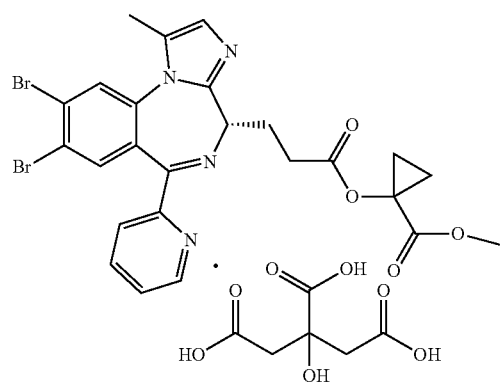

151
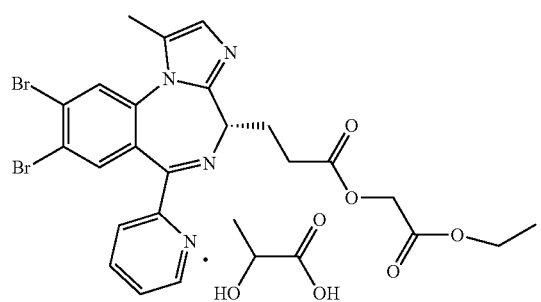
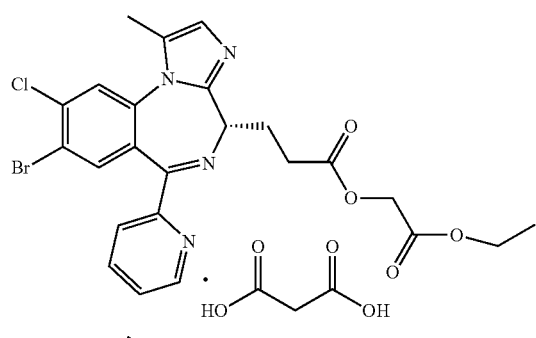
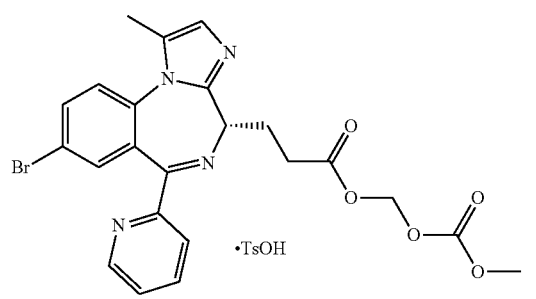
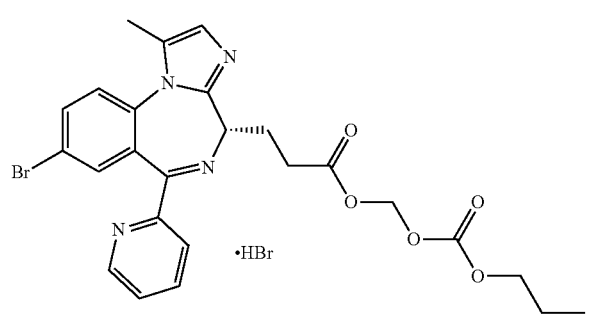
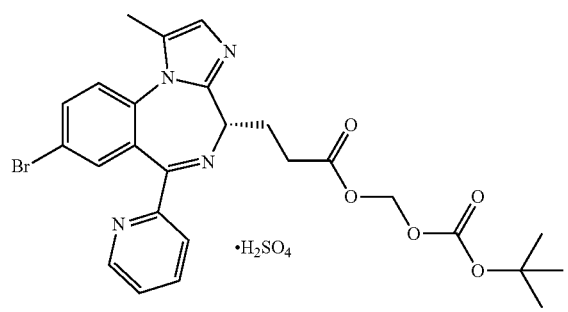
152
-continued
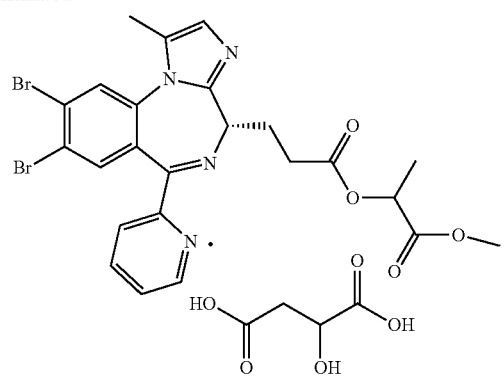
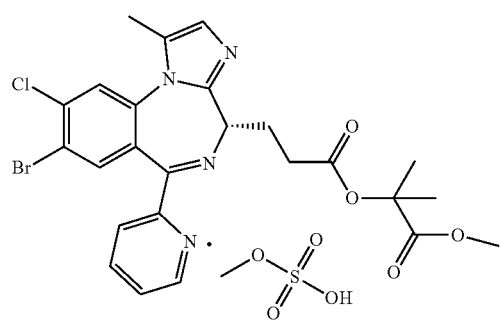
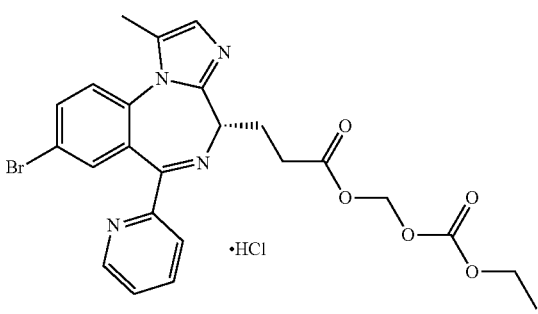
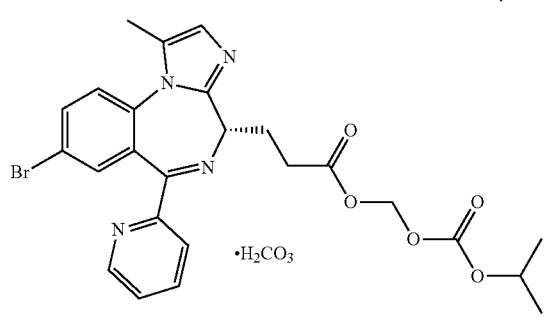
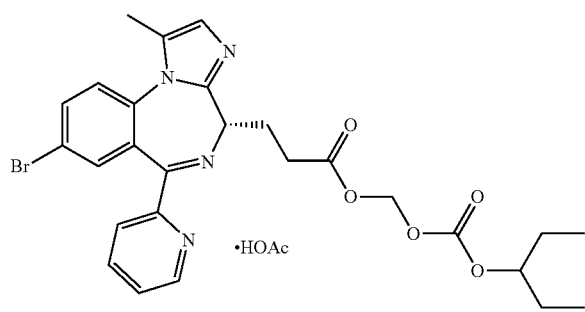

153
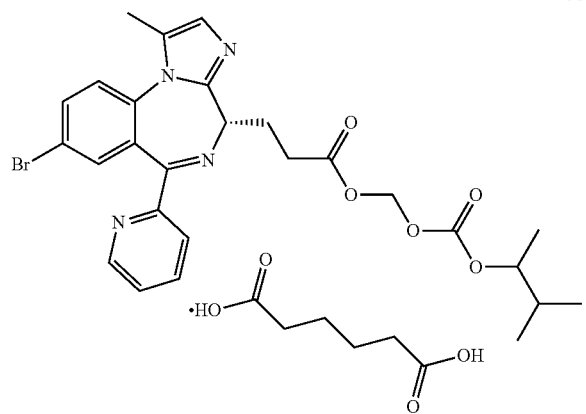
154
-continued
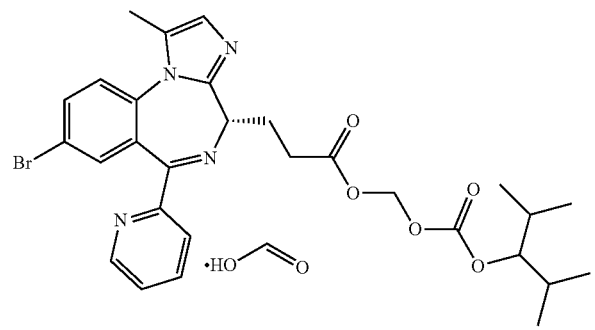
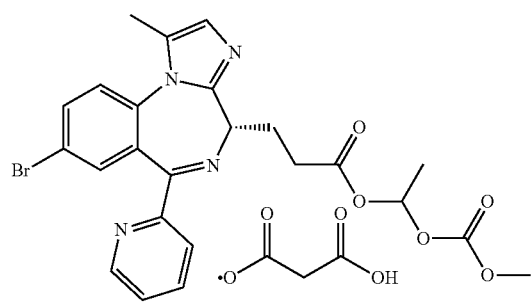
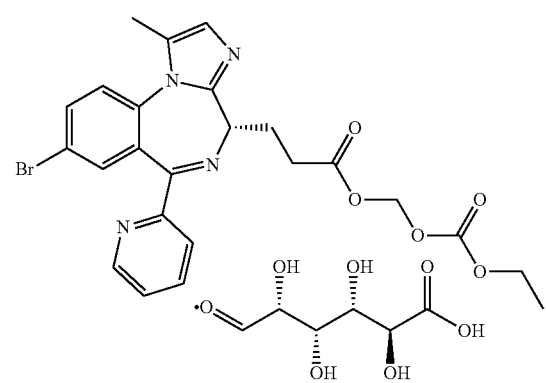
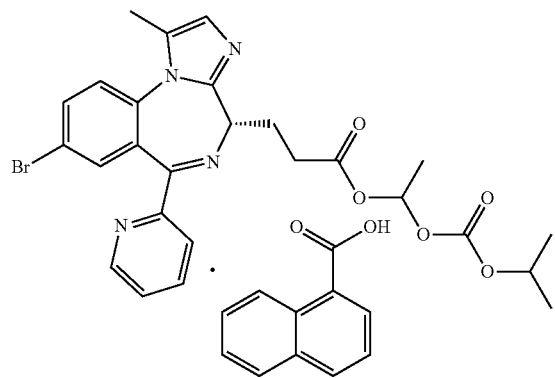
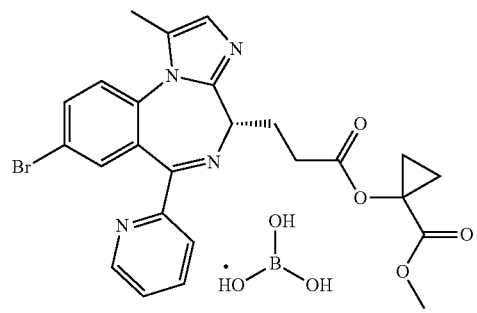
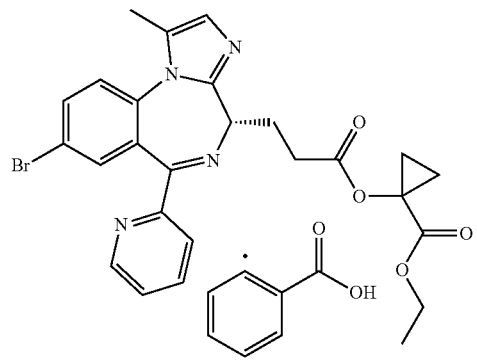
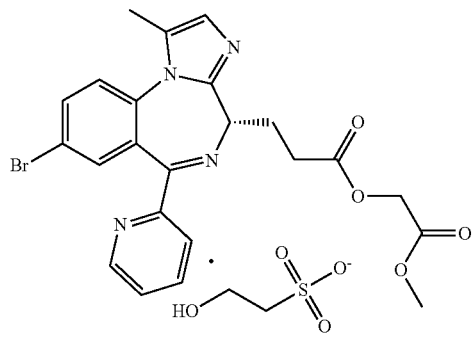

155
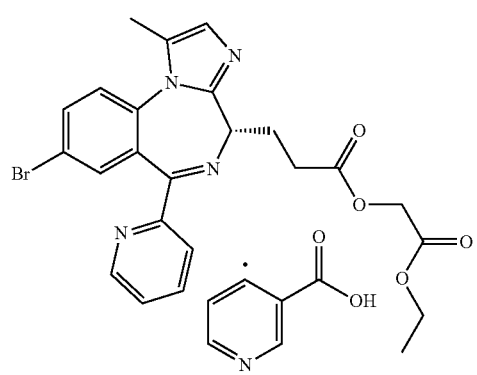
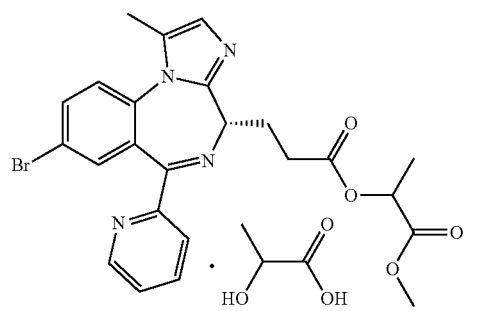
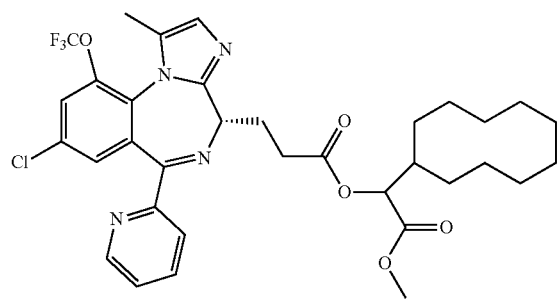 [SMILES: COC(=O)C(OC(=O)CC[C@@H]1N=C(c2ccccn2)c2cc(Cl)cc(OC(F)(F)F)c2-n2c(C)cnc21)C1CCCCCCCCC1]
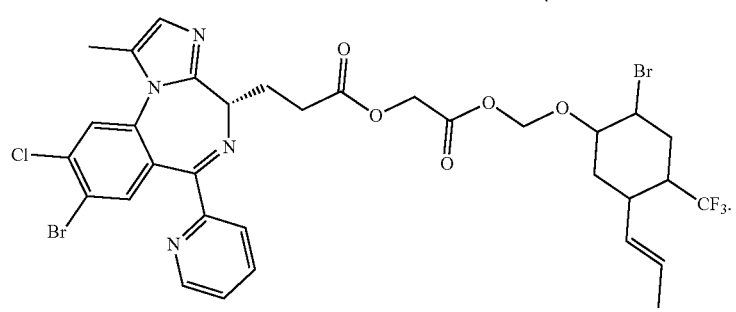
156
-continued
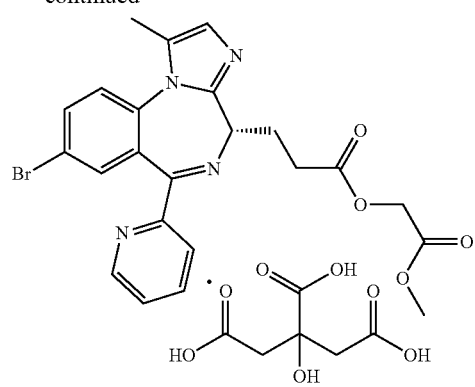
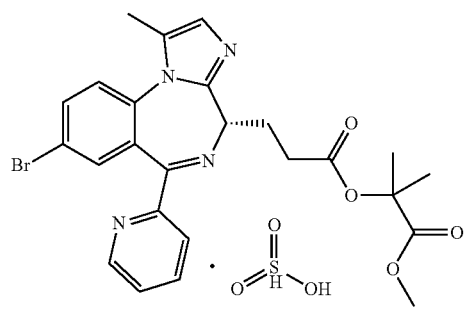

11. The preparation method for the compound of formula I according to claim 1, or a salt thereof, or a stereoisomer thereof, or a solvate thereof, or a cocrystallization thereof, or a composition thereof, wherein said method comprises the following steps:

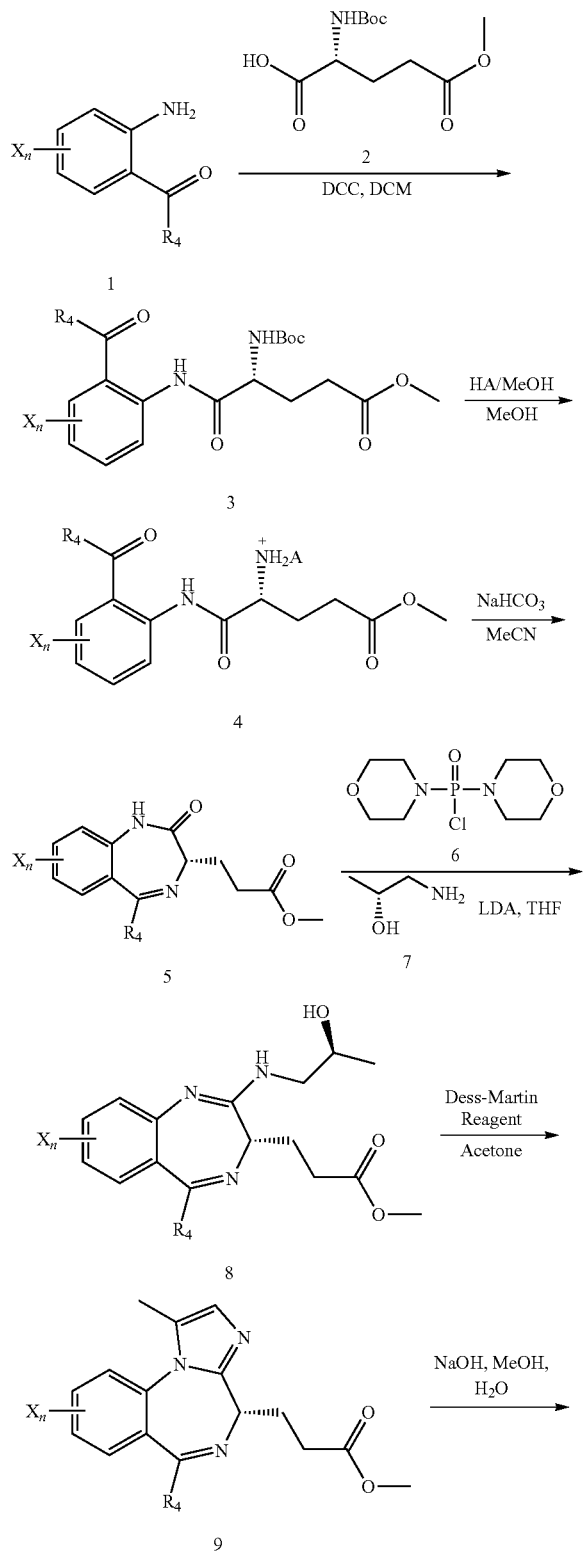
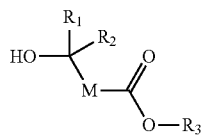
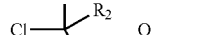

wherein starting materials polysubstituted o-aminobenzoylpyridine 1 and Boc-L-glutamic acid 5-methyl ester 2 react in DCM in the presence of DCC, to provide 2-(5-methoxycarbonyl-Boc-L-glutamic acid)amino (polysubstituted) benzoylpyridine 3;

2-(5-methoxycarbonyl-L-glutamic acid)amino(polysubstituted) benzoylpyridine salt 4 is obtained by removing Boc protective group of 3 in methanol in the presence of acid; polysubstituted benzodiazepinepropionate 5 is synthesized by an intramolecular condensation reaction of 4 in acetonitrile in the presence of sodium bicarbonate; the reaction of compound 5 with dimorpholinophosphinyl chloride 6 and (R)-1-amino-2-propoanol 7 in THF in the presence of LDA produced (R)—N-(propionate-3-yl(polysubstituted)benzdiazepine) amino-2-propanol 8; compound 8 is subjected to the oxidation and ring-closing reaction in acetone in the presence of Dess-Martin Reagent, to provide pyridyl imidazobenzodiazepinepropionate 9; and compound 9 is hydrolyzed in the presence of sodium hydroxide, to obtain the target intermediate pyridyl imidazobenzodiazepinepropionic acid II, which is reacted with compound 10 or 11 and then treated with acid HA, to provide the compound of formula I:

pyridylimidazobenzodiazepinepropionate;

wherein $R_1$, $R_2$, $R_3$, $R_4$, M, X, and n are as described in claim 1.

12. A drug comprising the compound according to claim 1, or a salt thereof, or a stereoisomer thereof, or a solvate thereof, or a cocrystallization thereof, or a composition thereof as active ingredients, and one or more of pharmaceutically acceptable excipients or auxiliary ingredients.

13. The compound according to claim 1, or a salt thereof, or a stereoisomer thereof, or a solvate thereof, or a cocrystallization thereof, or a composition thereof, wherein $R_1$ is a short-chain hydrocarbon group or hydrogen; $R_2$ is H or a short-chain hydrocarbon group; M is O; $R_3$ is a short-chain hydrocarbon group; and $R_4$ is a pyridine ring with nitrogen at position 2.

14. The compound according to claim 2, or a salt thereof, or a stereoisomer thereof, or a solvate thereof, or a cocrystallization thereof, or a composition thereof, wherein each X is independently selected from —F, —Cl, —Br, —CH$_3$, —OCH$_3$, —CF$_3$, and —OCF$_3$.

15. The compound according to claim 3, or a salt thereof, or a stereoisomer thereof, or a solvate thereof, or a cocrystallization thereof, or a composition thereof, wherein $R_1$ is a short-chain hydrocarbon group or hydrogen; $R_2$ is H or a short-chain hydrocarbon group; M is O; and $R_3$ is a short-chain hydrocarbon group.

16. The compound according to claim 3, or a salt thereof, or a stereoisomer thereof, or a solvate thereof, or a cocrystallization thereof, or a composition thereof, wherein:
  each of $R_1$ or $R_2$ is independently selected from the group consisting of H, substituted or unsubstituted $C_{1-8}$ alkyl, substituted or unsubstituted $C_{3-10}$ cycloalkyl, and substituted or unsubstituted 3-10 membered heterocyclic group; or $R_1$ and $R_2$ are connected to form substituted or unsubstituted C3-10 cycloalkyl or substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl, and $C_{1-8}$ alkoxy; the heteroatom of the heterocyclic group is selected from N, O and S, and the number of heteroatoms is 1, 2 or 3;
  $R_3$ is selected from the group consisting of H, $C_{1-8}$ alkyl, and —(CH$_2$)$_a$—(O)$_b$—R$_5$; wherein $R_5$ is selected from the group consisting of substituted or unsubstituted $C_{3-10}$ cycloalkyl, and substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —NHR$_6$; the heteroatom of the heterocyclic group is selected from N, O and S, and the number of heteroatoms is 1, 2 or 3; $R_6$ is $C_{1-4}$ alkyl;
  a is selected from 0, 1 and 2;
  b is 0 or 1;
  $R_4$ represents a pyridine ring with nitrogen at position 2, 3 or 4;
  M is selected from the group consisting of none, O, S, NH, and substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl and $C_{1-4}$ alkoxy; and
  each X is independently selected from halogen, substituted or unsubstituted $C_{1-8}$ alkyl, and substituted or unsubstituted $C_{1-8}$ alkoxy; the substituent of said alkyl or alkoxy is halogen; and
  n is selected from 1, 2, 3 and 4.

17. The compound according to claim 5, or a salt thereof, or a stereoisomer thereof, or a solvate thereof, or a cocrystallization thereof, or a composition thereof, wherein $R_1$ is a short-chain hydrocarbon group or hydrogen; $R_2$ is H or a short-chain hydrocarbon group; M is O; $R_3$ is a short-chain hydrocarbon group; and $R_4$ is a pyridine ring with nitrogen at position 2.

18. The compound according to claim 5, or a salt thereof, or a stereoisomer thereof, or a solvate thereof, or a cocrystallization thereof, or a composition thereof, wherein each of $R_1$ or $R_2$ is independently selected from the group consisting of H, substituted or unsubstituted $C_{1-8}$ alkyl, substituted or unsubstituted $C_{3-10}$ cycloalkyl, and substituted or unsubstituted 3-10 membered heterocyclic group; or $R_1$ and $R_2$ are connected to form substituted or unsubstituted $C_{3-10}$ cycloalkyl, and substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl, and $C_{1-8}$ alkoxy; the heteroatom of the heterocyclic group is selected from N, O and S, and the number of heteroatoms is 1, 2 or 3;
  $R_3$ is selected from the group consisting of H, $C_{1-8}$ alkyl, and —(CH$_2$)$_a$—(O)$_b$—R$_5$; wherein $R_5$ is selected from the group consisting of substituted or unsubstituted $C_{3-10}$ cycloalkyl and substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{14}$ alkoxy, $C_{2-6}$ alkenyl, $C_{2-6}$ alkynyl, and —NHR$_6$;
  the heteroatom of the heterocyclic group is selected from N, O and S, and the number of heteroatoms is 1, 2 or 3; $R_6$ is $C_{1-4}$ alkyl;
  a is selected from 0, 1, and 2;
  b is 0 or 1;
  $R_4$ is selected from a pyridine ring with nitrogen at position 2, 3 or 4;
  M is selected from the group consisting of none, O, S, NH, and substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl, and $C_{1-4}$ alkoxy;
  each of $X_1$ and $X_2$ is selected from the group consisting of halogen, substituted or unsubstituted $C_{1-8}$ alkyl, and substituted or unsubstituted $C_{1-8}$ alkoxy; and
  the substituent of said alkyl or alkoxy is halogen.

19. The compound according to claim 6, or a salt thereof, or a stereoisomer thereof, or a solvate thereof, or a cocrystallization thereof, or a composition thereof, wherein each of $X_1$ and $X_2$ is selected from the group consisting of —F, —Cl, —Br, —CH$_3$, —OCH$_3$, —CF$_3$, and —OCF$_3$.

20. The compound according to claim 7, or a salt thereof, or a stereoisomer thereof, or a solvate thereof, or a cocrystallization thereof, or a composition thereof, wherein $R_1$ is a short-chain hydrocarbon group or hydrogen; $R_2$ is H or a short-chain hydrocarbon group; M is O; $R_3$ is a short-chain hydrocarbon group; and $R_4$ is a pyridine ring with nitrogen at position 2.

21. The compound according to claim 7, or a salt thereof, or a stereoisomer thereof, or a solvate thereof, or a cocrystallization thereof, or a composition thereof, wherein:
   each of $R_1$ or $R_2$ is independently selected from the group consisting of H, substituted or unsubstituted $C_{1-8}$ alkyl, substituted or unsubstituted $C_{3-10}$ cycloalkyl, and substituted or unsubstituted 3-10 membered heterocyclic group; or $R_1$ and $R_2$ are connected to form substituted or unsubstituted $C_{3-10}$ cycloalkyl, and substituted or unsubstituted 3-10 membered heterocyclic group; the number of substituents of said substituted alkyl, substituted cycloalkyl or substituted heterocyclic group is 1, 2, 3 or 4, and the substituents of said substituted alkyl, substituted cycloalkyl or substituted heterocyclic group are selected from the group consisting of halogen, trifluoromethyl, cyano, nitro, $C_{1-8}$ alkyl, and $C_{1-8}$ alkoxy; the heteroatom of the heterocyclic group is selected from N, O, and S, and the number of heteroatoms is 1, 2 or 3;
   $R_3$ is selected from the group consisting of H, $C_{1-8}$ alkyl, and —$(CH_2)_a$—$(O)_b$—$R_5$; wherein $R_5$ is selected from the group consisting of substituted or unsubstituted $C_{3-10}$ cycloalkyl, and substituted or unsubstituted 3-10 membered heterocyclic group; the number of substituents of said substituted cycloalkyl or substituted heterocyclic group is 1, 2, 3 or 4, and the substituents of said substituted cycloalkyl or substituted heterocyclic group are selected from the group consisting of halogen, trifluoromethyl, amino, $C_{1-4}$ alkyl, $C_{1-4}$ alkoxy, $C_{2-6}$ alkenyl, $C_{2-6}$ alkynyl, and —$NHR_6$; the heteroatom of the heterocyclic group is selected from N, O, and S, and the number of heteroatoms is 1, 2 or 3; $R_6$ is selected from $C_{1-4}$ alkyl;
   a is selected from 0, 1, and 2;
   b is 0 or 1;
   $R_4$ is selected from a pyridine ring with nitrogen at position 2, 3 or 4;
   M is selected from the group consisting of none, O, S, NH, and substituted or unsubstituted $C_{1-5}$ alkylene; the number of substituents of said substituted alkylene is 1, 2, 3 or 4, and the substituents of said substituted alkylene are selected from the group consisting of halogen, trifluoromethyl, and $C_{1-4}$ alkoxy;
   $X_1$ is selected from the group consisting of halogen, substituted or unsubstituted $C_{1-8}$ alkyl, and substituted or unsubstituted $C_{1-8}$ alkoxy; and
   the substituent of said alkyl or alkoxy is halogen.

22. The compound according to claim 8, or a salt thereof, or a stereoisomer thereof, or a solvate thereof, or a cocrystallization thereof, or a composition thereof, wherein X1 is selected from the group consisting of —F, —Cl, —Br, —CH3, —OCH3, —CF3, and —OCF3.

23. The preparation method according to claim 11, wherein:
   for the reaction of compound 1, compound 2 with DCC, the equivalent ratios are 1:0.8-2.5 and 1:0.8-2.5;
   for the reaction of compound 3 with acid, the equivalent ratio is 1:0.9-2;
   for the reaction of compound 4 with sodium bicarbonate, the equivalent ratio is 1:15-20;
   for the reaction of compound 5 with compound 7, the equivalent ratio is 1:1.0-2.5;
   for the reaction of compound 8 with Dess-Martin Reagent, the equivalent ratio is 1:2-3, and the reaction temperature is 35-60° C.;
   for the reaction of the target intermediate (II) with compound 10 or 11, the equivalent ratio is 1:1.0-2.2, and the reaction temperature is 30-50° C.; and/or,
   in the final step of forming salt, the equivalent ratio for the reaction with acid is 1:1-2,
   wherein each equivalent ratio is a molar ratio.

* * * * *